(12) United States Patent
Yano et al.

(10) Patent No.: US 8,072,640 B2
(45) Date of Patent: Dec. 6, 2011

(54) RECORDING SYSTEM AND CONTROLLING METHOD THEREFOR

(75) Inventors: Kentaro Yano, Kanagawa (JP); Kazuya Sakamoto, Kanagawa (JP); Takao Aichi, Tokyo (JP); Fumihiro Goto, Kanagawa (JP); Akitoshi Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 243 days.

(21) Appl. No.: 12/390,871

(22) Filed: Feb. 23, 2009

(65) Prior Publication Data
US 2009/0161161 A1 Jun. 25, 2009

Related U.S. Application Data

(63) Continuation of application No. 10/608,023, filed on Jun. 30, 2003, now Pat. No. 7,561,288.

(30) Foreign Application Priority Data

Jul. 5, 2002 (JP) .................................. 2002-197461

(51) Int. Cl.
*G06F 15/00* (2006.01)
(52) U.S. Cl. ....... 358/1.15; 358/1.13; 358/434; 358/435; 358/439; 348/207.2
(58) Field of Classification Search ............... 358/1.15, 358/1.13, 434–439; 348/207.2; 709/208–211
See application file for complete search history.

(56) References Cited

U.S. PATENT DOCUMENTS

| | | | |
|---|---|---|---|
| 5,142,594 A | 8/1992 | Sugishima | 382/56 |
| 5,805,298 A | 9/1998 | Ho et al. | 358/402 |
| 6,055,361 A | 4/2000 | Fujita et al. | 395/114 |
| 6,115,137 A | 9/2000 | Ozawa et al. | 358/1.6 |
| 6,236,464 B1 | 5/2001 | Kohtani et al. | |
| 6,504,960 B2 | 1/2003 | Takahashi | 382/305 |
| 6,507,358 B1 | 1/2003 | Mori et al. | 348/42 |
| 6,552,743 B1 | 4/2003 | Rissman | 348/207.2 |
| 7,106,461 B2 | 9/2006 | Kakigi et al. | 358/1.12 |
| 7,289,141 B2 | 10/2007 | Yamada et al. | |
| 7,298,523 B2 | 11/2007 | Masumoto et al. | |

(Continued)

FOREIGN PATENT DOCUMENTS

EP 0 883 276 A2 12/1998

(Continued)

OTHER PUBLICATIONS

Seiko Epson Corp., "To Take a Photo and Print", CHIP Magazine, No. 8, p. 7 (Aug. 2001) with English translation.

(Continued)

*Primary Examiner* — Chan Park
(74) *Attorney, Agent, or Firm* — Fitzpatrick, Cella, Harper & Scinto

(57) ABSTRACT

In a recording system in which a digital still camera and a photo-direct printer are directly connected to each other via a general interface, image data is transmitted to the printer from the camera, and the data is printed. A communication procedure is established by applications installed into the printer and the camera, each of a plurality of functions serving as the printing system are assigned to either the camera or the printer, data and a command are transferred between the functions assigned to the camera and the printer, and recording is performed by the printer based on image data supplied from the camera.

7 Claims, 44 Drawing Sheets

U.S. PATENT DOCUMENTS

| | | | |
|---|---|---|---|
| 7,330,286 B2 * | 2/2008 | Fukasawa | 358/1.9 |
| 7,502,049 B2 | 3/2009 | Aichi et al. | |
| 7,515,309 B2 | 4/2009 | Yano et al. | |
| 7,532,361 B2 | 5/2009 | Yano | |
| 7,561,288 B2 | 7/2009 | Yano et al. | |
| 7,564,487 B2 | 7/2009 | Kato et al. | |
| 7,564,576 B2 | 7/2009 | Kato et al. | |
| 7,633,649 B2 | 12/2009 | Masumoto et al. | |
| 7,639,278 B2 | 12/2009 | Goto et al. | |
| 7,764,393 B2 | 7/2010 | Yamada et al. | |
| 2001/0048534 A1 | 12/2001 | Tanaka et al. | 358/1.16 |
| 2002/0031147 A1 * | 3/2002 | Anderson et al. | 370/487 |
| 2002/0080250 A1 | 6/2002 | Ogawa et al. | |
| 2003/0067620 A1 | 4/2003 | Masumoto et al. | 358/1.13 |
| 2003/0067638 A1 | 4/2003 | Yano | 358/540 |
| 2003/0081235 A1 | 5/2003 | Tanaka et al. | 358/1.13 |
| 2003/0081237 A1 | 5/2003 | Ogiwara et al. | 358/1.14 |
| 2003/0081251 A1 | 5/2003 | Tanaka et al. | 358/1.15 |
| 2003/0084085 A1 | 5/2003 | Breidenbach et al. | 709/1 |
| 2003/0156196 A1 | 8/2003 | Kato et al. | 348/207.2 |
| 2004/0021902 A1 | 2/2004 | Ogiwara et al. | 358/1.15 |
| 2004/0070672 A1 | 4/2004 | Iwami et al. | 348/207.2 |
| 2005/0024497 A1 | 2/2005 | Sakamoto et al. | |
| 2006/0044395 A1 | 3/2006 | Aichi et al. | 348/207.2 |
| 2006/0235987 A1 | 10/2006 | Goto et al. | |
| 2007/0182993 A1 | 8/2007 | Yamada et al. | |
| 2007/0195362 A1 | 8/2007 | Yamada et al. | |
| 2008/0037060 A1 | 2/2008 | Ono et al. | |
| 2009/0002730 A1 | 1/2009 | Yamada et al. | |

FOREIGN PATENT DOCUMENTS

| | | |
|---|---|---|
| EP | 0 949 804 A2 | 10/1999 |
| EP | 0 998 140 A1 | 5/2000 |
| EP | 1 158 763 | 11/2001 |
| JP | 2000-118086 | 4/2000 |
| JP | 2001-14119 | 1/2001 |
| JP | 2001-275066 | 10/2001 |
| JP | 2001-130063 | 5/2002 |
| RU | 2187146 | 9/1998 |

OTHER PUBLICATIONS

Japanese Office Action issued Aug. 4, 2008 in Japanese Application No. 2003-190475.

* cited by examiner

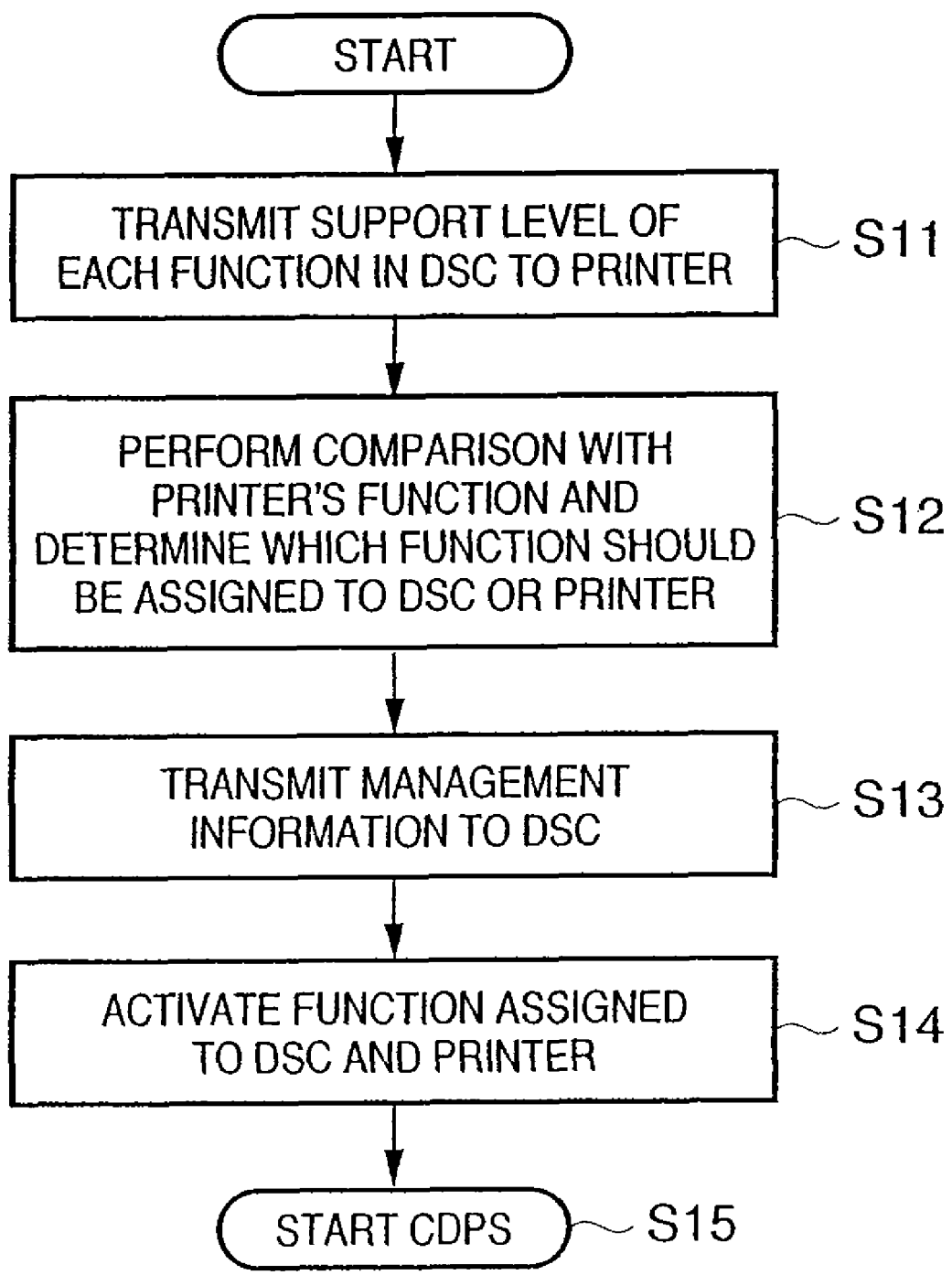

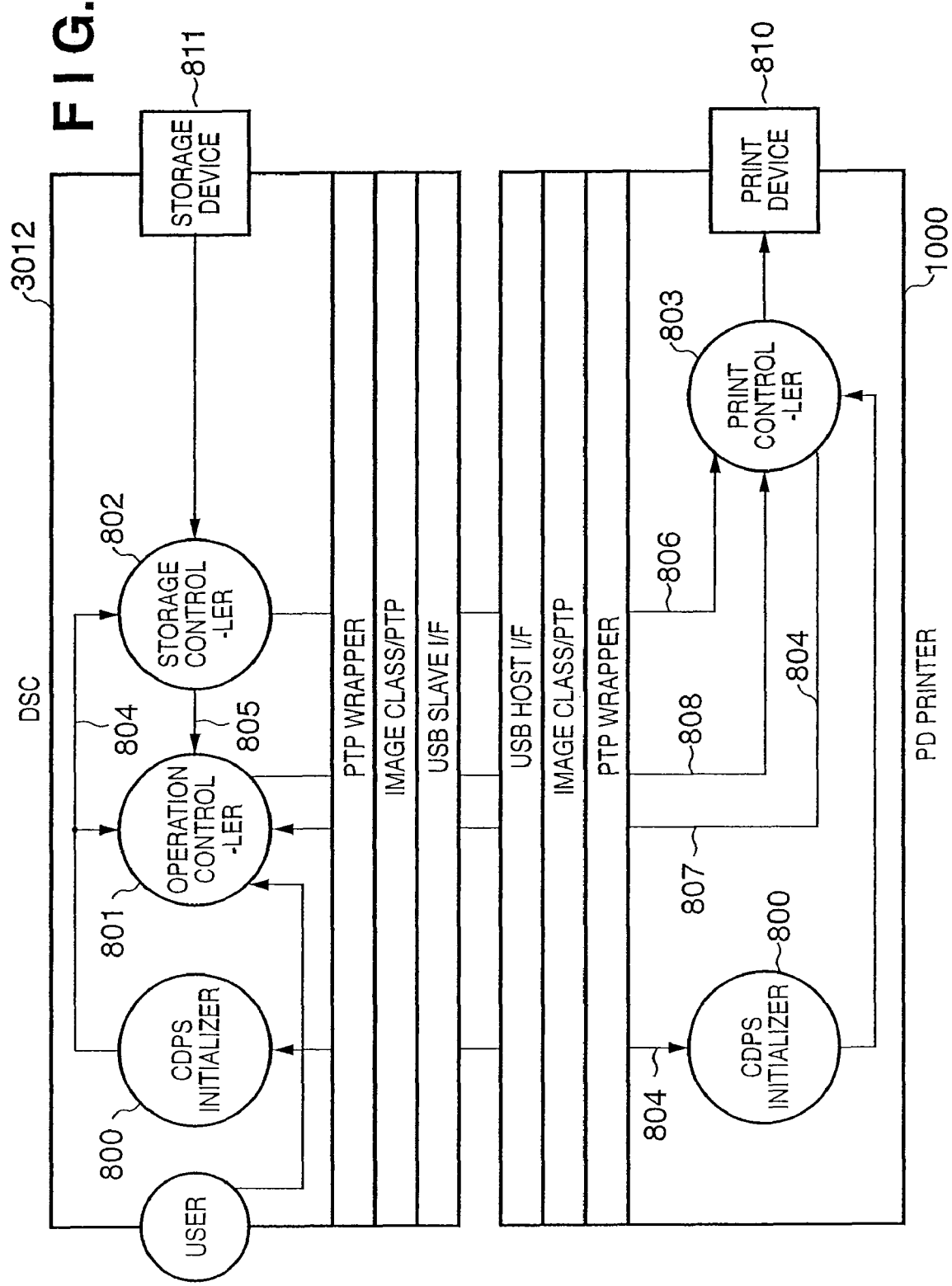

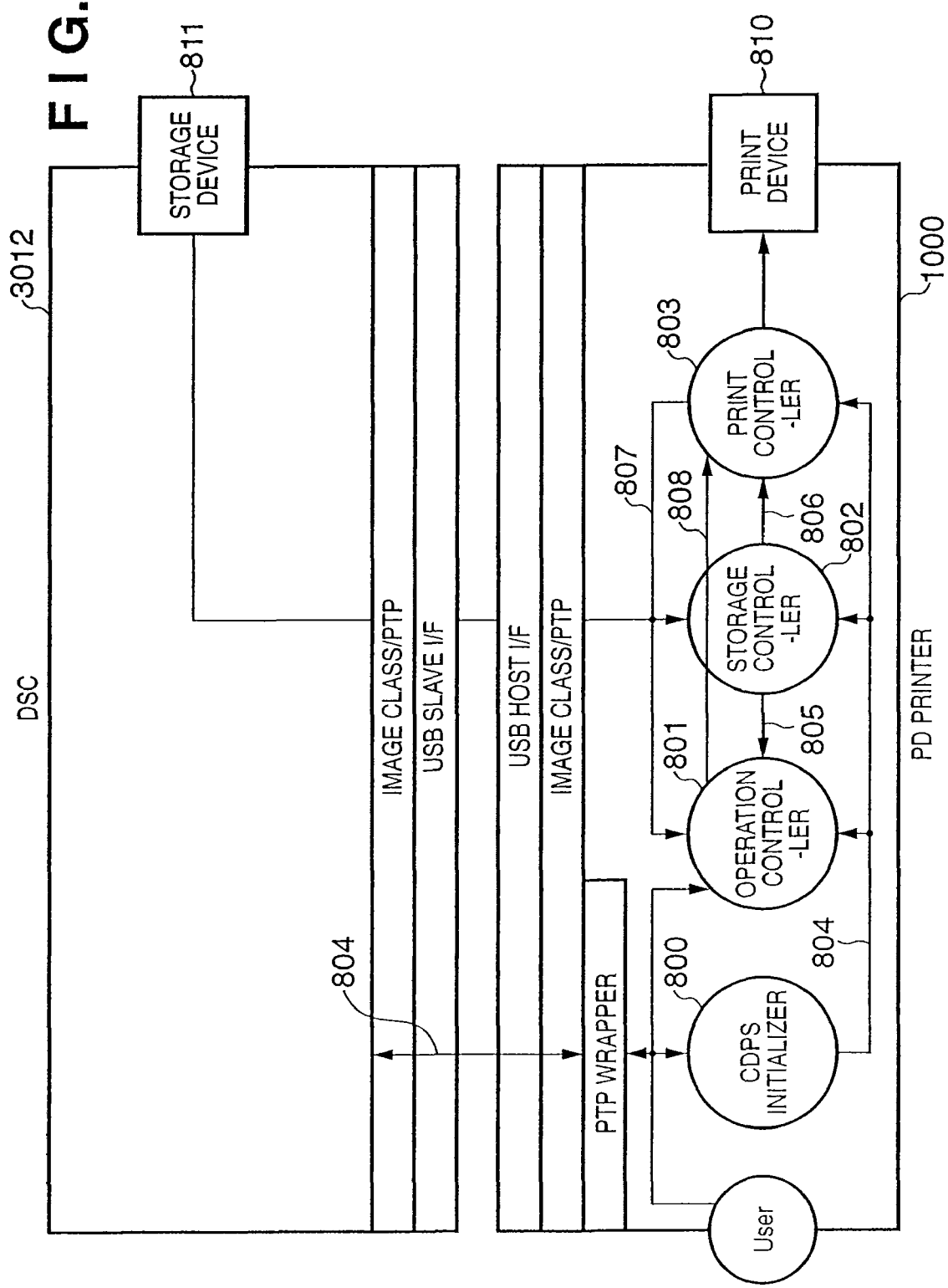

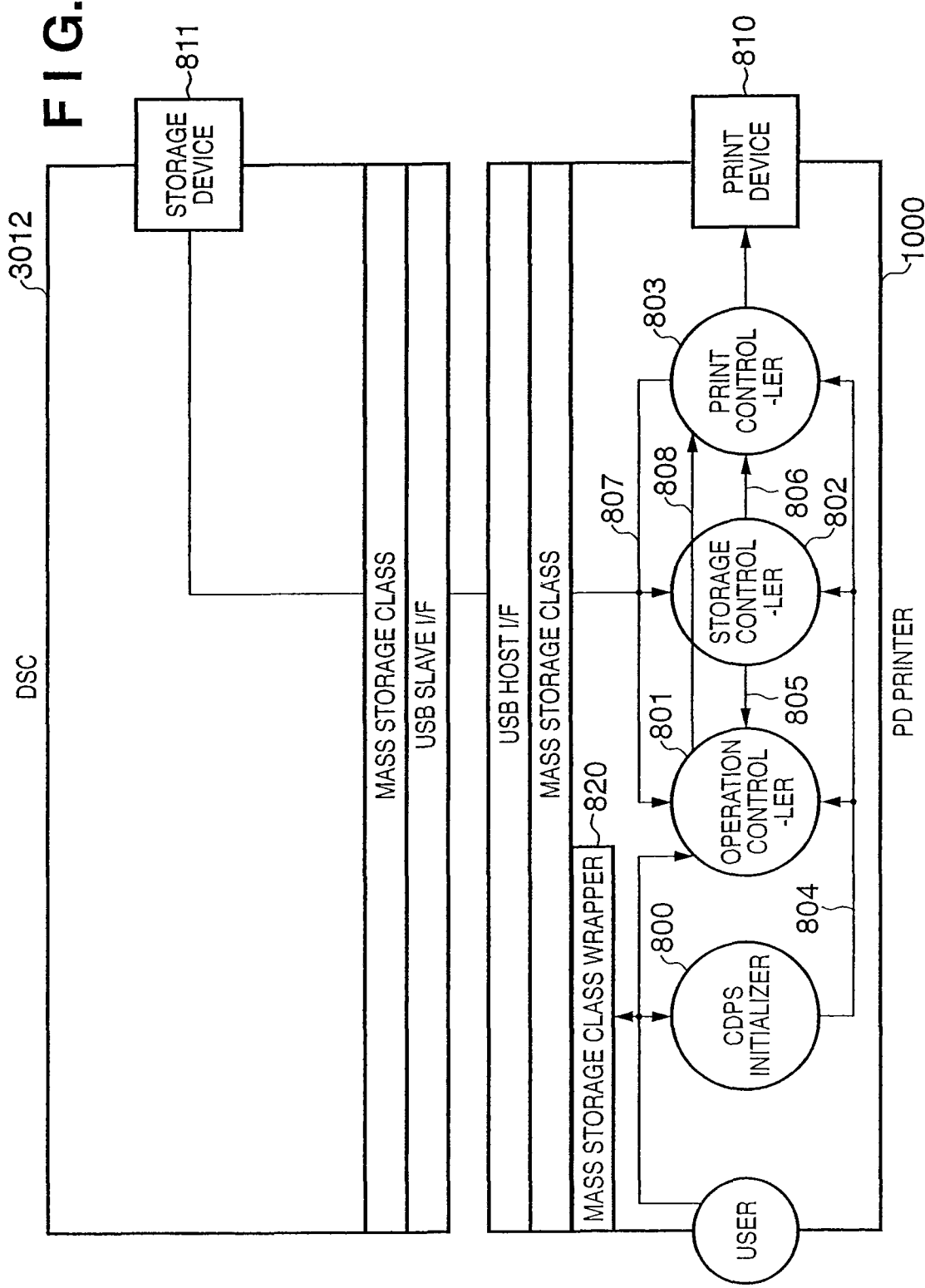

FIG. 15A

| | | ESSENTIAL FUNCTIONS | |
|---|---|---|---|
| ISSUE | | | |
| ORIGIN | DESTINATION | FUNCTION NAME | FUNCTION |
| INITIALIZE | INITIALIZE | CDPS_ServiceDiscovery | TRANSITION TO CDPS |
| PRINT CONTROLLER | OPERATION CONTROLLER | CDPS_Service | NOTIFICATION OF PRINTER'S FUNCTIONS |
| PRINT CONTROLLER | OPERATION CONTROLLER | CDPS_PageStart | NOTIFICATION OF PRINT START (EVERY TIME ONE PAGE IS FED) |
| PRINT CONTROLLER | OPERATION CONTROLLER | CDPS_PageEnd | NOTIFICATION OF PRINT END (EVERY TIME ONPAGE IS DISCHARGED) |
| PRINT CONTROLLER | OPERATION CONTROLLER | CDPS_JobEnd | NOTIFICATION OF THE COMPLETION OF A PRINT JOB |
| PRINT CONTROLLER | OPERATION CONTROLLER | CDPS_Error | NOTIFICATION OF ERROR (WARNING/FATAL) |
| PRINT CONTROLLER | STORAGE | CDPS_JobData | ACQUIRE AN IMAGE OF JPEG OR THE LIKE FROM STORAGE |
| OPERATION CONTROLLER | STORAGE | CDPS_DataList | ACQUIRE AN INFORMATION LIST OF JPEG OR THE LIKE FROM STORAGE |
| OPERATION CONTROLLER | PRINT CONTROLLER | CDPS_Job | PRINT COMMAND |
| OPERATION CONTROLLER | PRINT CONTROLLER | CDPS_JobAbort | PRINT STOP COMMAND |
| OPERATION CONTROLLER | PRINT CONTROLLER | CDPS_JobContinue | PRINT RESUME COMMAND |

FIG. 15B

| | | OPTIONAL FUNCTION | |
|---|---|---|---|
| ISSUE | | | |
| ORIGIN | DESTINATION | FUNCTION NAME | FUNCTION |
| PRINT CONTROLLER | STORAGE | CDPS_PartialJobData | ACQUIRE A PART OF AN IMAGE OF JPEG OR THE LIKE FROM STORAGE |

F I G. 36
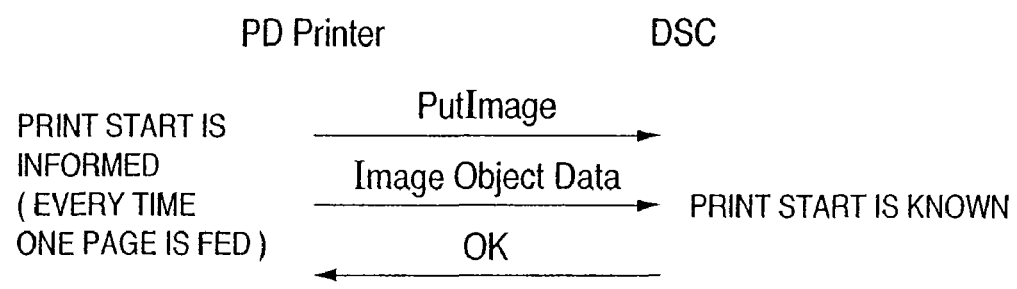
RETURNED VALUE IS " TRUE " OR " FALSE "

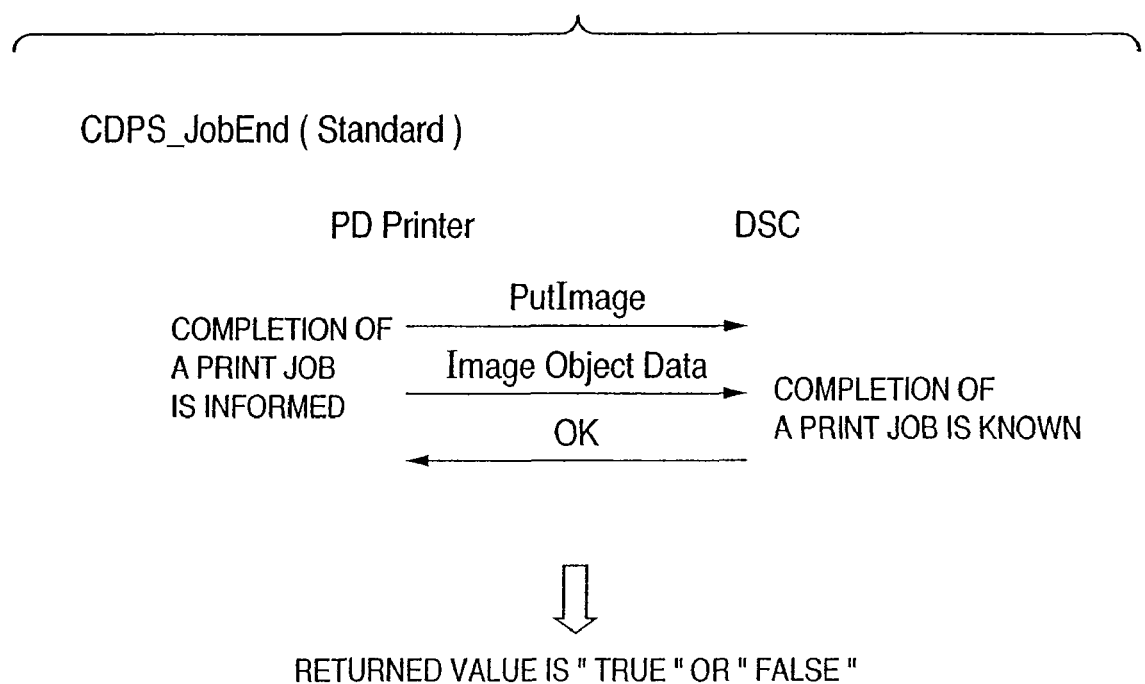
F I G. 38

FIG. 44A  SUPPORTED LEVELS BY OPERATION CONTROLLER

| 4 | Use DSC's |
|---|---|
| 3 | Viewer & Button |
| 2 | Button |
| 1 | Minimum |
| 0 | No Support |

FIG. 44B  SUPPORTED LEVELS BY STORAGE CONTROLLER

| 4 | Use DSC's |
|---|---|
| 3 | Handle |
| 2 | File System |
| 1 | Physical Access |
| 0 | No Support |

FIG. 44C  SUPPORTED LEVELS BY PRINT CONTROLLER

| 4 | Use DSC's |
|---|---|
| 3 | Rendering |
| 2 | Halftoning |
| 1 | Encoding |
| 0 | No Support |

RECORDING SYSTEM AND CONTROLLING METHOD THEREFOR

This is a continuation of U.S. patent application Ser. No. 10/608,023, filed Jun. 30, 2003, now pending.

FIELD OF THE INVENTION

The present invention relates to a recording system having an image supply device such as a digital camera and a recording device, and a controlling method therefor.

BACKGROUND OF THE INVENTION

In recent years, digital cameras (image sensing apparatuses) capable of photographing an image by a simple operation and converting the photographed image into digital image data have widely been used. To print an image photographed by this camera and use the print as a photograph, in general, after digital image data of the photographed image is temporarily inputted from the digital camera to a PC (computer) and undergoes image processing by the PC, the processed data is outputted from the PC to a color printer, which prints the data.

To the contrary, there have been recently developed color print systems capable of directly transferring digital image data from a digital camera to a color printer and printing the data without the mediacy of any PC, and so-called photo-direct (PD) printers capable of directly mounting in a color printer a memory card which is mounted in a digital camera and stores a sensed image, and printing the photographed image stored in the memory card.

Particularly when image data is directly transmitted to a printer from a digital camera and the data is printed, since digital cameras vary in specification and operating method from vendor to vendor, photo-direct printers compatible with digital cameras of various vendors have been demanded. Further, in addition to the above digital cameras, such photo-direct printers are considered to receive image data from mobile telephones, PDAs, and the other devices and print the data, and the printers have various functions. hence, the capabilities of the devices cannot be predicted from each other and thus it is necessary to exchange function information with each other.

SUMMARY OF THE INVENTION

The present invention has been devised in view of the conventional art. A feature of the present invention is to provide a recording system and a controlling method therefore whereby image data from an image supply device of each vendor can be recorded by transferring image data not depending upon any interfaces and providing an instruction to record the image data.

Moreover, a feature of the present invention is to provide a recording system and a controlling method therefore whereby a standard communication protocol between an image supply device and a recording device is defined and recording can be performed without depending upon the model and the vendor.

According to the present invention, there is providing a recording system for directly connecting an image supply device and a recording device via a general interface, transmitting image data to the recording device from the image supply device, and recording the data, the recording system comprising:

assignment means for establishing a communication procedure by using applications installed into the recording device and the image supply device, and assigning each of a plurality of functions to either the image supply device or the recording device, the functions serving as the recording system; and record control means for transferring data and a command between the functions assigned to the image supply device and the recording device by the assignment means, and performing recording operation by using the recording device based on image data supplied from the image supply device.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 11 is a flowchart for explaining the outline of processing from the time when the PD printer and the DSC are connected to the time when the CDPS is started according to the present embodiment;

FIG. 12 depicts a diagram showing an example of function sharing (assignment) between the DSC and the PD printer in the CDPS according to the present embodiment;

FIG. 13 depicts a diagram showing an example of function sharing (assignment) between the DSC and the PD printer in the CDPS according to the present embodiment;

FIG. 14 depicts a diagram showing an example of function sharing (assignment) between the DSC and the PD printer in the CDPS according to the present embodiment, the DSC being handled as a mass storage;

FIGS. 15A and 15B depict diagrams for explaining the function commands in the CDPS according to the present embodiment;

FIG. 36 depicts a diagram for explaining a communication protocol of providing notification of print start in Bluetooth;

FIG. 38 depicts a diagram for explaining a communication protocol for providing notification of the completion of a print job in Bluetooth;

FIGS. 44A to 44C depict diagrams for explaining the support levels of the DSC and the PD printer, the support levels being used as references for determining sharing (assignment) of various control functions (operation controller, storage controller, and print controller).

DETAILED DESCRIPTION OF THE PREFERRED EMBODIMENTS

The following will describe the detail of a preferred embodiment of the present invention with reference to the accompanying drawings.

Figure 1:
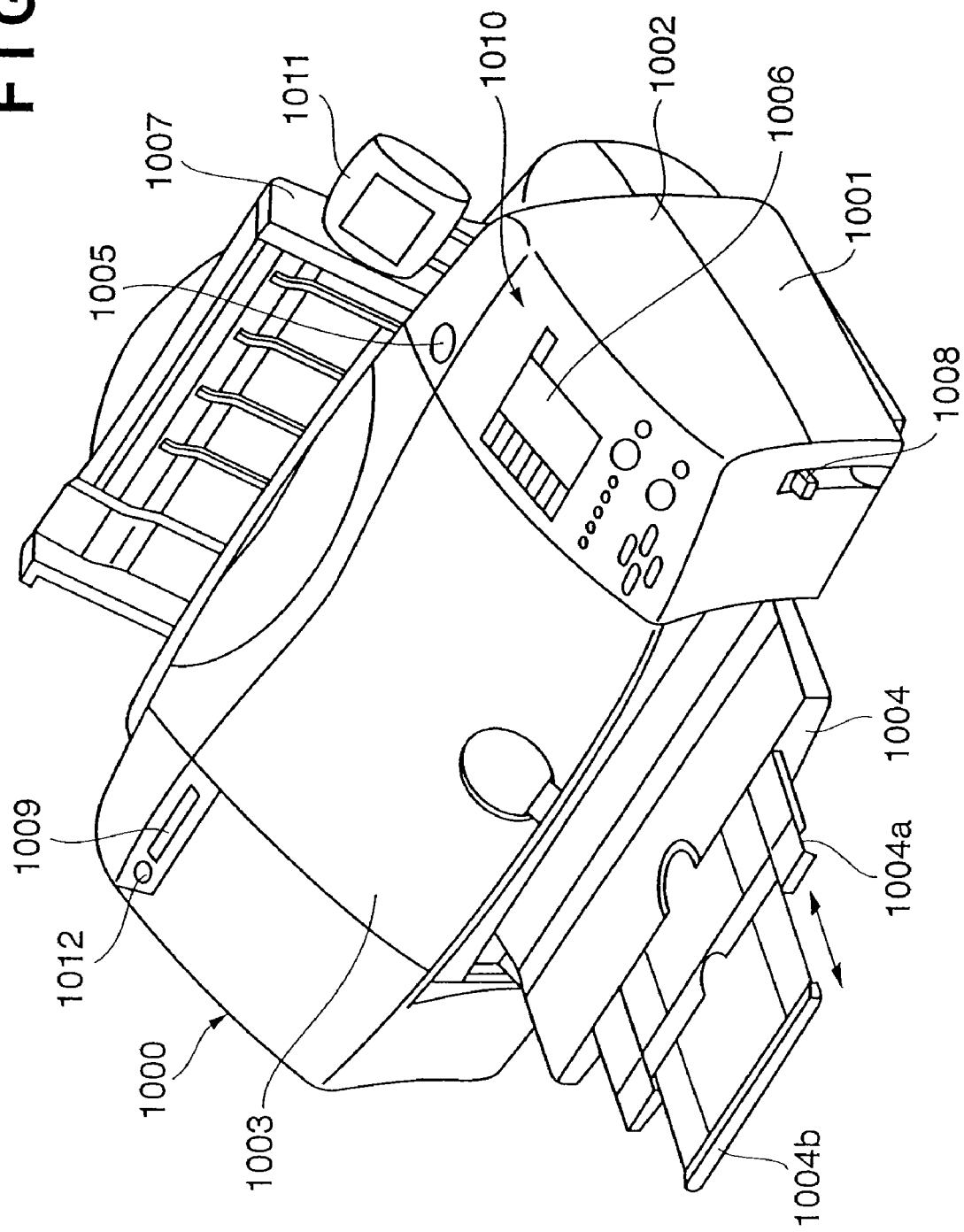
FIG. 1 depicts a schematic perspective view showing a PD printer according to an embodiment of the present invention.

FIG. 1 is a perspective view schematically showing a photo-direct printer (hereinafter, referred to as a PD printer) 1000 according to the embodiment of the present invention. The PD printer 1000 has a typical PC printer function of receiving data from a host computer (PC) and printing the data, and a function of directly reading image data stored in a storage medium such as a memory card and printing the image data or receiving image data from a digital camera and printing the image data.

In FIG. 1, a main body constituting the casing of the PD printer 1000 according to the present embodiment has casing members of a case M1001, an upper case 1002, an access cover 1003, and a discharge tray 1004. Further, the lower case 1001 substantially forms the lower half of the PD printer 1000 and the upper case 1002 substantially forms the upper half of the main body. The combination of the cases forms a hollow structure having a storage space for storing mechanisms, which will be described later. Openings are formed respectively on the upper surface and the front surface. Moreover, the discharge tray 1004 has one end rotatably held by the lower case 1001, and the opening formed on the front surface of the lower case 1001 can be opened/closed by the rotation. Thus, when a printing operation is performed, the discharge tray 1004 is rotated toward the front surface to open the opening, so that print sheets can be discharged from the opening and the discharged print sheets can be sequentially stacked. Further, two auxiliary trays 1004a and 1004b are accommodated in the discharge tray 1004. These trays are pulled out when necessary so as to enlarge/reduce a paper support area in three stages.

The access cover 1003 has one end rotatably held by the upper case 1002 so as to open/close the opening formed on the upper surface. A print head cartridge (not shown) stored in the main body, an ink tank (not shown), or the like can be exchanged by opening the access cover 1003. Besides, although not shown, when the access cover 1003 is opened/closed, a protrusion formed on the back rotates a cover opening/closing lever. The rotating position of the lever is detected by a microswitch or the like, so that the open/closed state of the access cover 1003 can be detected.

Further, a power key 1005 is provided on the upper surface of the upper case 1002. Moreover, an operation panel 1010 having a liquid crystal display 1006, various key switches, or the like is provided on the right side of the upper case 1002. The structure of the operation panel 1010 will be described later in detail with reference to FIG. 2. Reference numeral 1007 denotes an automatic feeder which automatically feeds print sheets into the main body of the printer. Reference numeral 1008 denotes a paper interval selection lever for adjusting an interval between the print head and the print sheet. Reference numeral 1009 denotes a card slot into which an adapter capable of mounting a memory card is inserted. Image data stored in the memory card can be directly received and printed via the adapter. The memory card (PC) includes a Compact Flash Memory™, Smart Media™, and memory stick. Reference numeral 1011 denotes a viewer (liquid crystal display) which is detachable from the main body of the PD printer 1000 and is used to display an image of one frame, an index image, or the like when images stored in the PC card are searched for an image to be printed. Reference numeral 1012 denotes a USB terminal for connecting a digital camera, which will be described later. Moreover, a USB connector for connecting a personal computer (PC) is provided on the rear surface of the PD printer 1000.

Figure 2:
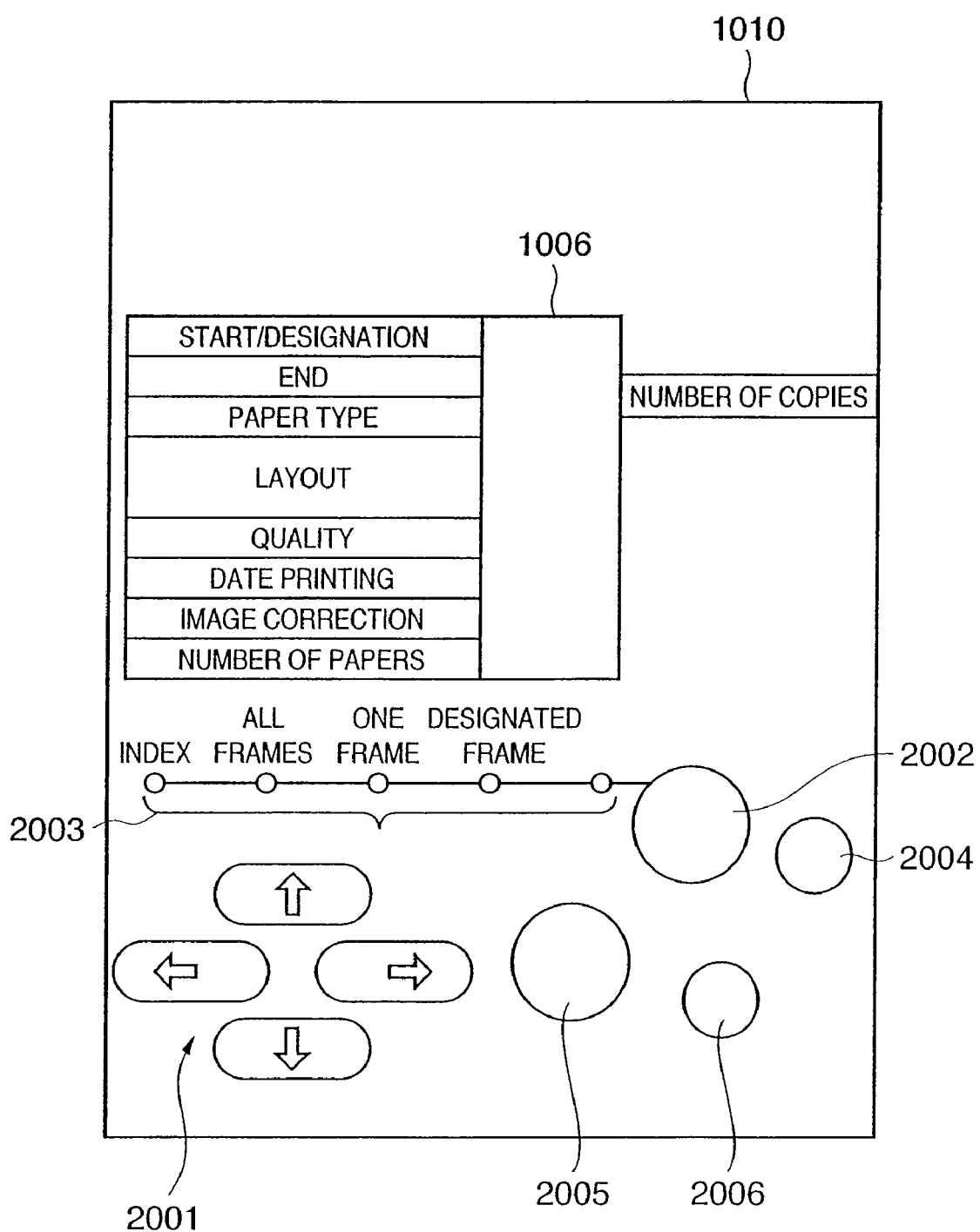
FIG. 2 depicts a schematic view showing the operation panel of the PD printer according to the present embodiment.

FIG. 2 is a schematic view showing the operation panel 1010 of the PD printer 1000 according to the present embodiment.

In FIG. 2, the liquid crystal display 1006 displays menu items for various settings of data on items printed on the right and left of the display 1006. The displayed items are, for example, the first photograph number of images (photographs) to be printed, a designated frame number (start frame designation/print frame designation), the last (end) photograph number of the images, the number of prints (number of copies), the type of paper (print sheet) used for printing (paper type), setting of the number of photographs to be printed on one paper (layout), designation of the print quality (quality), designation whether or not a photographing date should be printed (date printing), designation whether or not the photograph should be corrected and printed, and display of the number of paper sheets necessary for printing (number of paper sheets). These items are selected or designated by using cursor keys 2001. Reference numeral 2002 denotes a mode key which can switch the type of printing (index printing, printing of all frames, printing of one frame, or the like) every time the key 2002 is pressed. A corresponding one of LEDs 2003 is turned on accordingly. Reference numeral 2004 denotes a maintenance key for performing printer maintenance including cleaning of the printer head. Reference numeral 2005 denotes a print start key which is pressed to designate the start of printing or establish the setting of maintenance. Reference numeral 2006 denotes a print stop key which is pressed to stop printing or designate the stop of maintenance.

Figure 3:
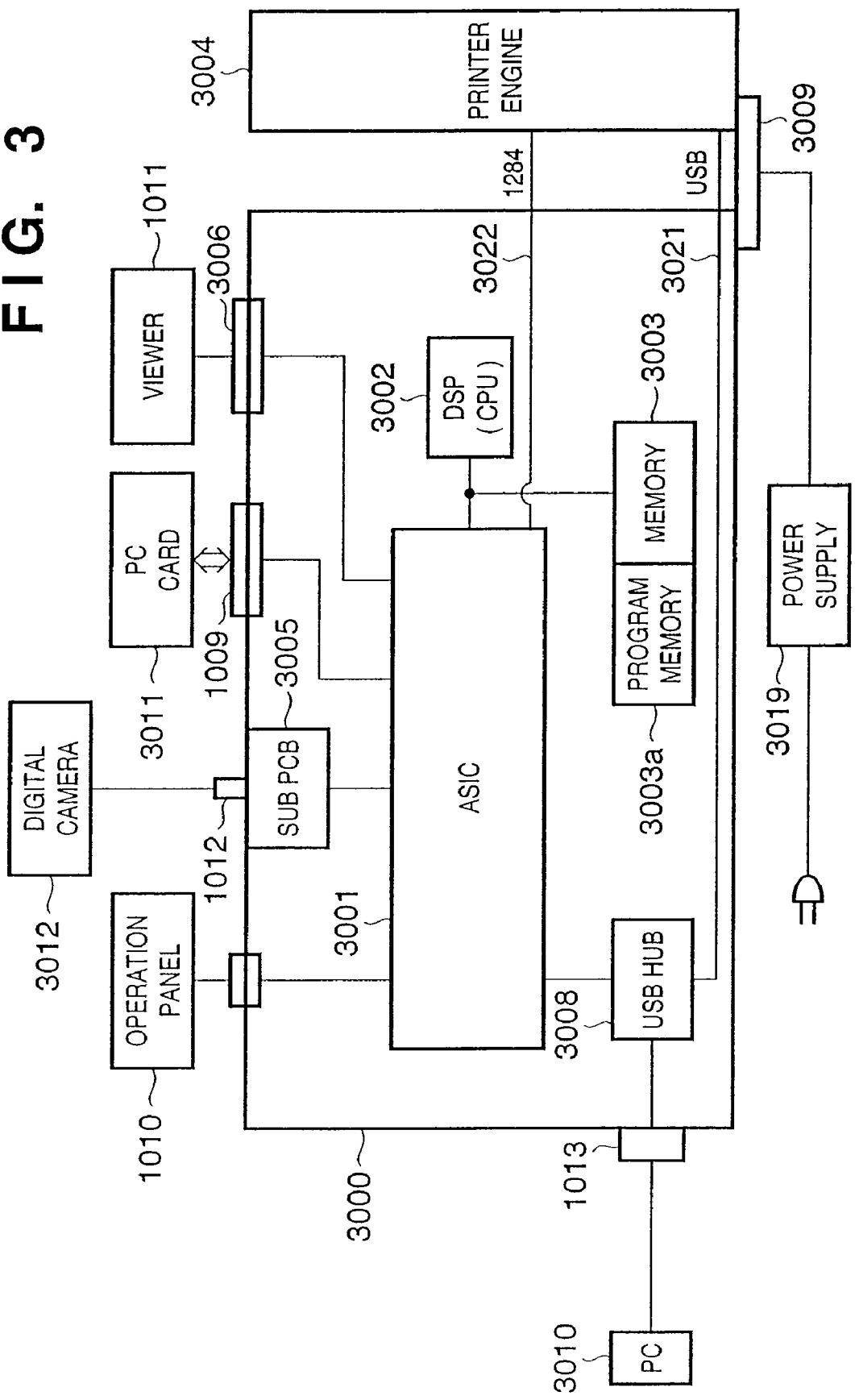
FIG. 3 is a block diagram showing the arrangement of a main part concerning control of the PD printer according to the present embodiment.

Referring to FIG. 3, the following will discuss the configuration of a main part concerning control of the PD printer 1000 according to the present embodiment. Besides, in FIG. 3, the same parts as those of the above drawings are indicated by the same reference numerals and the description thereof is omitted.

In FIG. 3, reference numeral 3000 denotes a controller (control board). Reference numeral 3001 denotes an ASIC (application specific LSI) whose configuration will be described in detail later with reference to the block diagram of FIG. 4. Reference numeral 3002 denotes a DSP (Digital Signal Processor) which incorporates a CPU and performs various kinds of control, which will be described later, and image processing such as conversion from a luminance signal (RGB) to a density signal (CMYK), scaling, gamma conversion, and error diffusion. Reference numeral 3003 denotes a memory which has a program memory 3003a for storing the control program of the CPU of the DSP 3002, a RAM area for storing a program in running, and a memory area which serves as a work memory for storing image data or the like. Reference numeral 3004 denotes a printer engine. The present embodiment incorporates an ink-jet printer type printer engine for printing a color image using a plurality of color inks. Reference numeral 3005 denotes a USB connector serving as a port for connecting a digital camera (DSC) 3012. Reference numeral 3006 denotes a connector for connecting a viewer 1011. Reference numeral 3008 denotes a USB hub (USB HUB) which transmits data from a PC 3010 as it is and outputs the data to the printer engine 3004 via a USB 3021 when PD printer 1000 performs printing based on image data from the PC 3010. Thus, the connected PC 3010 can directly exchange data and signals with the printer engine 3004 and perform printing (serves as a typical PC printer). Reference numeral 3009 denotes a power connector which receives from a power supply 3019 a DC voltage converted from a commercial AC voltage. Reference numeral PC 3010 denotes a typical personal computer, reference numeral 3011 denotes a memory card (PC card) described above, and reference numeral 3012 denotes a digital camera (DSC: Digital Still Camera).

Besides, signals are exchanged between the controller 3000 and the printer engine 3004 via the above USB 3021 or an IEEE 1284 bus 3022.

Figure 4:
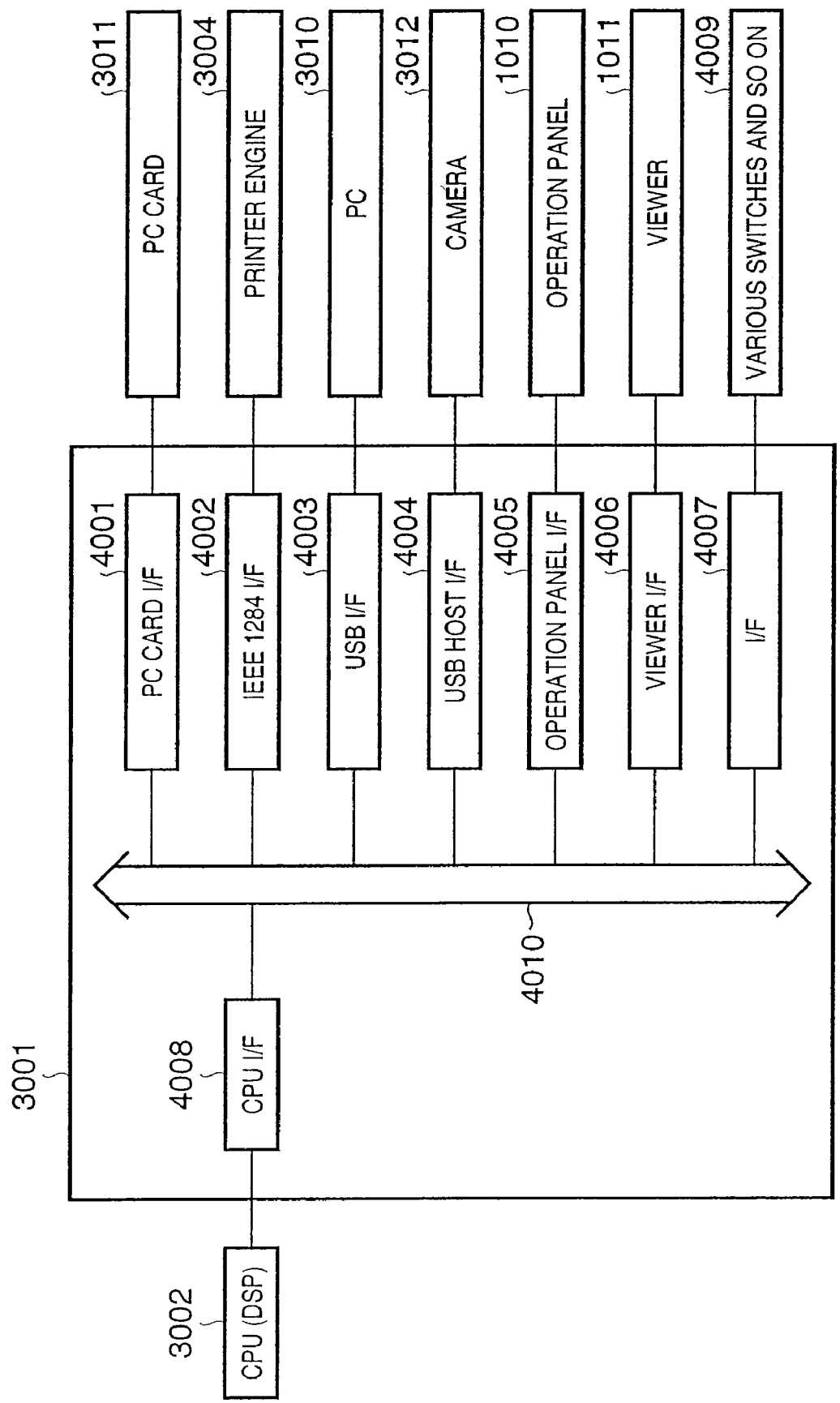
FIG. 4 is a block diagram showing the ASIC arrangement of the PD printer according to the present embodiment.

FIG. 4 is a block diagram showing the configuration of the ASIC 3001. Also in FIG. 4, the same parts as those of the above drawings are indicated by the same reference numerals and the description thereof is omitted.

Reference numeral 4001 denotes a PC card interface which reads image data stored in the mounted PC card 3011 or writes data into the PC card 3011. Reference numeral 4002 denotes an IEEE 1284 interface which exchanges data with the printer engine 3004. The IEEE 1284 interface 4002 is a bus used when image data stored in the digital camera 3012 or the PC card 3011 is printed. Reference numeral 4003 denotes a USB interface which exchanges data with the PC 3010. Reference numeral 4004 denotes a USB host interface which exchanges data with the digital camera 3012. Reference numeral 4005 denotes an operation panel interface which receives various operation signals from the operation panel 1010 and outputs display data to the display 1006. Reference numeral 4006 denotes a viewer interface which controls display of image data on the viewer 1011. Reference numeral 4007 denotes an interface which controls an interface between various switches and LEDs 4009 or the like. Reference numeral 4008 denotes a CPU interface which controls data exchange with the DSP 3002. Reference numeral 4010 denotes an internal bus (ASIC bus) for connecting these parts.

Figure 5:
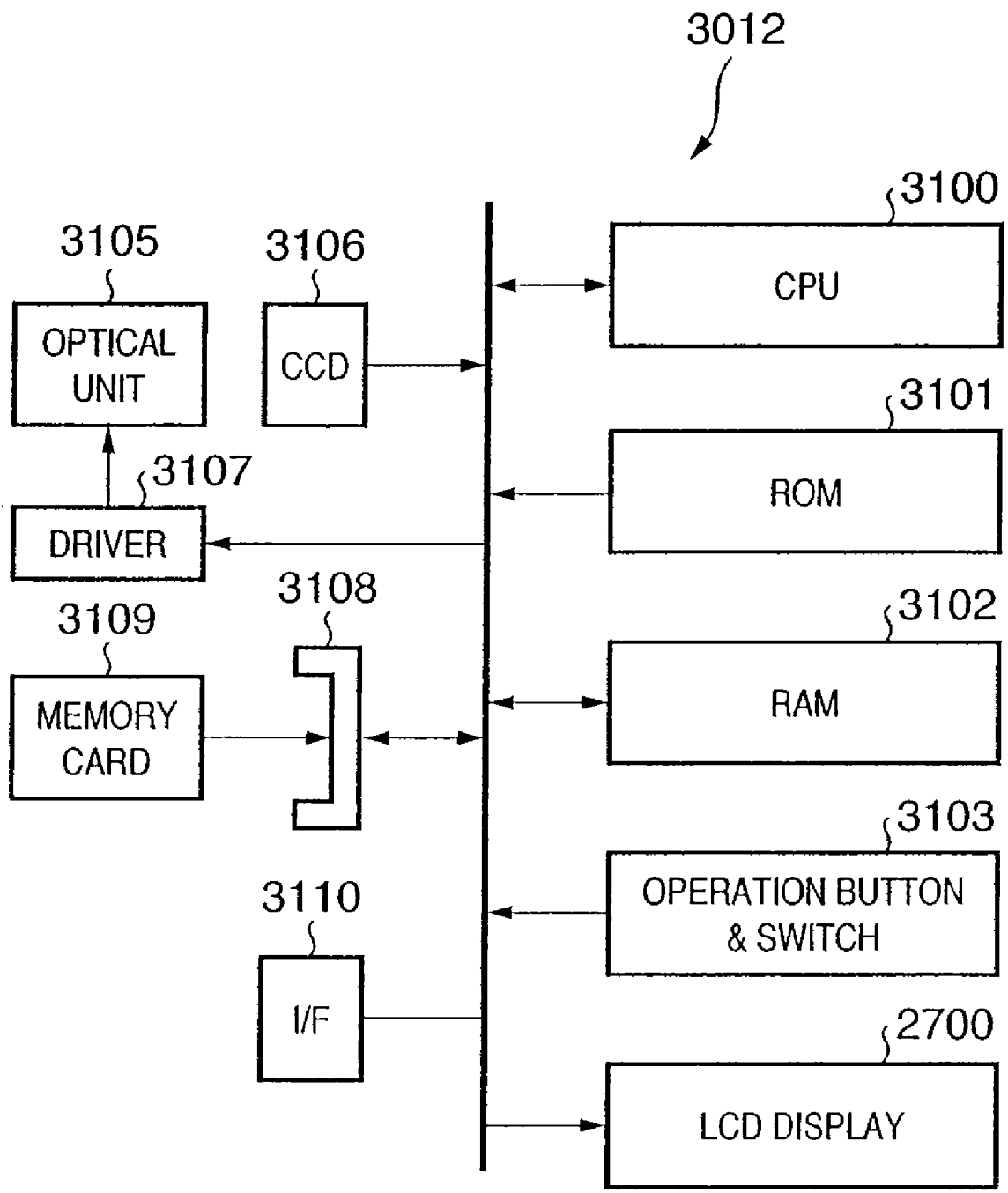
FIG. 5 is a block diagram showing the arrangement of a digital camera according to the present embodiment.

FIG. 5 is a block diagram showing a representative structural example of the DSC 3012 according to the embodiment of the present invention. However, some digital cameras connectable to the PD printer 1000 of the present embodiment may not include a display 2700, which will be described later.

In FIG. 5, reference numeral 3100 denotes a CPU for controlling the overall DSC, and reference numeral 3101 denotes a ROM for storing the processing procedures (programs) of the CPU 3100. Reference numeral 3102 denotes a RAM which is used as a work area of the CPU 3100, and reference numeral 3103 denotes switches which are used for various operations and include various switches, cursor keys, and the like. Reference numeral 2700 denotes the liquid crystal display which is used for confirming a sensed image and displaying a menu for various settings. Reference numeral 3105 denotes an optical unit which is mainly composed of a lens and its driving system. Reference numeral 3106 denotes a CCD element, and reference numeral 3107 denotes a driver which drives and controls the optical unit 3105 under the control of the CPU 3100. Reference numeral 3108 denotes a connector for connecting a storage medium 3109 (Compact Flash™ memory card, smart medium, or the like), and reference numeral 3110 denotes a USB interface (USB slave side) for making connection with a PC or the PD printer 1000 of the embodiment.

The present embodiment will mainly describe the case where the above PD printer 1000 and DSC 3012 are connected and printing is performed. Digital cameras of various vendors and devices (DSPD: Digital Still Photography Devices) such as portable telephones and memory devices are connected to an image output device such as the PD printer 1000, and printing is performed based on image data acquired therefrom. The present embodiment has as its object to provide the provision of a communication between a PD printer and the DSPD. The following will describe a communication protocol in the case where the PD printer 1000 of the present embodiment and these DSPDs are connected to one another and printing is performed. Additionally, in the present embodiment, a new CDPS (Canon Direct Print Service) is proposed in which communication control between the PD printer and the DSPD is performed using a general file and a general format without depending upon any interfaces.

In this case, the concept of a print service function is used to determine various communication protocol architectures, for example, PTP (Still Image Class) and Mass Storage Class on USB, OBEX on Blue Tooth, UPnP or the like between the DSPD and the image output device. The print service function is a set of executing functions in an application layer and does not depend upon various interfaces.

Moreover, since communication control between actual image data and devices is performed using the general file and the general format (e.g., described in XML format), the control does not depend upon any interfaces.

In such a system connecting the DSPD and the image output device, the operation is performed by using one of operation parts (e.g., a liquid crystal screen of a digital camera or an operating part on a printer). In consideration of the overall system, when both of the devices have the similar functions, it is necessary to determine which operation part of the devices should be used. Hence, the system of the present embodiment uses a mechanism for determining how the operation parts and other functions should be assigned to the devices after Discovery processing (transition), which will be described later, so that the versatility increases.

[Communication Outline]

Figure 6:
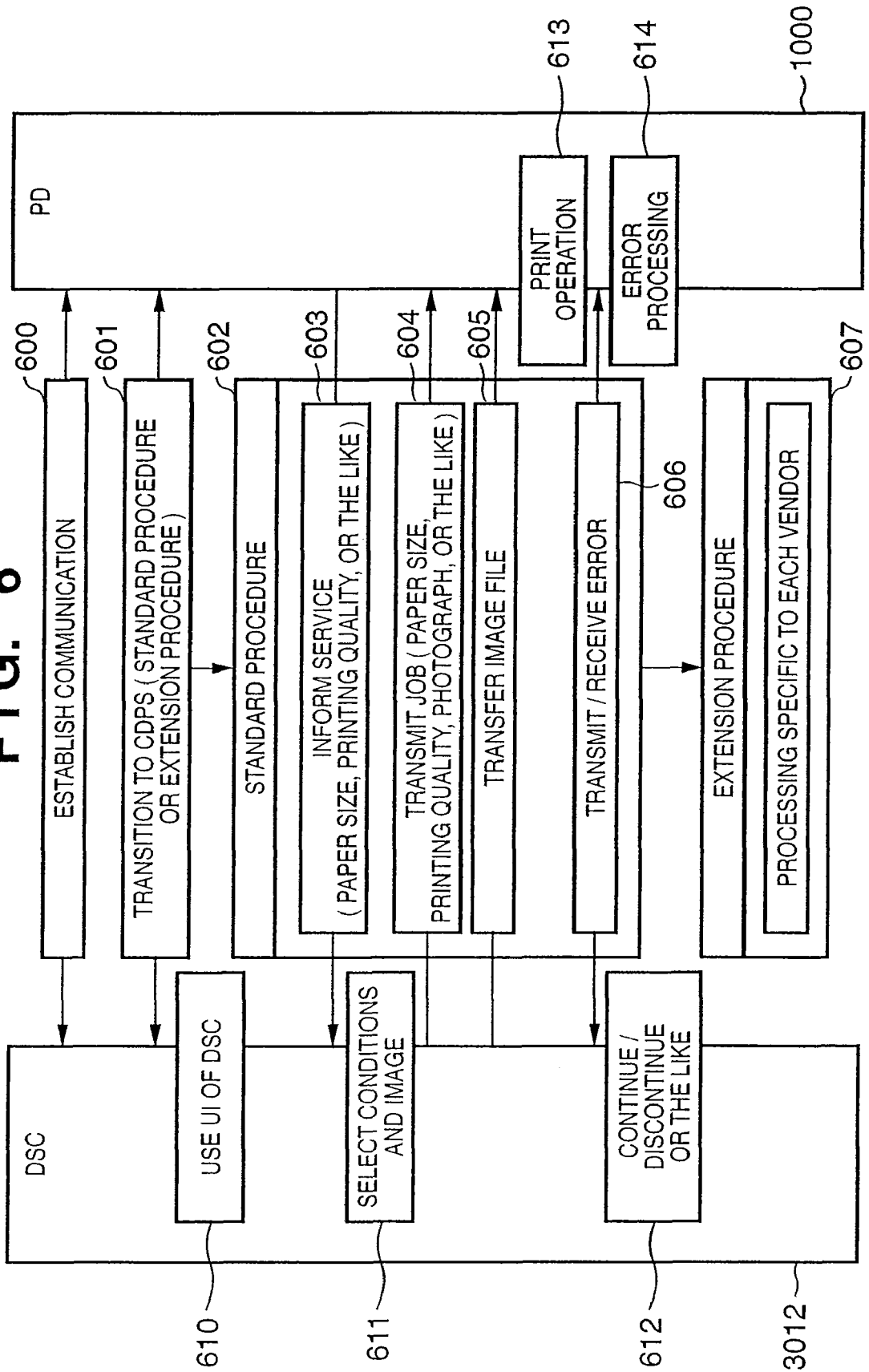
FIG. 6 depicts a diagram for explaining the outline of CDPS communication procedures according to the present embodiment.

FIG. 6 depicts a diagram for explaining the communication outline between the digital camera (DSC) 3012, which is a representative device of DSPD, and the PD printer 1000, which is a representative example of the image output device according to the present embodiment. In this configuration, the DSC 3012 and the PD printer 1000 are connected to each other via USB and communication is performed using PTP. On this USB connection, the PD printer 1000 is placed on the host side and the DSC 3012 is placed on the slave side.

Hereinafter, the procedures will be described one by one. Besides, the following will describe an example in which the DSC 3012 has the configuration of FIG. 5 described above and the DSC 3012 sets a printed image and printing conditions, and provides an instruction to start printing.

(1) First, the DSC 3012 and the PD printer 1000 are physically connected to each other via a USB cable.
(2) Then, the USB host controller (USB task) of the PD printer 1000 recognizes the DSC 3012 and makes connection in image class PTP. This state is equivalent to "establishment of communication" indicated by reference numeral 600 in FIG. 6.
(3) Subsequently, the procedure advances to processing (601) for making a transition for the PD printer 1000 to communication protocols (CDPS) defined in the present embodiment. At this point, based on information exchange between the DSC 3012 and the PD printer 1000, it is determined whether or not CDPS service is executable between the DSC 3012 and the PD printer 1000. When the service is executable, it is confirmed and determined which of "standard" and "extension" procedures is performed (610). Further, in this processing 601, it is also decided which of the DSC 3012 and the PD printer 1000 should determine a printed image, set printing conditions, and provide an instruction to start printing.
(4) As a result of the processing 601, when the service of a "standard" procedure 602 is performed, the PD printer 1000 notifies the DSC 3012 of "service available on the printer side" (603). To be specific, the service includes paper sizes, paper types, printing quality, and possible combinations on a layout that are supported by the PD printer 1000.
(5) In the DSC 3012, in accordance with the service contents transmitted in 603, a UI menu operated by the user is produced and is displayed on the display 2700. Thus, the user sets an image to be printed and selects printing conditions and photographs (collectively referred to as a "job") via the UI menu (611).
(6) In this way, when the setting of the "job" is completed and the user provides an instruction to start printing in the DSC 3012, the "job" is informed from the DSC 3012 to the printer 1000 (604).
(7) Subsequently, after the PD printer 1000 is set according to the contents of the "job" transmitted in 604, the PD printer 1000 acquires a necessary image file from the DSC 3012 (605) and prints photographs (613).
(8) When an error arises in the PD printer 1000 during execution of the "job", the DSC 3012 is informed of the contents of the error and the user is requested to handle the error (606) (in the present embodiment, "continuation/stop of printing" is selected). In this way, when the user uses the UI menu of the DSC 3012 to determine the handling (continuation or stop of printing) (612), the contents are transmitted to the PD printer 1000 and corresponding error handling 614 is performed.
(9) In this way, when the transfer of an image file and the printing operation (→transmission/reception of an error) are repeated and the "job" is completed, a return is again made to the "job" setting state (611) in the DSC 3012.
(10) Further, in the above 610, when it is decided that the service of "extension procedure." of the CDPS is performed, procedures for each vendor and "extension" are performed in 607. Additionally, since the processing of the "extension procedure" is specified for each vendor, the explanation thereof is omitted.

[Hierarchical Structure]

Figure 7:
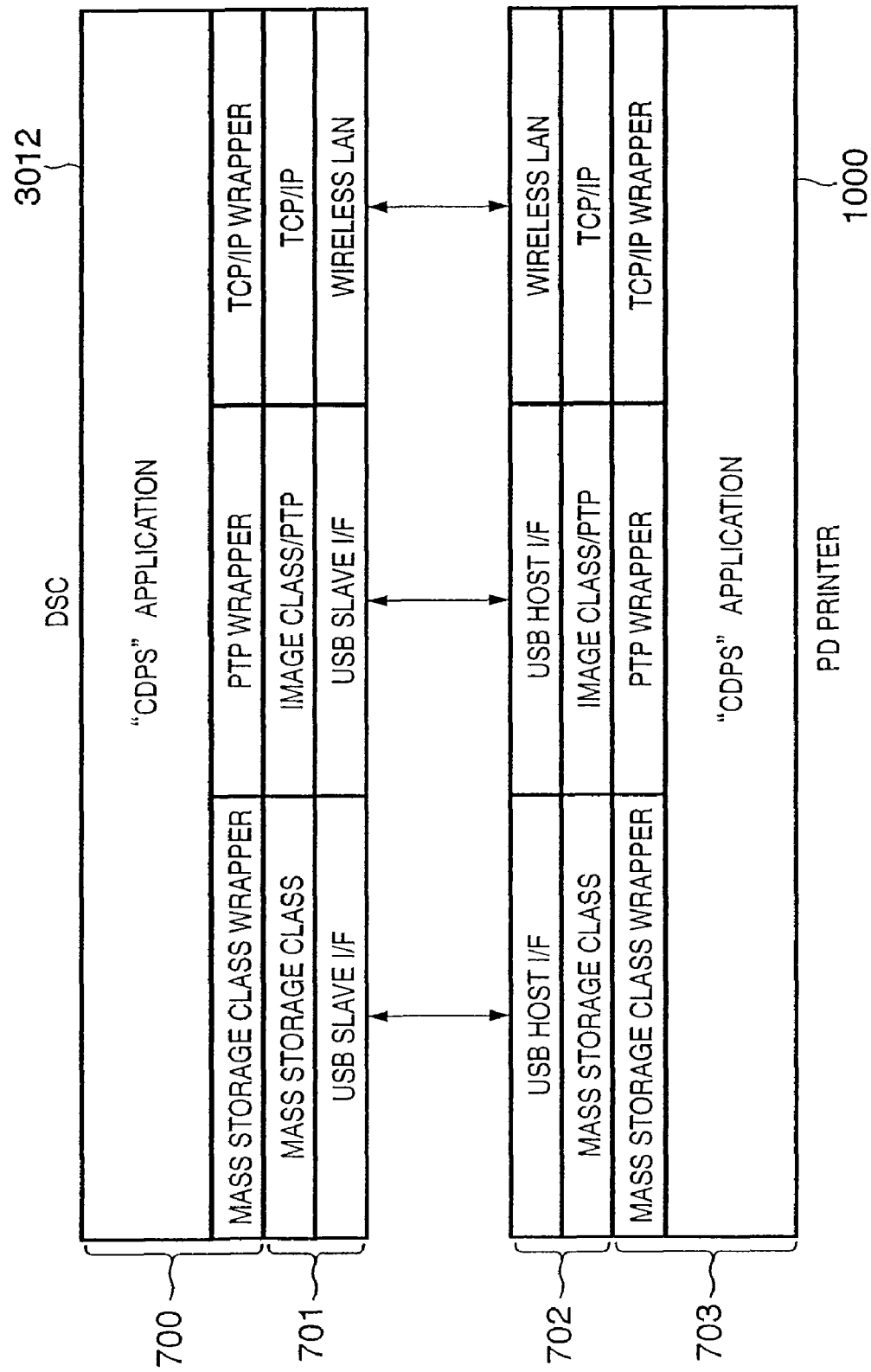
FIG. 7 depicts a conceptual view for explaining the interfaces and software arrangement of the PD printer and the digital camera that have CDPS according to the present embodiment.

FIG. 7 is a diagram showing the hierarchical structure of functions when the DSC 3012 representing the DSPD and the PD printer 1000 representing the image output device are connected to each other.

In FIG. 7, reference numerals 700 and 703 denote applications, reference numerals 701 and 702 denote physical layers, which are the examples of USB and Bluetooth in this case. The DSC 3012 and the PD printer 1000 can constitute the CDPS system by respectively incorporating (applications) indicated by 700 and 703. However, as shown in 701 and 702, it is assumed that an architecture is mounted which includes PTP and BIP on a protocol layer and a file system on MSC (Mass Storage Class). Further, the applications 700 and 703 includes the substance of the print service function, and the print service function is performed on parts converted from the CDPS to the respective protocols.

In this way, it is possible to achieve direct print service without depending upon any physical interfaces.

[Function of the Overall System]

Figure 8:
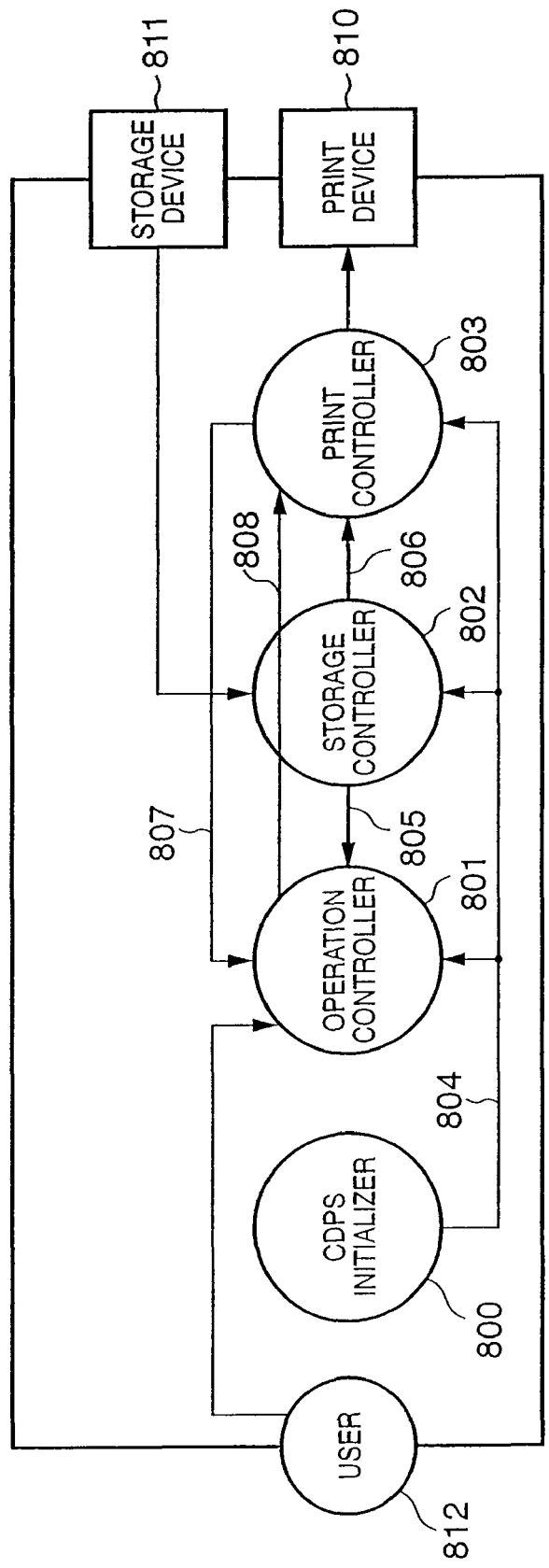
FIG. 8 depicts a conceptual view showing the service functions in the CDPS according to the present embodiment.

FIG. 8 is a diagram showing a functional constitution when the DSPD and the image output device described above are connected and are regarded as an integrated system.

Subsequent to specification that the hierarchical structure does not depend upon any interfaces, in order to achieve independence of "functions" of the DSPDs and the image output device, elements (objects) are defined at a higher level. In the present embodiment, various functions are not divided or assigned between the DSPD and an image forming device, and the definition and the role of the functional constitution elements required for the overall direct print system will be described below.

The functions of the overall system are roughly divided into four functions (800 to 803).

<CDPS Initializer>

CDPS initializer 800 is initially activated prior to the functions of the other CDPS. In this case, a transition (standard/extension) to a CDPS mode is decided and the decision result is informed to each of the functions as "Service Discovery" 804. This processing corresponds to 601 of FIG. 6.

<Operation Controller>

Management (Operation Controller) 801 on a UI part interacting with a user 812 receives "Service Discovery" 804 from the CDPS initializer 800 and is started. The operation controller 801 acquires "Service" 807, which can be printed by a print device 810 (printer engine 3004), from a print controller 803 and acquires an image information list "Data List" 805, which is stored in a storage device 811 such as the PC card 3011, from a storage controller 802. Then, the UI menu is produced based on the description of the "Service 807" and the "Data List" 805. According to the user's instructions inputted via the UI menu produced thus, an output setting instruction "Job" 808 is produced and is informed to the print controller 803.

<Storage Controller>

The storage controller 802 manages a storage medium for storing photographic images, for example, the PC card 3011. The storage controller 802 receives "Service Discovery" 804 from the CDPS initializer 800 and is activated. Further, according to a request from the operation controller 801, the image information list "Data List" 805 stored in the storage device 811 is produced and is informed to the operation controller 801. Moreover, according to a request from the print controller 803, an image file "Job Data" 806 stored in the storage device 811 is transmitted to the print controller 803.

<Print Controller>

The print controller 803 manages the print device 810 for printing a photographic image. The print controller 803 receives the "Service Discovery" 804 from the CDPS initializer 800 and is activated, and the print controller 803 informs the operation controller 801 of the "Service" 807 which can be available by the print device 810. Besides, when the output setting instruction "Job" 808 is acquired from the operation controller 801, based on the description of the "Job" 808, the image file "Job Data" 806 stored in the storage device 811 is requested to the storage controller 802 and is acquired by a describing method described in the "Data List" 805. Print data processable by the print device 810 is produced based on the file "Job Data" 806 and is outputted to the print device 810, so that printing is performed.

Figure 9:
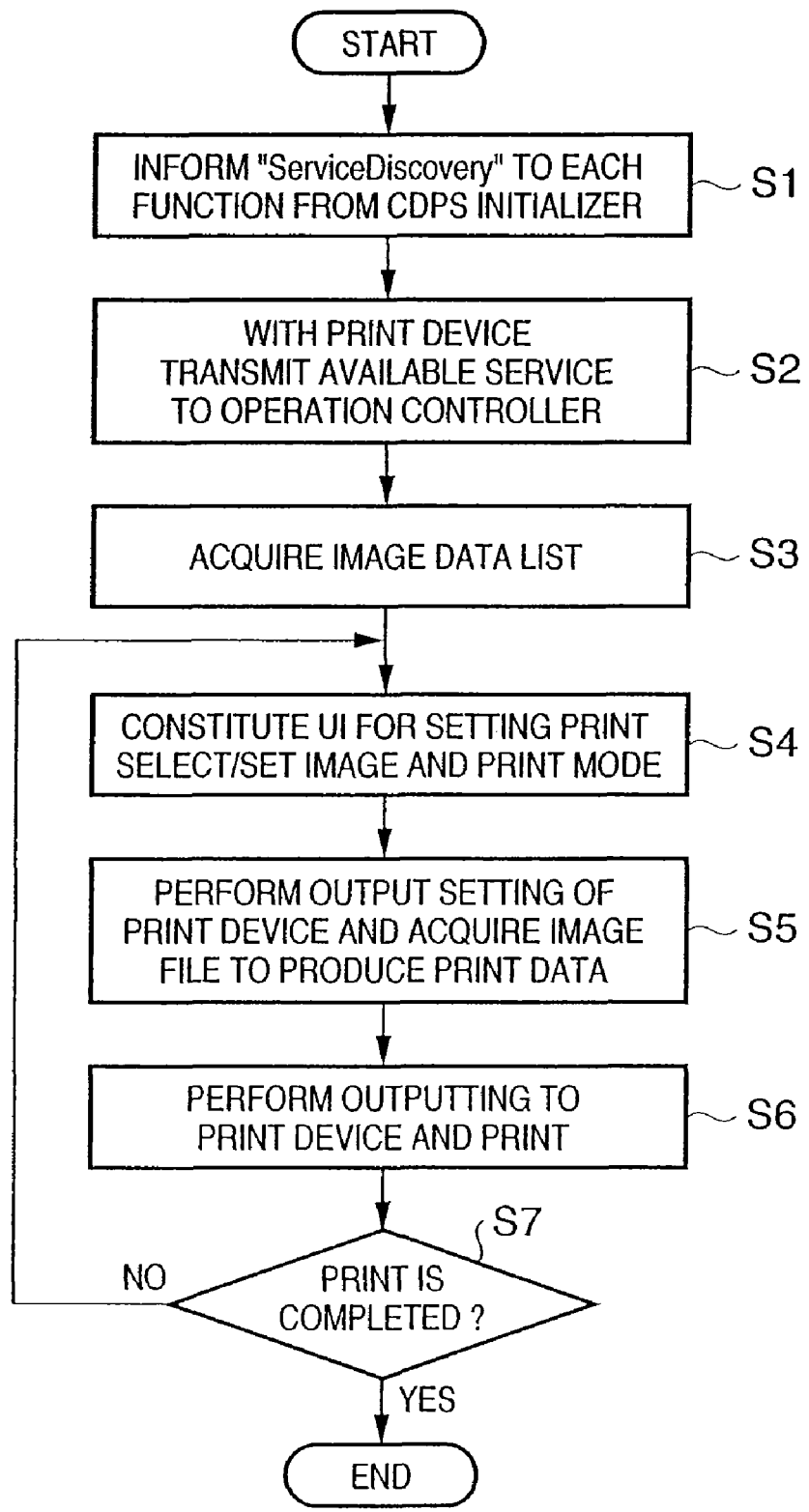
FIG. 9 is a flowchart for explaining the outline of processing up to printing in the CDPS according to the present embodiment.

FIG. 9 is a flowchart for explaining the flow of processing using the functions of FIG. 8.

Initially in step S1, it is determined whether or not the CDPS initializer 800 can make a transition to the CDPS mode. Based on the determination, the "Service Discovery" 804 is informed to the functions and the functions are activated. Then, the processing advances to step S2. The print controller 803 informs the operation controller 801 of the print service "Service" 807 which can be provided by the print device 810. Then, the processing advances to step S3, the operation controller 801 acquires the image information list "Data List" 805, which is stored in the storage device 811, from the storage controller 802. Subsequently, the processing advances to step S4, the operation controller 801 constitutes a UI for setting printing and displays the UI based on the "Service" 807 and the "Data List" 805. An image to be printed and the printing setting instruction "Job" 808 for specifying selection of a printing mode or the like are produced based on the user's instruction which is inputted according to the UI. The produced "Job" 808 is informed to the print controller 803 from the operation controller 801. Then, the processing advances to step S5, the print controller 803 sets printing of the print device 810 according to the description of the "Job" 808. Next, the image file "Job Data" 806, which is stored in the storage device 811 and is required for printing, is requested to the storage controller 802 and is acquired according to the describing method indicated in the "Data List" 805. Then, printing data processable by the print device 810 is produced. Next, the processing advances to step S6 and the printing data is outputted to the print device 810 and is printed therein. Then, in step S7, it is checked whether print end is instructed or not. When the print end instruction is not inputted, the processing returns to step S4 and the above processing is performed. When the end of printing is instructed, this processing is completed.

As described above, whether the above functions are present in the DSPD or the image output device, the above hierarchical structure, the four functions 800 to 803, and the five information sets 804 to 808 exchanged among the above four functions serve as fundamental configurations of the CDPS.

[CDPS Arrangement Constituted by the DSC and the Pd Printer]

Figure 10:
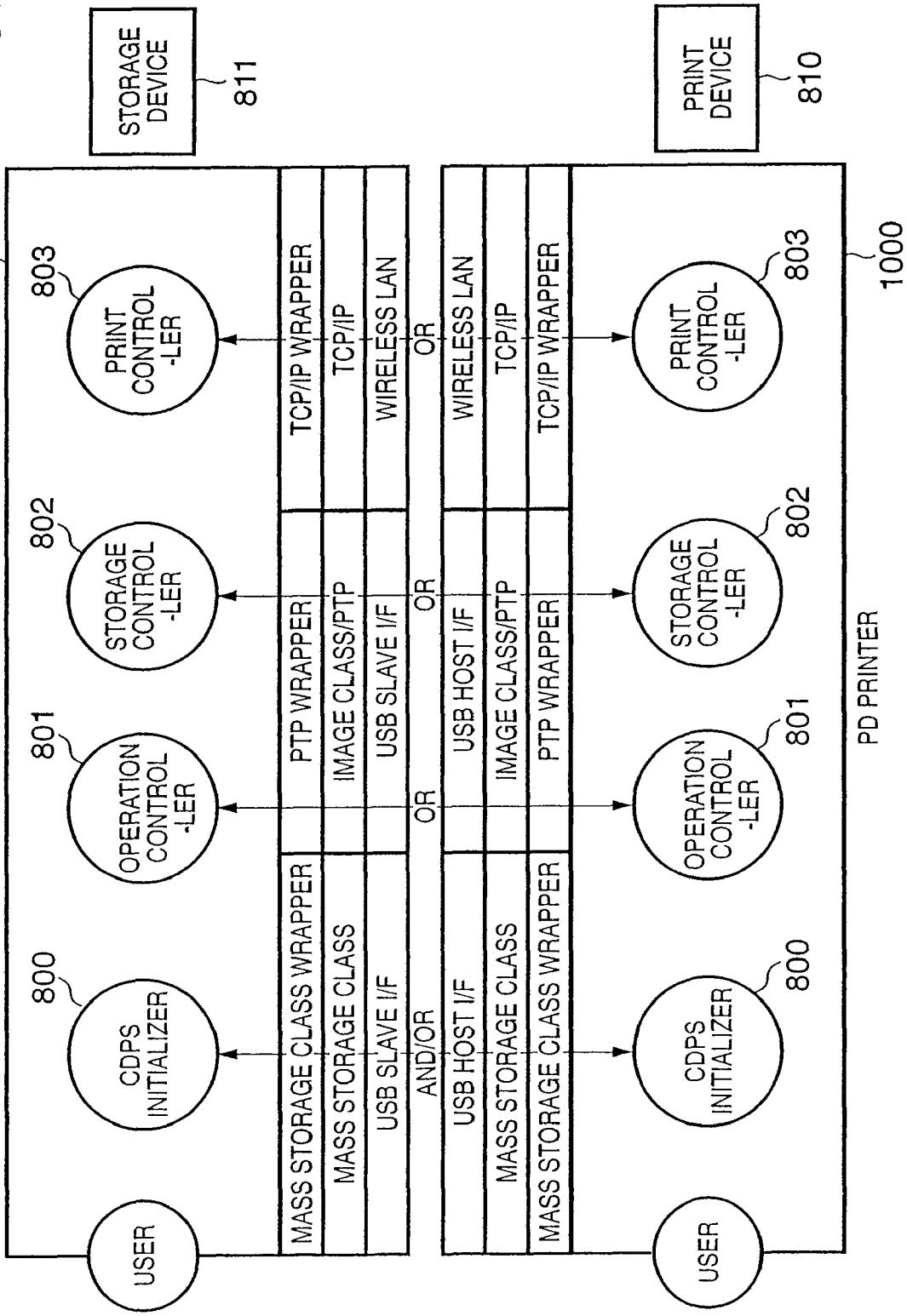
FIG. 10 depicts a conceptual view showing the service functions of a DSC and the PD printer in the CDPS according to the present embodiment.

FIG. 10 is a diagram showing an example of the CDPS arrangement in which the DSC 3012 and the PD printer 1000 are connected to each other. The diagram shows the case where the DSC 3012 and the PD printer 1000 both store the above four functions 800 to 803. In this case, the storage device 811 and the print device 810 are theoretically placed outside the CDPS system and it is not determined to which side the devices 811 and 812 are connected.

In the CDPS of the present embodiment, after the DSC 3012 and the printer 1000 are physically or theoretically connected to each other, the CDPS initializers 800 of both the DSC 3012 and the PD printer 1000 have interaction to determine which of the DSC 3012 and the PD printer 1000 should manage the other three functions of 801 to 803 and the processing functions of the storage device 811 and the print device 810.

FIG. 11 is a flowchart for explaining function sharing in the CDPS according to the present embodiment.

Initially in step S11, the support levels of the functions 800 to 803 in the DSC 3012 are informed to the PD printer 1000 from the DSC 3012. Then, the process advances to step S12. The PD printer 1000 compares the support levels of the functions received from the DSC 3012 with the support level of the PD printer 1000, determines which of the DSC 3012 and the PD printer 1000 has a function with higher availability for the user, and decides which of the DSC 3012 and the PD printer 1000 should take charge of the functions. Then, the process advances to step S13, the decided sharing information and management information of the functions are informed to the DSC 3012. Then, the process advances to step S14, in each of the DSC 3012 and the PD printer 1000, the functions determined to be performed by the DSC 3012 and the PD printer 1000 are activated, and the CDPS is started in step S15.

In the case where the "extension procedure" is performed, since it is found in step S12 that the DSC 3012 and the PD printer 1000 support the extension procedure and the subsequent data exchange is specific to each vendor, the explanation thereof is omitted.

Further, the functions are not necessarily supported by both of the DSC 3012 and the PD printer 1000. However, the functions need to be supported by at least one of the DSC 3012 and the PD printer 1000. Particularly regarding the CDPS initializer 800, even if the DSC 3012 does not support the CDPS initializer 800, the CDPS initializer 800 of the PD printer 1000 can make a transition of the system to the CDPS mode in some connecting states of the interfaces.

CDPS ARRANGEMENT EXAMPLE 1

FIG. 12 is a diagram for explaining arrangement example 1 of the CDPS when DSC 3012 and the PD printer 1000 are connected to each other by PTP (Picture Transfer Protocol) of Image Class on USB. The same parts as those of FIG. 8 and FIG. 10 are indicated by the same reference numerals and the explanation thereof is omitted. Moreover, the following will describe the case where the DSC 3012 having the liquid crystal display 2700 and the PD printer 1000 not having the liquid crystal viewer 1011, are connected to each other. Namely, in this example, the CDPS initializer 800, the operation controller 801, and the storage controller 802 are present in the DSC 3012, and the PD printer 1000 has the functional constitution of FIG. 12.

Initially, the CDPS initializer 800 of the PD printer 1000 tries to exchange information about the sharing (assignment) and management of the functions with the CDPS initializer 800 of the DSC 3012. In response to the information exchange, the DSC 3012 informs that the DSC 3012 supports the functions of the operation controller 801 and the storage controller 802 (the liquid crystal display 2700 is present, or the like). Thus, the CDPS initializer 800 of the PD printer 1000 makes a comparison with the support levels of the operation controller 801 and the storage controller 802 of the PD printer 1000 (the liquid crystal viewer 1011 is absent, or the like) and determines a system arrangement described below. Then, a response of "transition to the CDPS is possible" is made to the CDPS initializer 800 of the PD printer 1000 and the following determination of function sharing is informed to the DSC 3012:

(1) The DSC 3012 takes charge of and manages the operation controller 801 and the storage controller 802,
(2) The PD printer 1000 takes charge of and manages the print controller 803,
(3) The storage device 811 is provided in the DSC 3012 and the storage controller 802 of the DSC 3012 manages the storage device 811, and
(4) The print device 810 (printer engine 3004) is provided in the PD printer 1000 and the print controller 803 of the PD printer 1000 manages a printing operation.

Additionally, the above processing is similarly performed when connection is made via the other interfaces including TCP/IP of a wireless LAN.

CDPS ARRANGEMENT EXAMPLE 2

FIG. 13 is a diagram for explaining arrangement example 2 of the CDPS when DSC 3012 and the PD printer 1000 are connected to each other by PTP (Picture Transfer Protocol) of Image Class on USB. The same parts as those of FIG. 8 and FIG. 10 are indicated by the same reference numerals and the explanation thereof is omitted. Moreover, the following will describe the case where the DSC 3012 not having the liquid crystal display 2700 and the PD printer 1000 having the liquid crystal viewer 1011, are connected to each other, or an example where the DSC 3012 does not have the CDPS initializer 800. Besides, the PD printer 1000 has the functional constitution of FIG. 10.

When the CDPS initializer 800 of the PD printer 1000 tries to exchange information about sharing and management of the functions with the CDPS initializer of the DSC 3012, the DSC 3012 cannot make a response because of the absence of the CDPS initializer 800. Hence, a PTP Wrapper layer of the PD printer 1000 determines a system arrangement described below and makes a response of "transition to the CDPS is possible" to the CDPS initializer 800 of the PD printer 1000.

(1) The PD printer 1000 takes charge of and manages the operation controller 801, the storage controller 802, and the print controller 803.
(2) The storage device 811 is provided in the DSC 3012, and the storage controller 802 of the PD printer 1000 manages image access to the storage device 811 by using a standard PTP.
(3) The print device 810 is provided in the PD printer 1000 and is managed by the print controller 803 of the PD printer 1000.

In this case, in addition to the case where the DSC 3012 does not have the CDPS initializer 800, the arrangement of FIG. 13 is similarly provided in the case where the CDPS initializer 800 of the PD printer 1000 judges that the display 2700 of the DSC 3012 has lower resolution and the operability of the DSC is lower than that of the PD printer 1000 and the UI using the viewer 1011, even if the DSC 3012 has the display 2700.

CDPS ARRANGEMENT EXAMPLE 3

FIG. 14 is a diagram for explaining arrangement example 3 of the CDPS connected on MSC (Mass Storage Class). The same parts as those of FIG. 8 and FIG. 10 are indicated by the same reference numerals and the explanation thereof is omitted. Moreover, the following will describe an example in which the DSC 3012 not having the liquid crystal display

2700, as the MSC, is connected to the PD printer 1000 having the liquid crystal viewer 1011.

In this case, the CDPS initializer 800 of the PD printer 1000 tries to exchange information about sharing and management of the functions with the CDPS initializer 800 of the DSC 3012. However, it is quite difficult for the MSC of general bulk only type to bidirectionally exchange information with the DSC 3012. Therefore, the Mass Storage Class Wrapper layer 820 of the PD printer 1000 determines a system arrangement described below and makes a reply of "transition to the CDPS is possible" to the CDPS initializer 800 of the PD printer 1000.

(1) The PD printer 1000 takes charge of and manages all of the operation controller 801, the storage controller 802, and the print controller 803.
(2) The storage device 811 is provided in the DSC 3012 and is managed by the storage controller 802 of the PD printer 1000 as standard MSC.
(3) The print device 810 is provided in the PD printer 1000 and is managed by the print controller 803 of the PD printer 1000.

[CDPS Output Procedures]

The CDPS of the present embodiment has two kinds of output procedures as described below.

<Standard Procedure>

In the CDPS of the present embodiment, a procedure is defined according to the following functions and pieces of information:

CDPS Initialize function (CDPS Initializer)
Operation Control function (Operation Controller)
Storage Control function (Storage Controller)
Print Control function (Print Controller)
Service Discover information
Service information
Job information
Job Data information <Extension Procedure>

Regarding procedures supporting the outputs of various formats determined based on specifications unique to vendors, definition is made for each of the following languages and format:

XHTML
SVG
specific format

[Explanation of CDPS Function]

The CDPS of the present embodiment comprises print services shown in FIGS. 15A and 15B in order to optionally handle applications in a higher layer of PTP in both of the DSC 3012 and the PD printer 1000, that is, to perform modeling of functions between the DSC 3012 and the PD printer 1000 (e.g., the exchange of various information under PTP protocols including transmission/reception of objects is necessary to perform printing). In the application layers 700 and 703 of FIG. 7, direct printing can be performed basically by using the print service functions of FIGS. 15A and 15B. Additionally, the print service functions include necessary functions (FIG. 15A) and an optional function (FIG. 15B). Devices supporting the CDPS need to be provided with all the necessary functions.

FIGS. 15A and 15B depict diagrams showing lists of service functions of the CDPS according to the present embodiment. These functions will be described below one by one.

(a) CDPS_ServiceDiscovery (Service Discovery)

This function makes a transition to the CDPS. A returned value is a script which designates the "standard" or "extension" procedure, and the selected procedure is received.

Moreover, in the "extension" procedure, only the CDPS_ServiceDiscovery function is used.

(b) CDPS_Service (Print Controller 803→Operation Controller 801)

A script describing the functions of the PD printer is informed as a parameter.

The script describing the functions of the PD printer is used as an argument, and a returned value indicates a communication result, that is, "TRUE" or "FALSE" of communication.

(c) CDPS_PageStart (Print Controller 803→Operation Controller 801)

Print start is informed (every one page). A parameter is a script describing the print function, and a returned value indicates a communication result, that is, "TRUE" or "FALSE" of communication.

(d) CDPS_PageEnd (Print Controller 803→Operation Controller 801)

This function provides notification of print end (when pages are discharged one by one). A parameter is a script describing the print function, and a returned value indicates a communication result, that is, "TRUE" or "EALSE" of communication.

(e) CDPS_JobEnd (Print Controller 803→Operation Controller 801)

This function provides notification of the completion of a print job. A parameter is a script describing the print function, and a returned value indicates a communication result, that is, "TRUE" or "FALSE" of communication.

(f) CDPS_Error (Print Controller 803→Operation Controller 801)

This function provides notification of an error (Warning/Fatal). A parameter is a script describing the print function, and the returned value indicates a communication result, that is, "TRUE" or "FALSE" of communication.

(g) CDPS_JobData (Print Controller 803→Storage Controller 802)

This function acquires an image of JPEG or the like from the storage device 811. A script describing a handle name of image data to be acquired is used as an argument, and returned values are the number of bytes of acquired image data and image data themselves.

(h) CDPS_DataList (Operation Controller 801→Storage Controller 802)

This function acquires a list of image information of JPEG or the like from the storage device 811. A script describing the functions of the PD printer 1000 is used as an argument, and the returned value is a script describing a list of image data.

(i) CDPS_Job (Operation Controller 801→a Print Controller 803)

This function provides notification of a print command. A script describing a print command is used as an argument, and the returned value indicates a communication result, that is, "TRUE" or "FALSE" of communication.

(j) CDPS_JobAbort (Operation Controller 801→Print Controller 803)

This function provides notification of a print stop command. A script describing the functions of the printer is used as an argument, and a returned value indicates a communication result, that is, "TRUE" or "FALSE" of communication.

(k) CDPS_JobContinue (Operation Controller 801→Print Controller 803)

This function provides notification of a print restart command. A script describing the functions of the printer is used as an argument, and the returned value indicates a communication result, that is, "TRUE" or "FALSE" of communication.

The above functions are essential functions of the CDPS.

As shown in FIG. 15B, the CDPS further comprises a CDPS_PartialJobData function as an optional function.

The CDPS_PartialJobData (print controller 803→storage controller 802) is a function for acquiring image data of JPEG or the like from the storage device 811. A script describing the handle name of acquired image data is used as an argument, and the returned values are the number of bytes of the acquired image data and the image data themselves.

[Explanation of a Script Format]

The following will discuss the contents of a script used for the above Service Discovery (CDPS_ServiceDiscovery) and script formats used for the other functions.

<Format of Various Functional Commands>

(1) Script Format of Service Discovery (CDPS_ServiceDiscovery)

This format has the contents of the script (described in UniCode) used for the Service Discovery (CDPS_ServiceDiscovery) and is used for making a transition to the CDPS mode. The formats permit mutual recognition of keywords.

CanonDirectPrintService (UILevel=X) (device information, UI level information (X) ranges from 0 to 4)

CanonDirectPrintService (HostUI) (when the UI of the host (PD printer) is used) or CanonDirectPrintService (DeviceUI) (when the UI on the device (DSC) side is used)

(2) Script Formats of CDPS_PageStart, CDPS_PageEnd, CDPS_JobEnd, CDPS_DataList, CDPS_JobAbort, CDPS_JobContinue

```
<?XML version="1.0" encoding="UTF-16"?>
<!ELEMENT command
("CDPS_PageStart"|"CDPS_PageEnd"|"CDPS_JobEnd"|
"CDPS_JobAbort"|"CDPS_JobContinue")>
```

(3) Script Format of CDPS_Service

```
<?XML version="1.0" encoding="UTF-16"?>
<command (CDPS_Service)>
<capability>
<-- describe Printer Capability -->
</capability>
```

(4) Script Format of CDPS_Job

```
<?XML version="1.0" encoding="UTF-16"?>
<command (CDPS_Service)>
<job>
<capability>
<-- describe Printer Capability (PrintMode) -->
</capability>
<printlist>
<-- describe Image File Hnadle and additional
information such as date -->
</printlist>
</job>
```

(5) Script Format of CDPS_Error

```
<?XML version="1.0" encoding="UTF-16"?>
<command ("CDPS_Error")>
<!ELEMENT status ("fatal"|"warning")>
<!ELEMENT reason
("printer_occupied"|"printer_busy"|"ink_low"|
"lever_error"|"load_error"|...)>
```

In this format, "status" describes whether a return can be made to a job from an error. For example, "fatal" indicates that a return is impossible and "warning" indicates that a return is possible. Further, "reason" describes the cause of the error.

(6) Script Formats of CDPS_JobData and CDPS_PartialJobData

```
<?XML version="1.0" encoding="UTF-16"?>
<! ELEMENT command
("CDPS_JobData"|"CDPS_PartialJobData")>
<image (#PCDATA)>
<offset (#PCDATA)>
<size (#PCDATA)>
```

In this format, "image" indicates the handle name of a file, "offset" indicates the number of bytes offset from the top of the image data, and "size" indicates the number of bytes of image data to be acquired. However, in the case of CDPS_JobData, when partial acquisition of the optional function is not used, these "offset" and "size" are invalid.

<Format of Capability>

The following will describe the format of <capability> used for the CDPS_Service function and the CDPS_Job function.

```
<capability>
<-- [items not requiring negotiation] -->
<!ELEMENT quality ("draft"|"normal"|"fine")>
<!ELEMENT paper_size
("L"|"2L"|"card"|"4×6"|"A4"|"letter"|...)>
<!ELEMENT paper_type ("plain"|"photo")>
```

"quality" indicates printing quality and designates "draft", "normal", and "fine". "paper_size" indicates a sheet size (L (3.5×5), 2L (5×7), card, 4×6, A4, letter size, or the like), "paper_type" indicates a paper type and designates "plain" and "photo".

```
<-- [items requiring negotiation] -->
<!ELEMENT image_type ("bmp"|"jpeg"|"tiff"|...)>
<!ELEMENT date ("on"|"off")>
<!ELEMENT file_name ("on"|"off")>
<!ELEMENT image_optimize ("on"|"off")>
<size_per_page (#PCDATA)>
<!ATTLIST layout L
("borderless"|"1×1"|...|"index(3×5)")
"borderless"
             2L ("borderless"|"1×1"|...|"index(5×7)")
"borderless"...>
```

"Image_type" indicates a supported image format, and "date" indicates on/off of date printing.

"file_name" indicates on/off of printing a file name, and "image_ooptimize" indicates on/off of image correction. "size_per_page" indicates a size of readable image data, and "layout" indicates layouts applicable to various kinds of paper.

```
    <option>
        <!ATTLIST vendor image_optimize ("DiPS"|"auto"|...)
        "auto"
                trimming_x (#PCDATA) "0"
                trimming_y (#PCDATA) "0"
                trimming_w (#PCDATA) "0"
                trimming_h (#PCDATA) "0"
                ...>
    </option>
</capability>
```

Besides, a part surrounded by "option" indicates Printer Capability specific to each vendor and also indicates a vendor's name.

<Job Format>

The following will describe the format of <job> used for the CDPS_Job function.

```
<job>
    <capability>
        <-- the above Capability format -->
    </capability>
    <printlist>
        <image (#PCDATA)>
        <date (#PCDATA)>
        <file_name (#PCDATA)>
        <-- repeat the image, data, and file_name -->
    </printlist>
</job>
```

A part surrounded by "capability" indicates a setting for image printing described below. Further, a part surrounded by "printlist" indicates an image printed in the job, additional information (date, file name), or the like.

Specific Example of Job Format

A specific example of the Job format will be described below.

(A) Borderless printing is performed on an image of Handle1 on an L-size (3.5×5) photo paper with a date.

```
<?XML version="1.0" encoding="UTF-16"?>
<command (CDPS_job)>
<job>
    <capability>
        <papersize ("L")>: paper size (L size (3.5 × 5))
        <papertype("Photo")>: photo paper
        <date("on")>: date printing is turned on
        <layout("borderless")>: borderless print
    </capability>
    <printlist>
        <image ("handle1")>: image of handle 1
        <date ("2002/05/30")>: date (May 30, 2002)
    </printlist>
</job>
```

(B) Six images with handles 1 to 6 are printed on an L-size (3.5×5) photo paper in a 2×2 layout

```
<?XML version="1.0" encoding="UTF-16"?>
<command (CDPS_job)>
<job>
    <capability>
        <papersize("L")>: paper size (L size (3.5 × 5))
        <papertype("Photo")>: photo paper
        <date("off")>: date printing is turned off
```

```
        <layout("2×2")>: 2×2 layout
    </capability>
    <printlist>
        <image ("handle1")>
        <image ("handle2")>
        <image ("handLe3")>
        <image ("handle4")>
        <image ("handle5")>
        <image ("handle6")>: images with handles 1 to 6
    are designated
    </printlist>
</job>
```

[Explanation of a Flow of the "Standard Procedure" of the CDPS]

Figure 16:
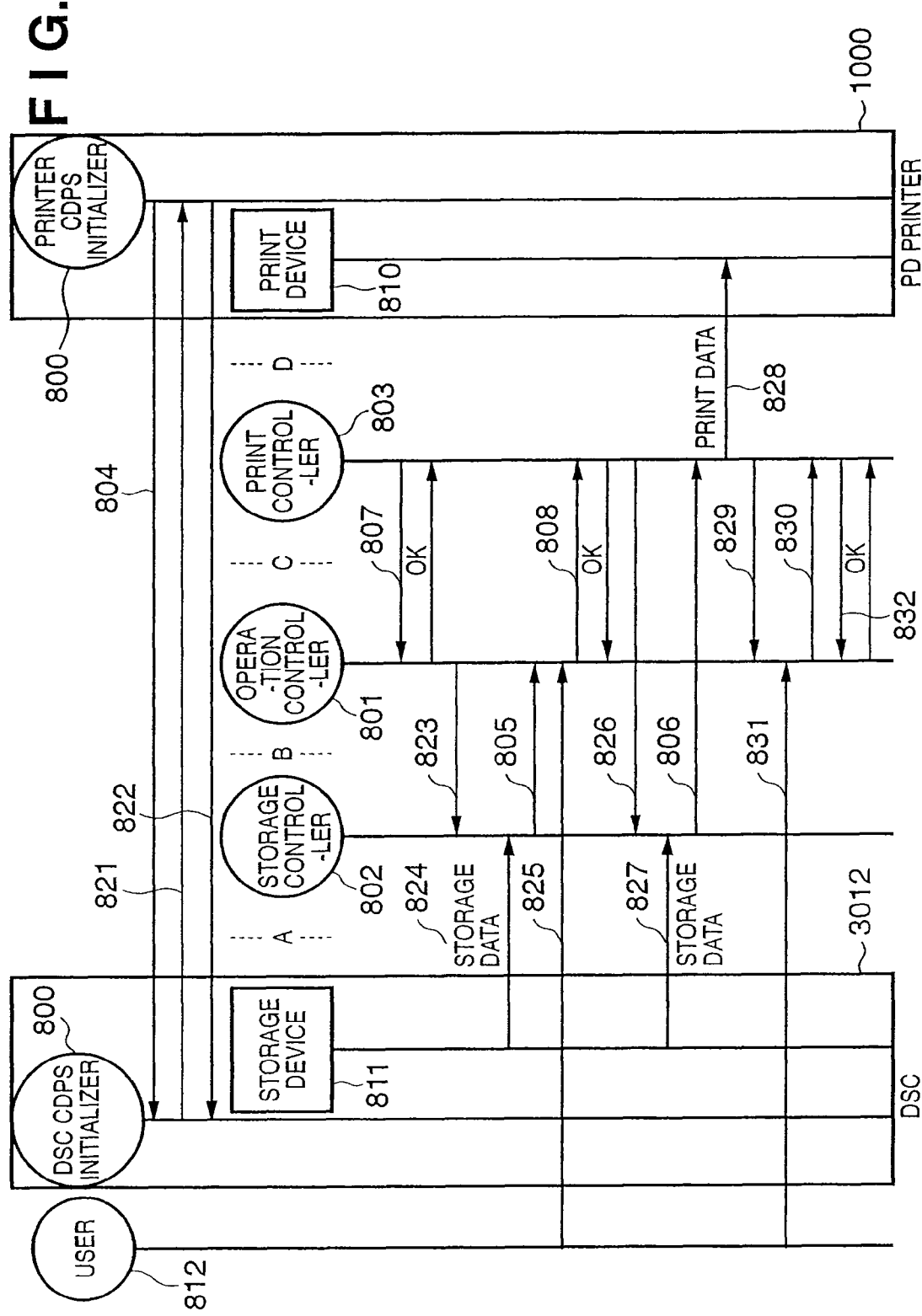
FIG. 16 is a flowchart for explaining the service functions and a processing flow between the DSC and the PD printer in the CDPS according to the present embodiment.

FIG. 16 depicts a diagram showing a flow of the fundamental processing of the CDPS according to the present embodiment. The diagram shows the CDPS functions transmitted and received between the functions 800 to 803 from above to below on the time series. In FIG. 16, "A", "B", "C", and "D" on broken lines indicate divided points of function sharing, the points being considered to be representative. Further, the same parts as those of FIG. 8 are indicated by the same reference numerals and the explanation thereof is omitted.

When a transition to the CDPS mode is informed from the PD printer 1000 to the DSC 3012 by the CDPS initializer 800 (804), in response to the request, the levels supported by the DSC 3012 ("standard", "extension", and supported functions) are informed from the DSC 3012 to the PD printer 1000 accordingly (821). Based on the informed levels, the PD printer 1000 determines which of the DSC 3012 or the PD printer 1000 should perform each of the functions 800 to 803 and informs the DSC 3012 of the result (822).

Reference numeral 823 denotes a request for a data list of image data stored in the storage device 811 from the operation controller 801 to the storage controller 802, and reference numeral 824 denotes data read by the storage controller 802 from the storage device 811 in response to the request 823. Thus, on 805, list data is transmitted from the storage controller 802 to the operation controller 801. On 825, a print mode and an image to be printed are selected by an operation of the user 812 to produce a print job and the print job is informed to the operation controller 801. Hence, the output setting instruction "CDPS_Job" 808 is produced from the operation controller 801 to the print controller 803 based on an instruction of the user 812, the instruction being inputted by using the produced UI menu, and the output setting instruction "CDPS_Job" 808 is informed to the print controller 803. Then, on 826, the image data is requested from the print controller 803 to the storage controller 802. Thus, the image data 827 is read from the storage device 811, and the image file "JobData" 806 required for printing is transferred to the print controller 803 from the storage controller 802. Accordingly, image processing or the like is performed in the print controller 803 to produce print data, the print data 828 is transferred to the print device 810, and printing is carried out.

In the event of an error during printing, error information 829 is transferred to the operation controller 801 from the print controller 803. When the user 812 instructs "print stop" or "print continuation" in response to the error (831), for example, when the user 812 instructs "print stop", a "print stop" command 830 is transmitted to the print controller 803 from the operation controller 801 (this command is shown in FIG. 15A). Then, the completion of the print job is informed to the operation controller 801 from the print controller 803 (832).

Figure 17:
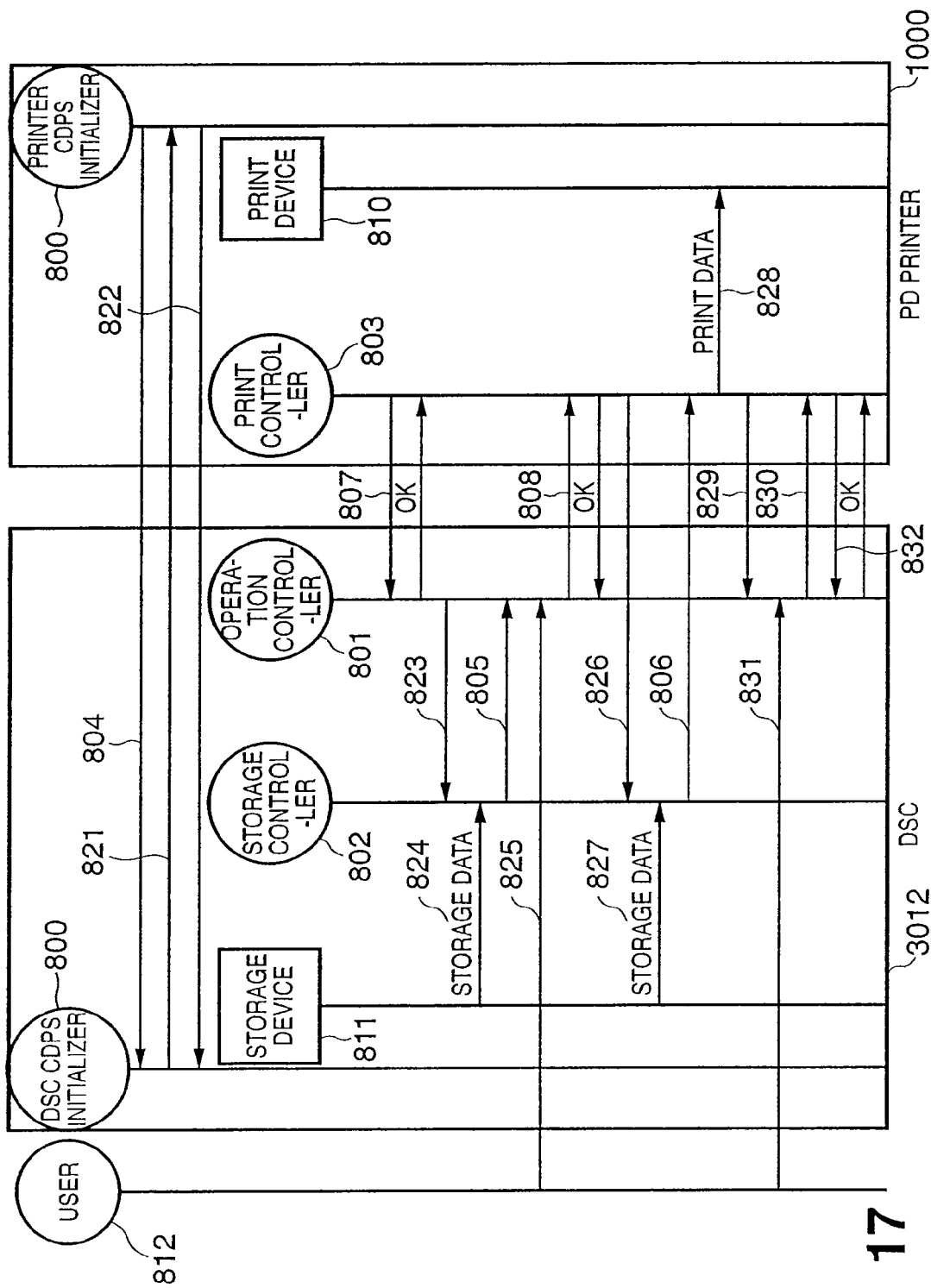
FIG. 17 is a flowchart for explaining an example of sharing (assignment) the service functions and a processing flow between the DSC and the PD printer in the CDPS according to the present embodiment.

FIG. 17 depicts a diagram for explaining the case where the DSC 3012 takes charge of the operation controller 801 and the storage controller 802 and the PD printer 1000 takes charge of the print controller 803. In this case, the position of dividing the functions is equivalent to position "C" of FIG. 16. Besides, although this example shows using PTP, a similar arrangement is obtained for the other connections such as TCP/IP when the operation controller 801 and the storage controller 802 of the DSC 3012 are used.

In this case, on 822, the PD printer 1000 provides notification that the operation controller 801 and the storage controller 802 of the functions 800 to 803 are performed by the DSC 3012 and the printer controller 803 is performed by the PD printer 1000. Thus, function sharing between the DSC 3012 and the PD printer 1000 is determined as shown in FIG. 17.

Figure 18:
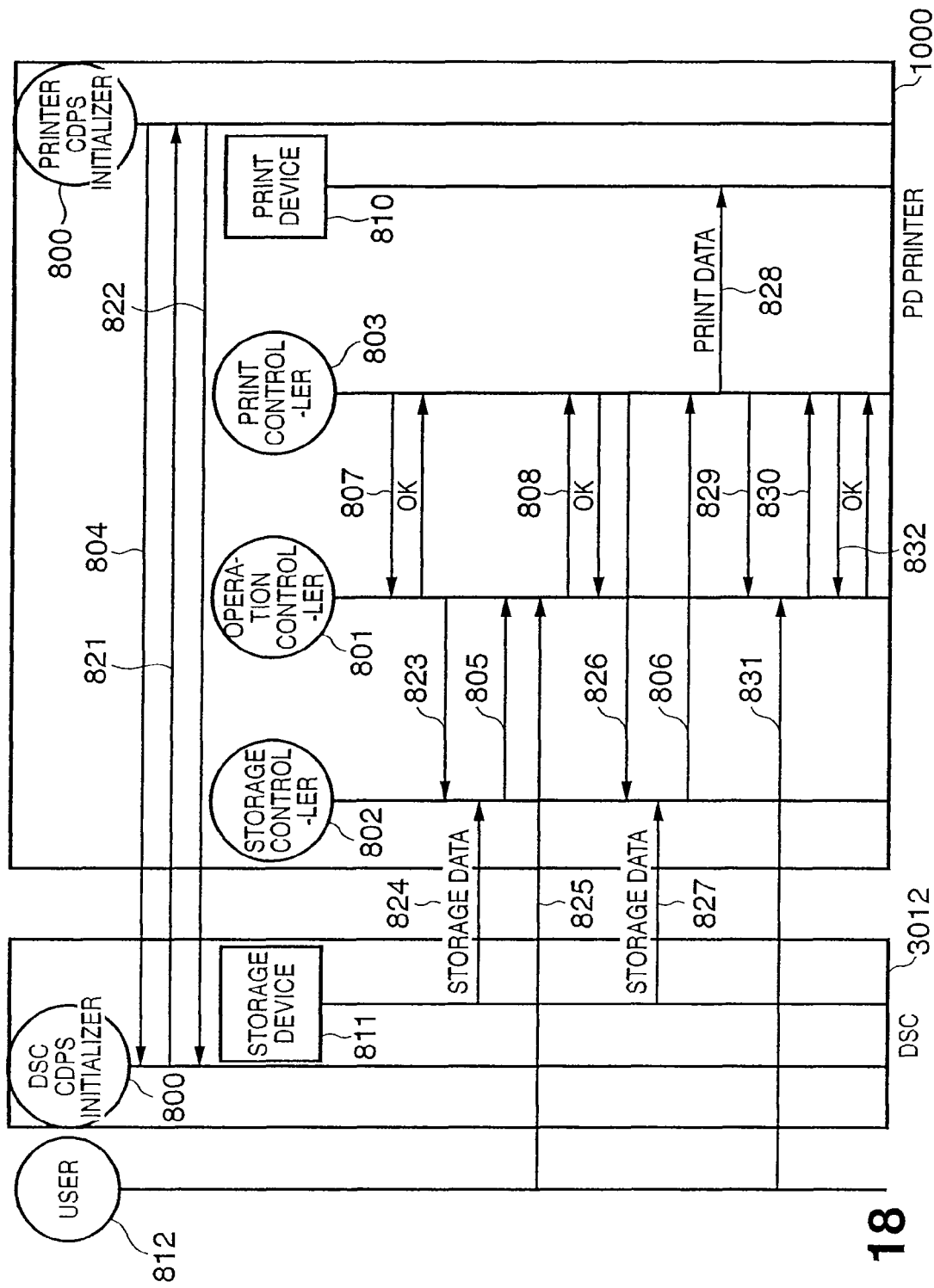
FIG. 18 is a diagram for explaining an example of sharing (assignment) the service functions and a processing flow between the DSC and the PD printer in the CDPS according to the present embodiment.

FIG. 18 is a diagram for explaining the case where the storage device 811 of the DSC 3012 is handled as Mass Storage and the PD printer 1000 takes charge of the operation controller 801, the storage controller 802, and the print controller 803. In this case, the position of dividing the functions is position "A" of FIG. 16. Besides, although this example shows using PTP, a similar arrangement is obtained for the other connections such as TCP/IP when the operation controller 801 and the storage controller 802 of the DSC 3012 are used.

In this case, on 822, the PD printer 1000 provides notification that all the functions 800 to 803 are performed by the PD printer 1000. Hence, function sharing between the DSC 3012 and the PD printer 1000 is determined as shown in FIG. 18.

Additionally, a similar arrangement is obtained for the other connections such as PTP when the resources of the DSC 3012 are not used at all. Moreover, this holds true when the DSC 3012 does not have the CDPS initializer 800 (a model not supporting the CDPS).

The following will describe an example in which the commands of the service functions in the CDPS are performed by PTP.

[Example of the Print Service Function on PTP]
<CDPS Service Discovery (CDPS_ServiceDiscovery) Function>

Figure 19:
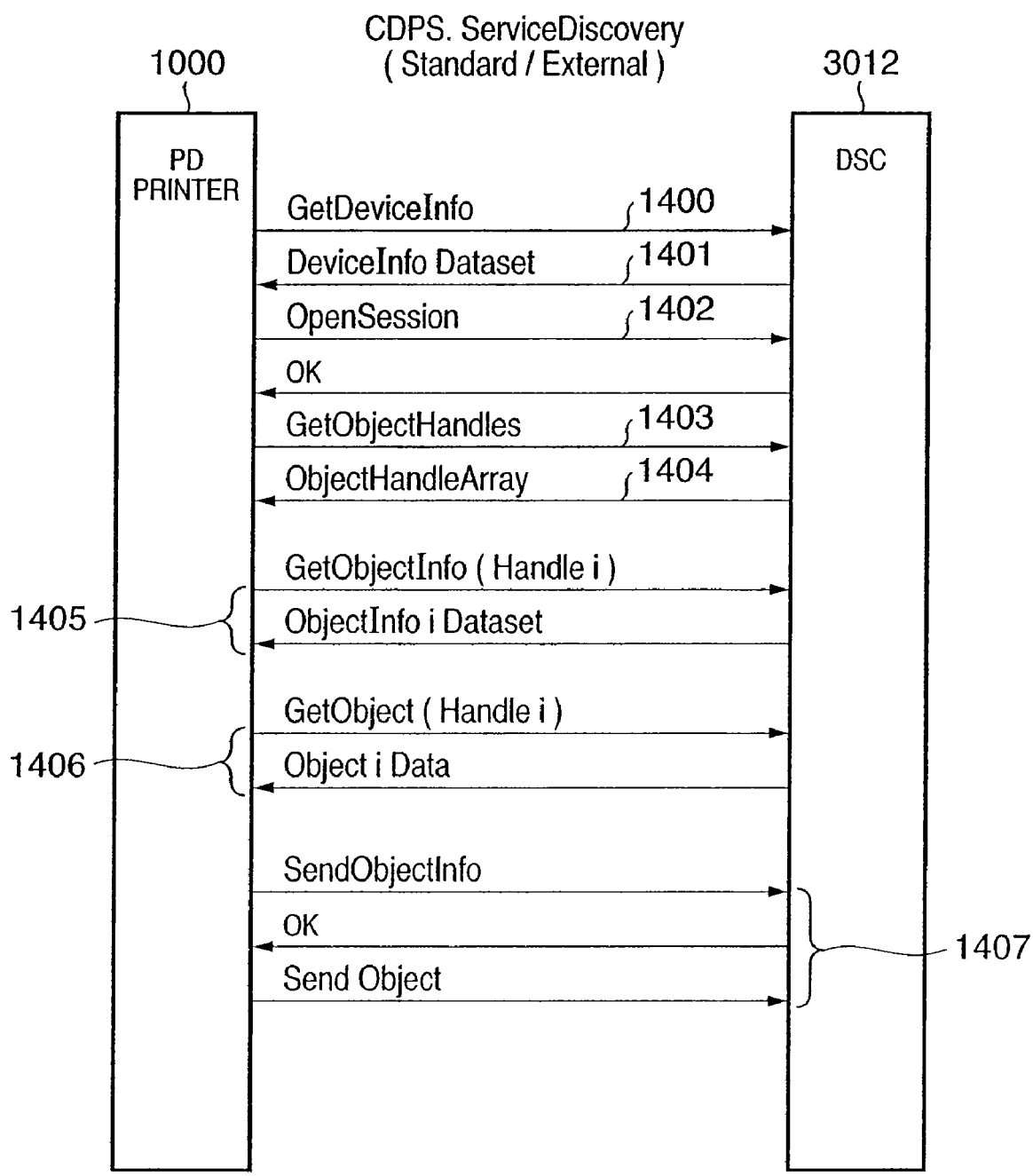
FIG. 19 depicts a diagram for explaining an example of realizing, by using the PTP architecture, service discovery (CDPS_ServiceDiscovery) of the CDPS.

FIG. 19 is a diagram for explaining the procedure of the CDPS service discovery function.

When the PD printer 1000 and the DSC 3012 are physically connected and PTP communication becomes available, on 1400, GetDeviceInfo is firstly transmitted from the PD printer 1000 to the DSC 3012 and information about objects stored in the DSC 3012 is requested to the DSC 3012. In response to the request, the DSC 3012 transmits information about objects stored in the DSC 3012 to the PD printer 1000 by DeviceInfoDataset. Then, on 1402, the DSC 3012 is allocated as a resource by OpenSession, a handle is assigned to a data object as necessary, the start of a procedure for special initialization is requested. In response to the request, when acknowledgment (OK) is replied from the DSC 3012, communication on PTP is started. Then, on 1403, when all the handles in a script format are requested to the DSC 3012 (Storage ID: FFFFFF, Object Type: Script), all the handle lists stored in the DSC 3012 are returned on 1404. Subsequently, on 1405 and 1406, information about the i-th object handle is acquired from the PD printer 1000. When the object includes a keyword indicating the identification of the DSC 3012 (e.g., "Marco"), the PD printer 1000 then provides an instruction to transmit the object information on 1407 (SendObjectInfo). When acknowledgment (OK) is received in response to the transmission, the object information is transmitted to the DSC 3012 from the PD printer 1000 by SendObject. The object includes, for example, "Polo" as a response keyword (password) of the above keyword.

In this way, both of the PD printer 1000 and the DSC 3012 can recognize the opposite party and thereafter make a transition to the procedure of the CDPS. In this way, a transport layer which can transmit/receive a file can positively transmit/receive a keyword. Namely, keywords can be exchanged without adding unique commands or the like to the CDPS of the present embodiment. Additionally, keywords are not limited to the above example and the same keyword can be used in the PD printer 1000 and DSC 3012. Further, in order to shorten time for negotiation using such a keyword, the keyword is placed on the head (i=1) of the handle in the script format, so that time to mutually confirm the devices can be reduced.

Figure 20:
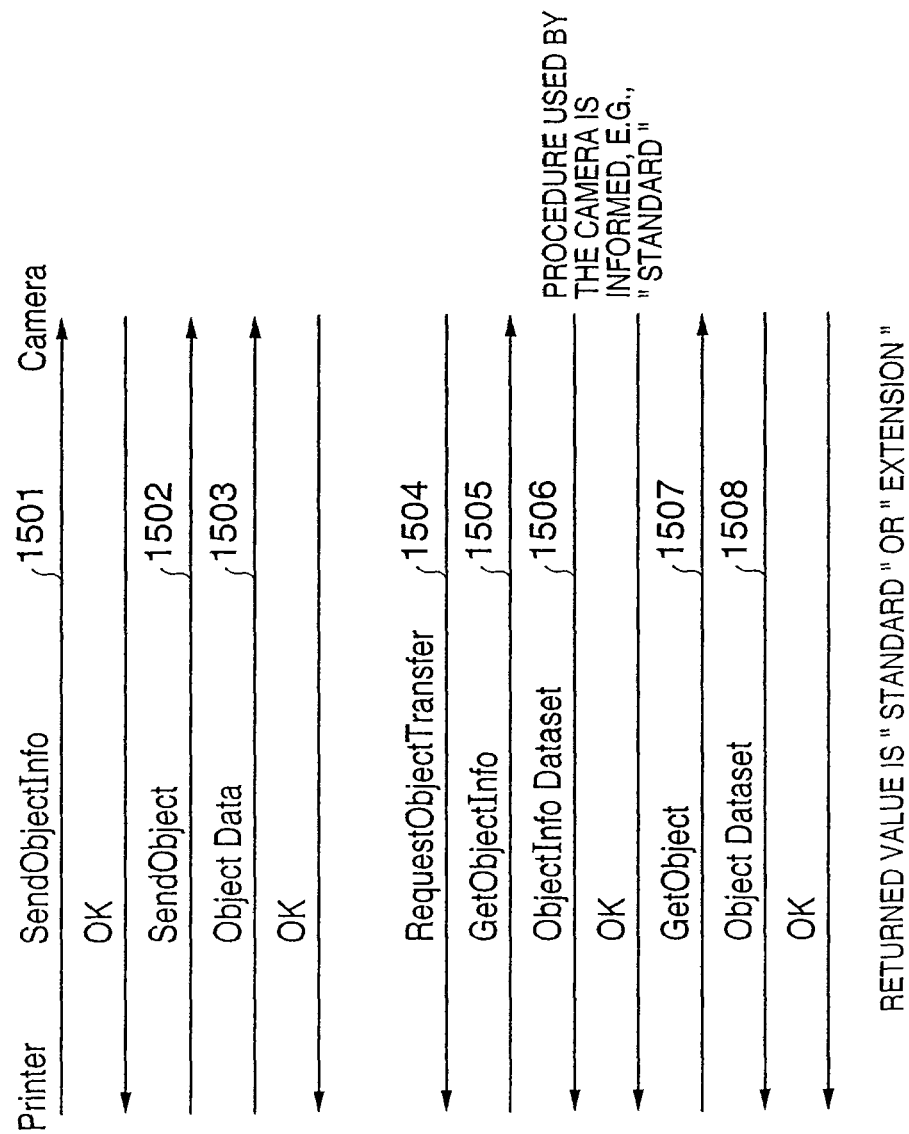
FIG. 20 depicts a diagram for explaining an example of realizing, by using the PTP architecture, (CDPS_ServiceDiscovery) procedures for informing a procedure used by the camera in the CDPS.

FIG. 20 is a diagram for explaining the continuation of the procedure of CDPS_ServiceDiscovery.

Initially on 1501, in order to notify the DSC 3012 of the procedures "standard procedure" and "extension procedure" supported by the PD printer 1000, the presence of object information to be transmitted is informed to the DSC 3012 by SendObjectInfo. In response to the transmission, when acknowledgment (OK) is transmitted from the DSC 3012, the transmission of the object is informed to the DSC 3012 by SendObject on 1502, and information ("standard"/"extension") about the procedures supported by the PD printer 1000 is transmitted by ObjectData on the subsequent 1503. Then, on 1504, the start of a GetObject operation (transition to a push mode) is informed to the PD printer 1000 from the DSC 3012. Hence, when the reception of information about object information is transmitted from the PD printer 1000 (GetObjectInfo) on 1505, information about objects is informed on 1506 to the PD printer 1000 from the DSC 3012 by ObjectInfoDataset. When the object information is designated and the object is requested on 1507, the procedures ("standard", "extension", or the like) used by the DSC 3012 are informed to the PD printer 1000 by ObjectDataset (1508).

Hence, a print mode of an image can be designated from the DSC 3012 to the PD printer 1000.

<CDPS_Service (Standard)>

Figure 21:
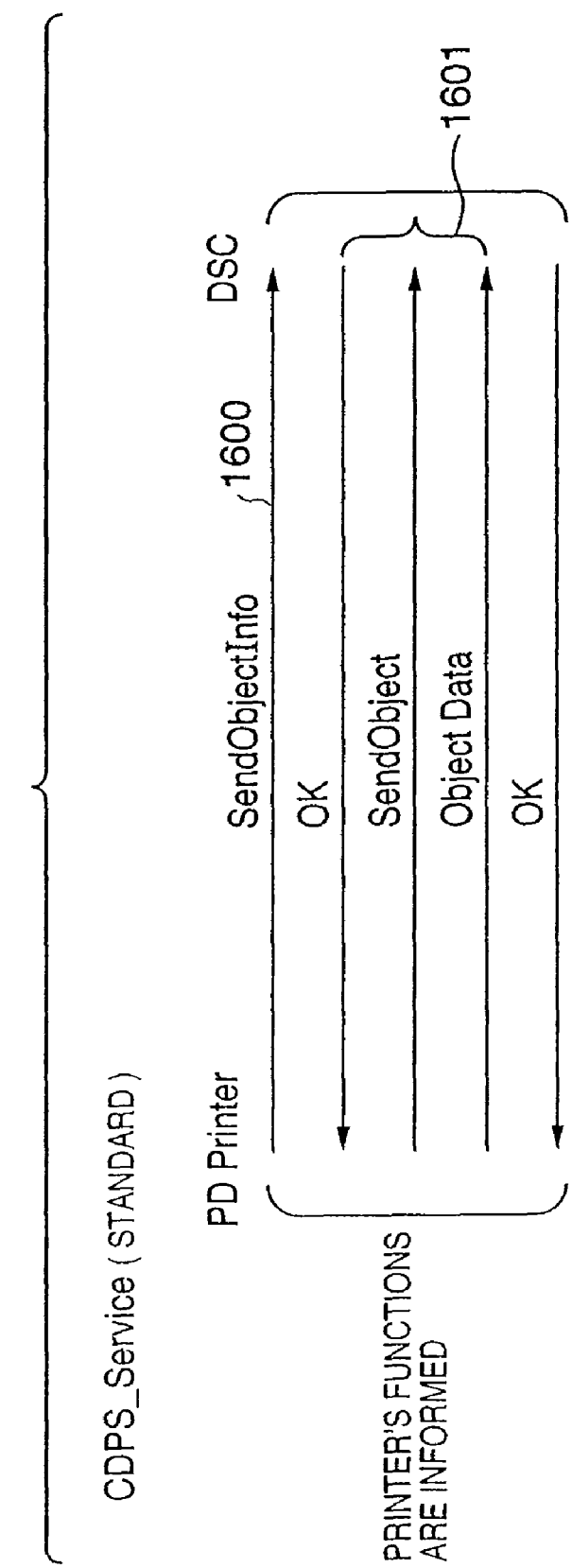
FIG. 21 depicts a diagram for explaining an example of realizing, by using the PTP architecture, notification of a printer function (CDPS_Service) in the CDPS.

FIG. 21 is a diagram for explaining a notification procedure of the printer function of the CDPS according to the present embodiment.

In this procedure, on 1600, the presence of object information to be transmitted is informed to the DSC 3012 from the PD printer 1000, and the functions of the printer 1000 are informed to the DSC 3012 by SendObject and ObjectData.

<CDPS_JobData (Standard)>

Figure 22:
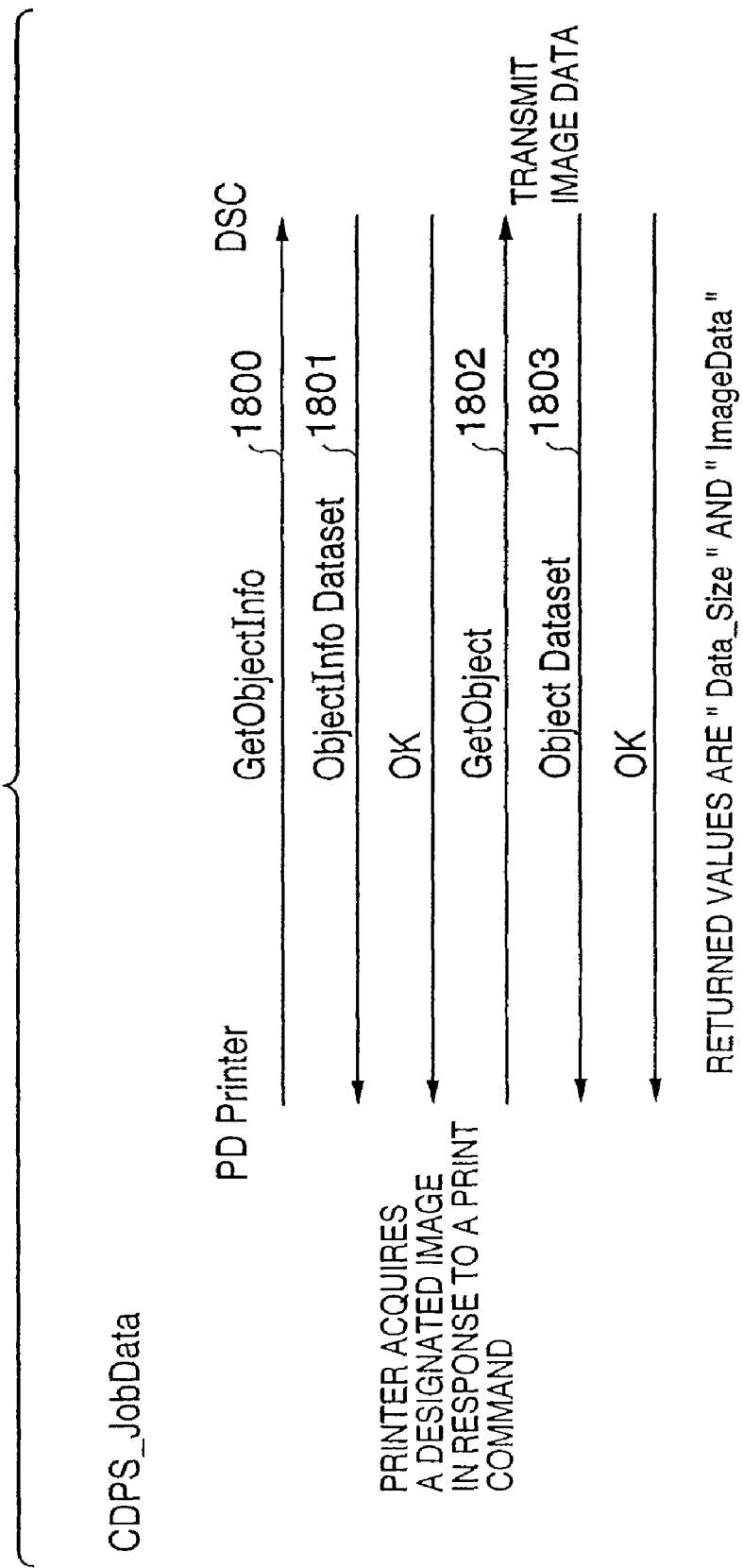
FIG. 22 depicts a diagram for explaining an example of realizing, by using the PTP architecture, the procedures of a function (CDPS_JobData) of allowing the PD printer to acquire an image file in the CDPS.

FIG. 22 is a diagram for explaining an example of a communication procedure in which the PD printer 1000 acquires image data (JPEG image) stored in the DSC 3012 in the CDPS according to the present embodiment (CDPS_JobData), the communication procedure being realized by a PTP architecture.

Initially on 1800, when information about an object held by the DSC 3012 (or storage) is requested, on 1801, information about the object (Object Dataset) is transmitted to the PD printer 100 from the DSC 3012. Then, on 1802, when the object is designated and an acquisition request (GetObject) is issued, the requested image file (Object Dataset) is transmitted to the PD printer 1000 from the DSC 3012 on 1803. In this way, the PD printer 1000 can acquire the desired image file from the DSC 3012. In this case, returned values are "Data_Size" and "Image Data".

<CDPS_PageStart (Standard)>

Figure 23:
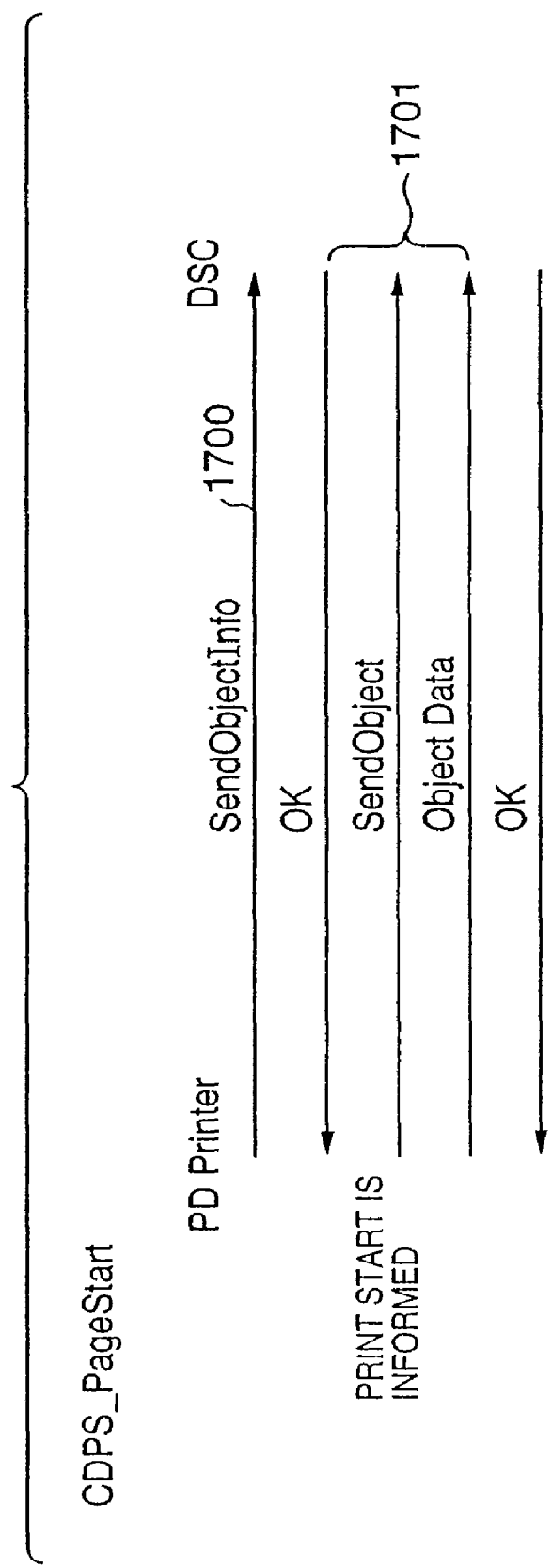
FIG. 23 depicts a diagram for explaining an example of realizing, by using the PTP architecture, a function (CDPS_PageStart) of issuing a print start instruction to the camera from the PD printer in the CDPS.

FIG. 23 is a diagram for explaining the procedure of notification of print start in the CDPS according to the present embodiment.

In this procedure, on 1700, the presence of object information (print start notification) is informed to the DSC 3012 from the PD printer 1000. On 1701, print start is informed to the DSC 3012 by SendObject and ObjectData.

<CDPS PageEnd (Standard)>

Figure 24:
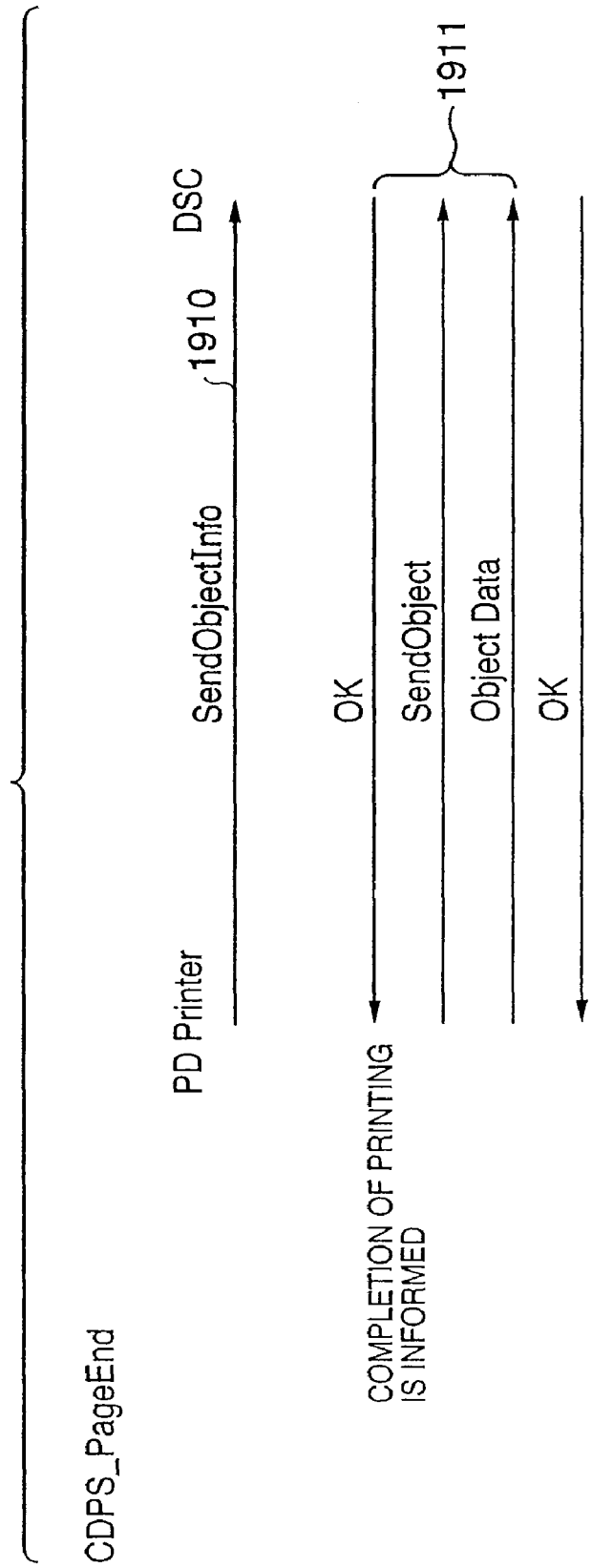
FIG. 24 depicts a diagram for explaining an example of realizing, by using the PTP architecture, a function (CDPS_PageEnd) of transmitting the completion of printing one page to the camera from the PD printer in the CDPS.

FIG. 24 is a diagram for explaining an example of a communication procedure in which end of printing of one page is informed to the DSC 3012 from the PD printer 1000 in the CDPS according to the present embodiment, the communication procedure being realized by a PTP architecture.

In this procedure, on 1910, the presence of object information (print end notification) to be transmitted is informed to the DSC 3012 from the PD printer 1000. On 1911, the completion of printing one page is informed to the DSC 3012 by SendObject and ObjectData.

<CDPS_JobEnd (Standard)>

Figure 25:
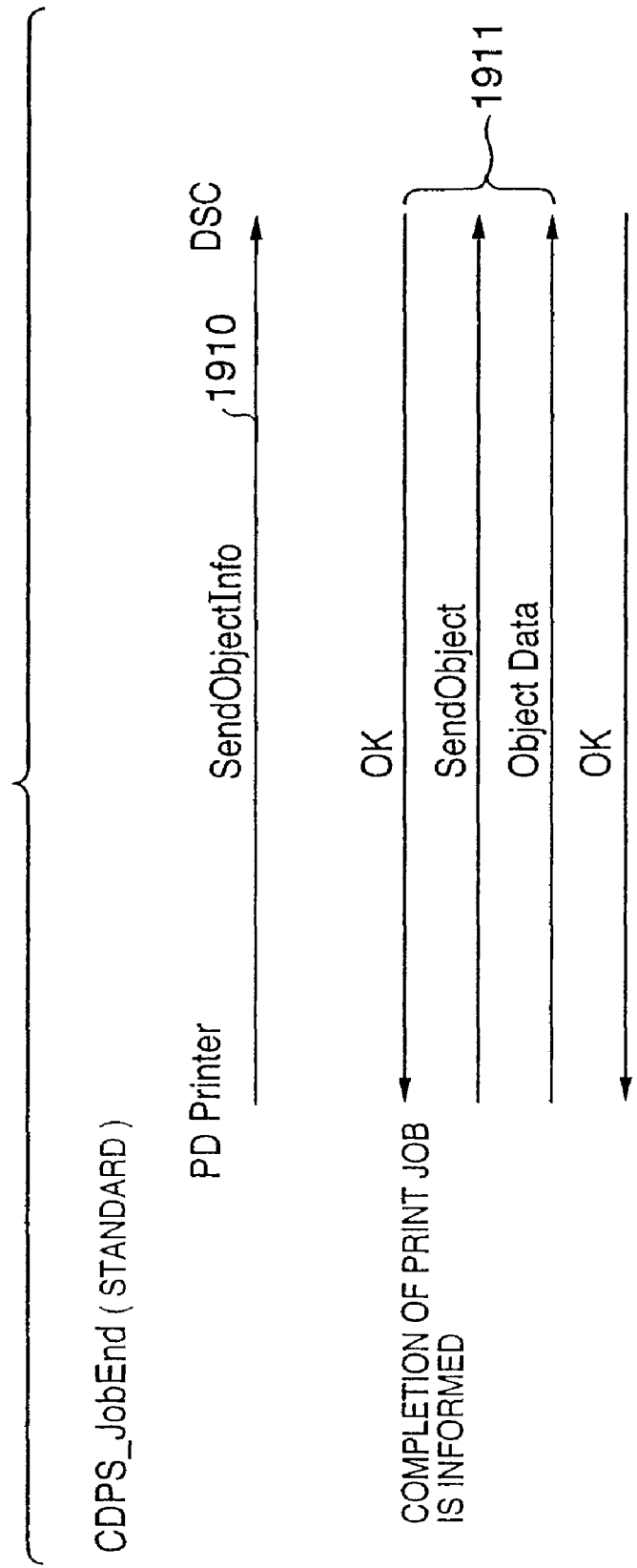
FIG. 25 depicts a diagram for explaining an example of realizing, by using the PTP architecture, procedures for issuing a command (CDPS_JobEnd) of completing a print job to the camera from the PD printer in CDPS.

FIG. 25 is a diagram for explaining an example of a communication procedure in which the completion of a print job is informed to the DSC 3012 from the PD printer 1000 in the CDPS according to the present embodiment, the communication procedure being realized by a PTP architecture.

On 1910, the completion of printing one page is informed to the DSC 3012 from the PD printer 1000, and on 1911, the completion of a print job is informed to the DSC 3012 from the PD printer 1000.

<CDPS Error (Standard)>

Figure 26:
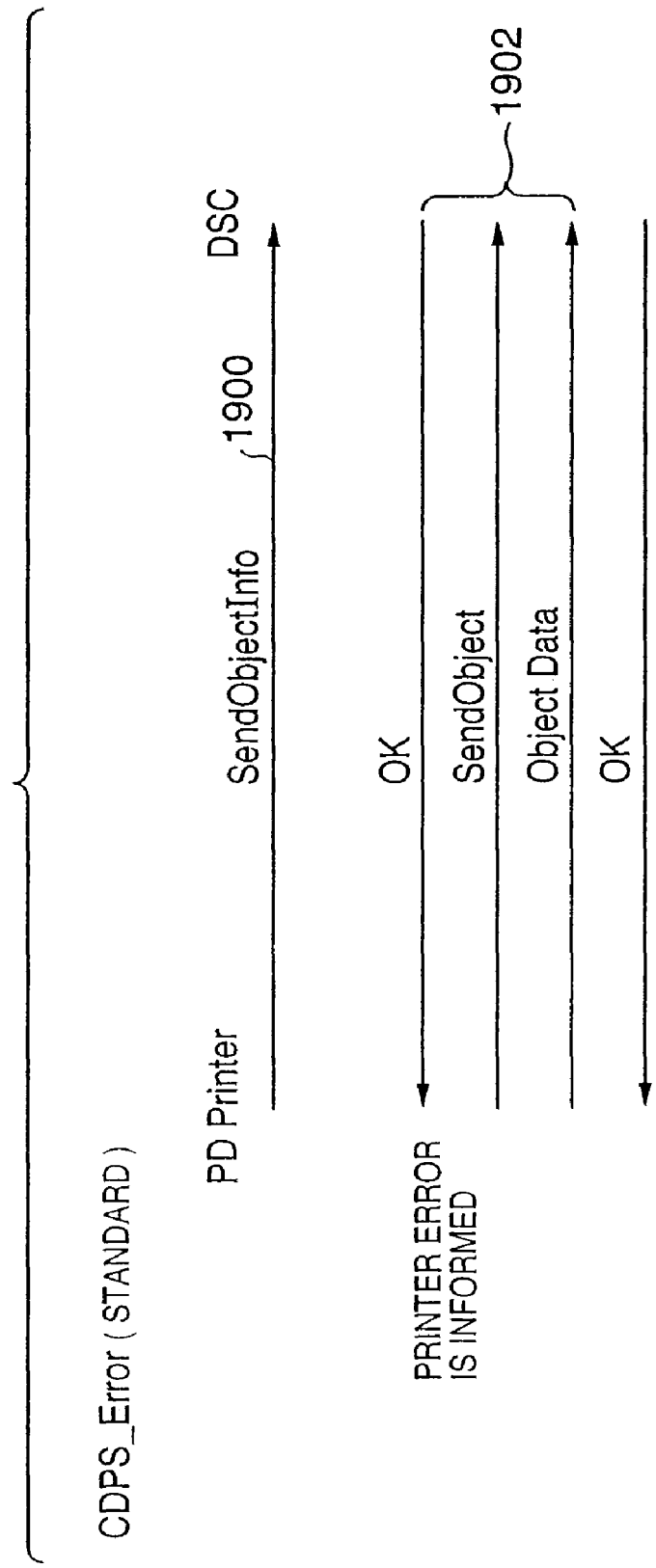
FIG. 26 depicts a diagram for explaining an example of realizing, by using the PTP architecture, the procedures of a function for transmitting an error status to the camera from the PD printer in CDPS.

FIG. 26 is a diagram for explaining an example a communication procedure for notifying the DSC 3012 of an error state or the like from the PD printer 1000 in the CDPS according to the present embodiment, the communication procedure being realized by a PTP architecture.

Initially on 1900, the presence of object information (error information) to be transmitted is informed to the DSC 3012 from the PD printer 1000 by SendObjectInfo. In response to an acknowledgment (OK) from the DSC 3012, status information about an error or the like in the PD printer 1000 is transmitted by SendObject and ObjectData (1902).

<CDPSJob (Standard)>

Figure 27:
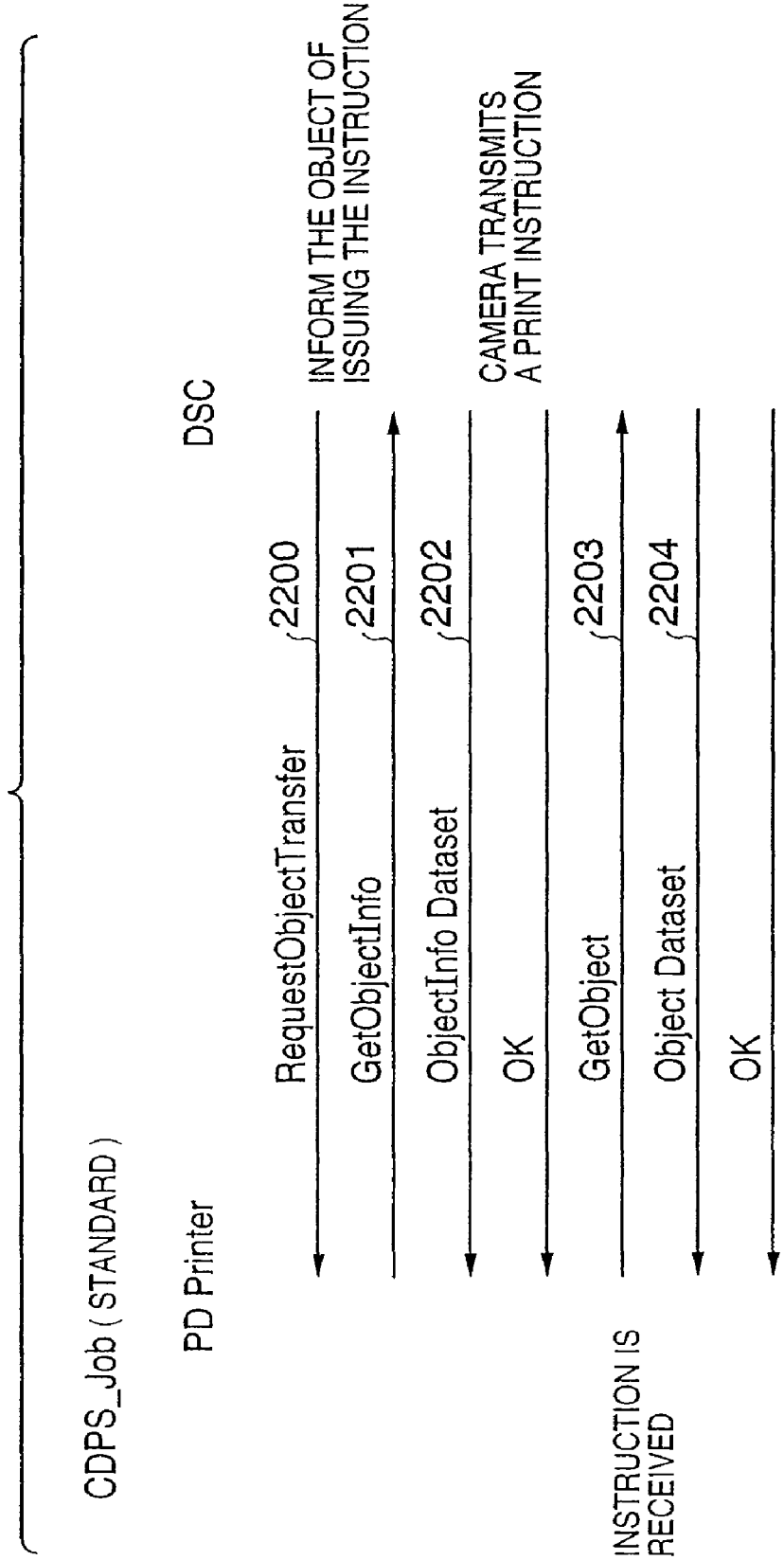
FIG. 27 depicts a diagram for explaining an example of realizing, by using the PTP architecture, the procedures of issuing a print command (CDPS_Job) to a print controller from an operation controller in the CDPS.

FIG. 27 is a diagram for explaining an example of a communication procedure for notifying the PD printer 1000 of the start of a print job from the DSC 3012 (operation controller) in the CDPS according to the present embodiment, the communication procedure being realized by a PTP architecture.

Initially on 2200, RequestObjectTransfer is transmitted to the PD printer 1000 from the DSC 3012 to inform that the DSC 3012 requests issue of an instruction. Thus, when GetObjectInfo is issued from the PD printer 1000 on 2201, the DSC 3012 transmits information about object information to be transmitted. In response to the transmission, when the PD printer 1000 requests object information (GetObject: 2203), Object Dataset (print instruction) is transmitted on 2204 and a print command is issued to the PD printer 1000 from the DSC 3012.

<CDPS_JobAbort (Standard)>

Figure 28:
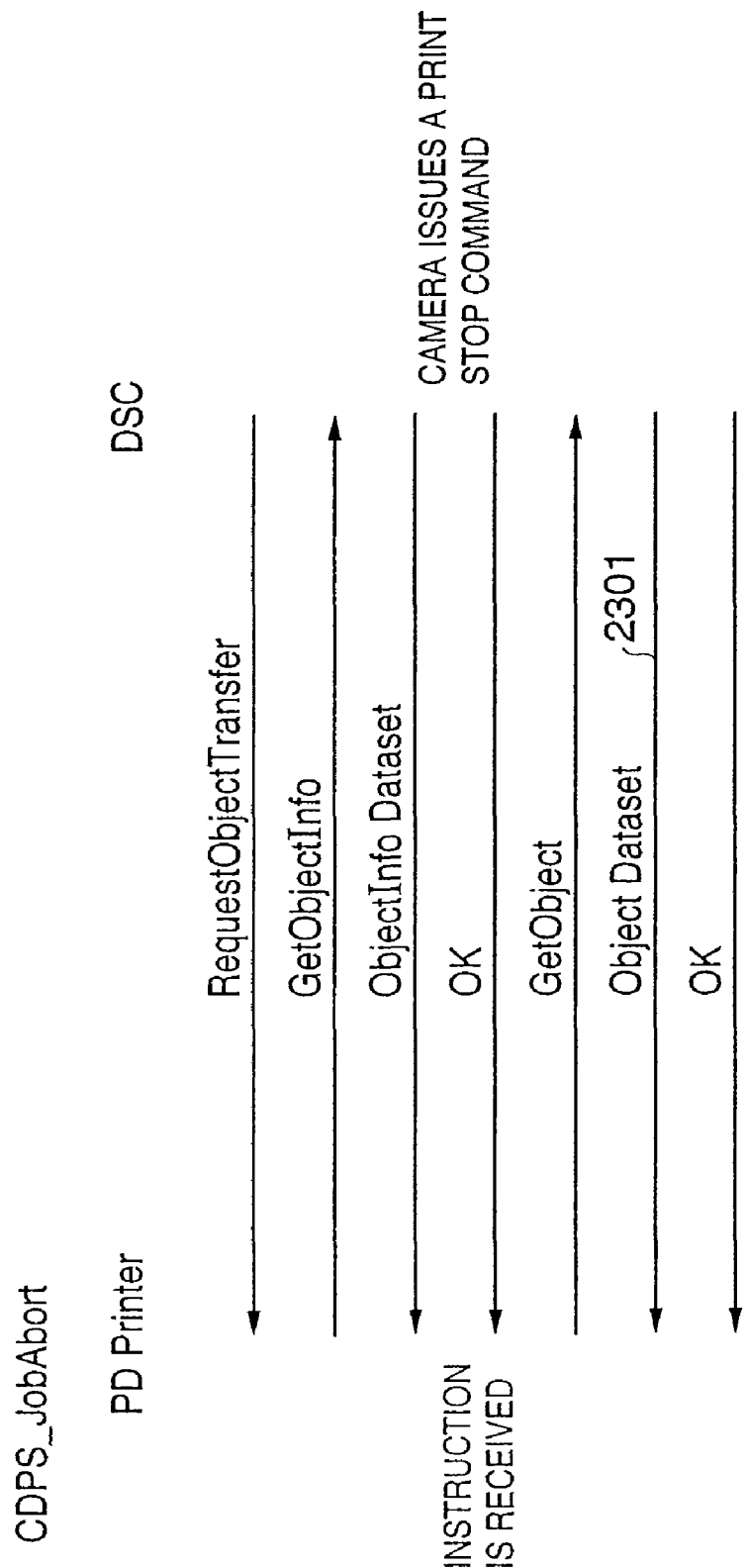
FIG. 28 depicts a diagram for explaining an example of realizing, by using the PTP architecture, the procedures for issuing print stop (CDPS_JobAbort) to the print controller from the operation controller in the CDPS.

FIG. 28 is a diagram for explaining an example a communication procedure for issuing a print stop command (CDPS_JobAbort) to the PD printer 1000 (print controller) from the DSC 3012 (operation controller) in the CDPS according to the present embodiment, the communication procedure being realized by a PTP architecture.

<CDPS_JobContinue (Standard)>

Figure 29:
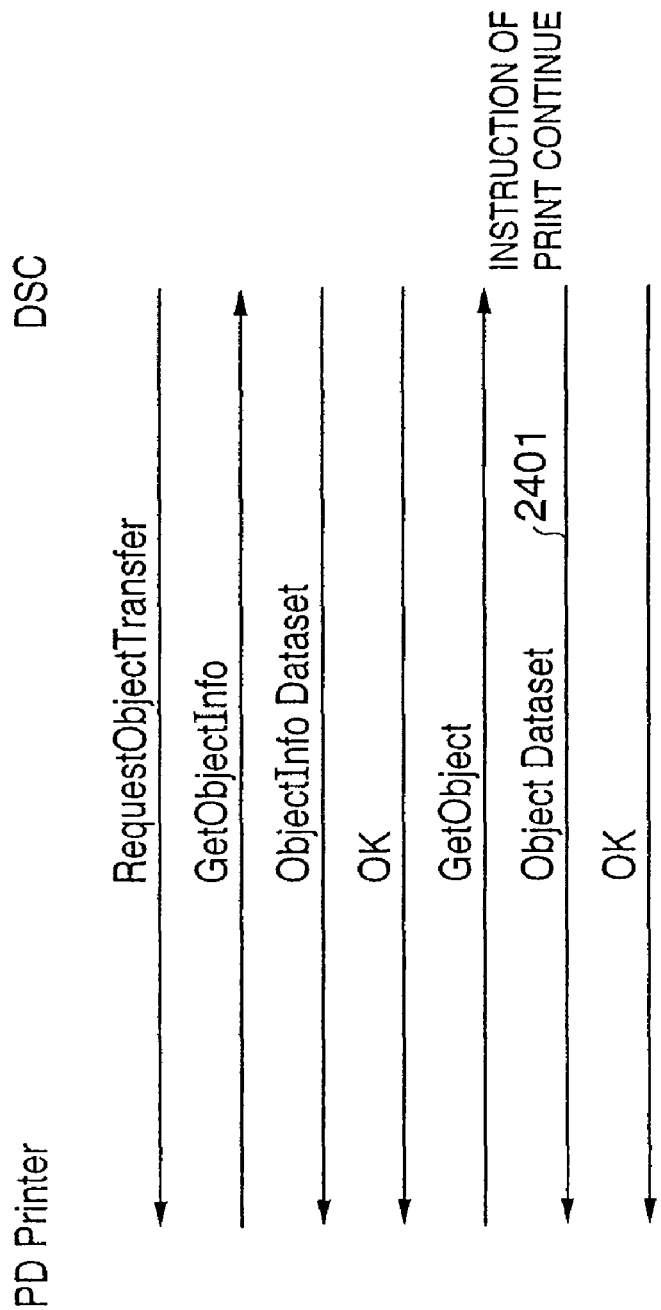
FIG. 29 depicts a diagram for explaining an example of realizing, by using the PTP architecture, the procedures for issuing print restart (CDPS_JobContinue) to the operation controller to the print controller in the CDPS.

FIG. 29 is a diagram for explaining an example of a communication procedure for issuing a print restart command (CDPS_JobContinue) to the PD printer 1000 (print controller) from the DSC 3012 (operation controller) in the CDPS according to the present embodiment, the communication procedure being realized by a PTP architecture.

In FIGS. 28 and 29, after the same procedure as that of FIG. 27 is performed, a print stop instruction is issued to the PD printer 1000 from the DSC 3012 on 2301 of FIG. 28. On 2401 of FIG. 29, a print continuation instruction is informed to the PD printer 1000 from the DSC 3012.

<CDPS_PartialJobData (Standard)>

Figure 30:
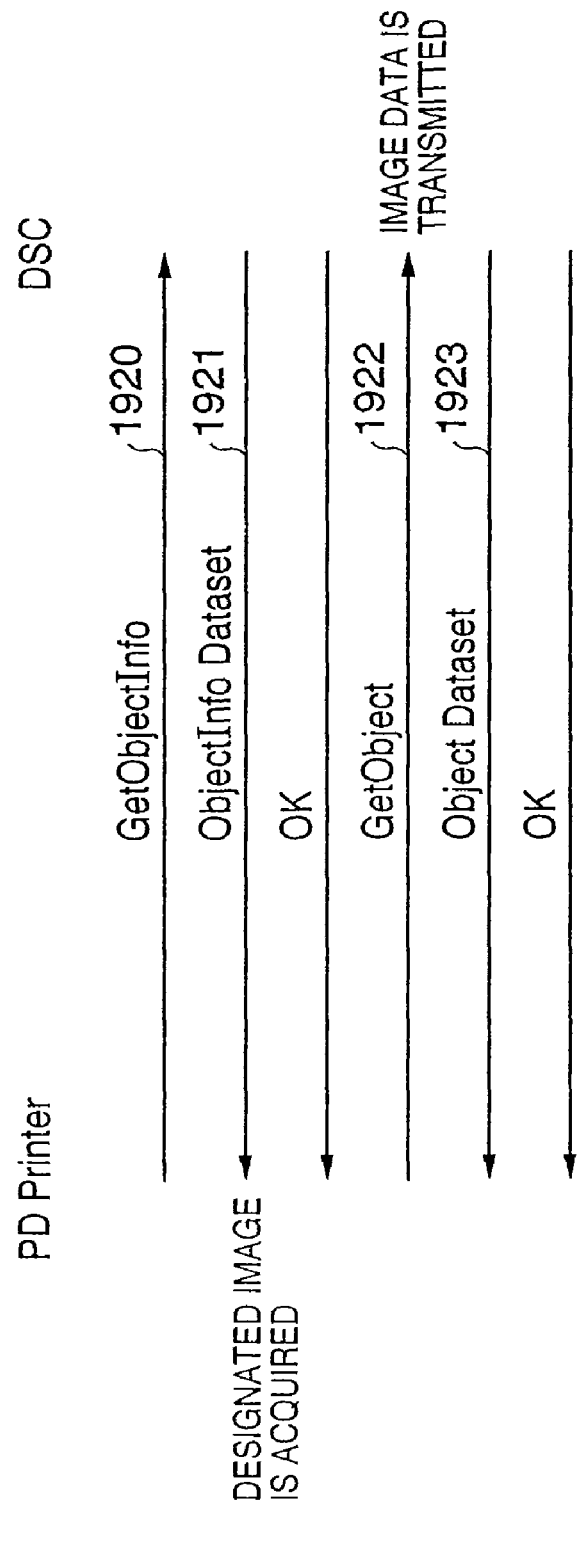
FIG. 30 depicts a diagram for explaining an example of realizing, by using the PTP architecture, the procedures for issuing acquisition of a partial image (CDPS_PrintJobData) to a storage from the print controller in the CDPS.

FIG. 30 is a diagram for explaining an example of a communication procedure (option) for acquiring a partial image when the PD printer 1000 (print controller) acquires image data (JPEG image) stored in the DSC 3012 (storage) in the CDPS according to the present embodiment, the communication procedure being realized by a PTP architecture.

Initially on 1920, when information about an object stored in the DSC 3012 is requested, information about the object (Object Dataset) is transferred to the PD printer 1000 from the DSC 3012 on 1921. Then, the object is designated and an acquisition request (GetObject) is issued on 1922. Besides, as described above, the number of bytes (offset) from the top of desired image data and the number of bytes (size) of image data to be acquired are designated. Thus, on 1923, partial image data of the requested image file (Object Dataset) is transmitted to the PD printer 1000 from the DSC 3012. In this way, the PD printer 1000 can acquire desired partial image data from the DSC 3012. Additionally, in this case, returned values are "DataSize" and "Image Data".

Figure 31:
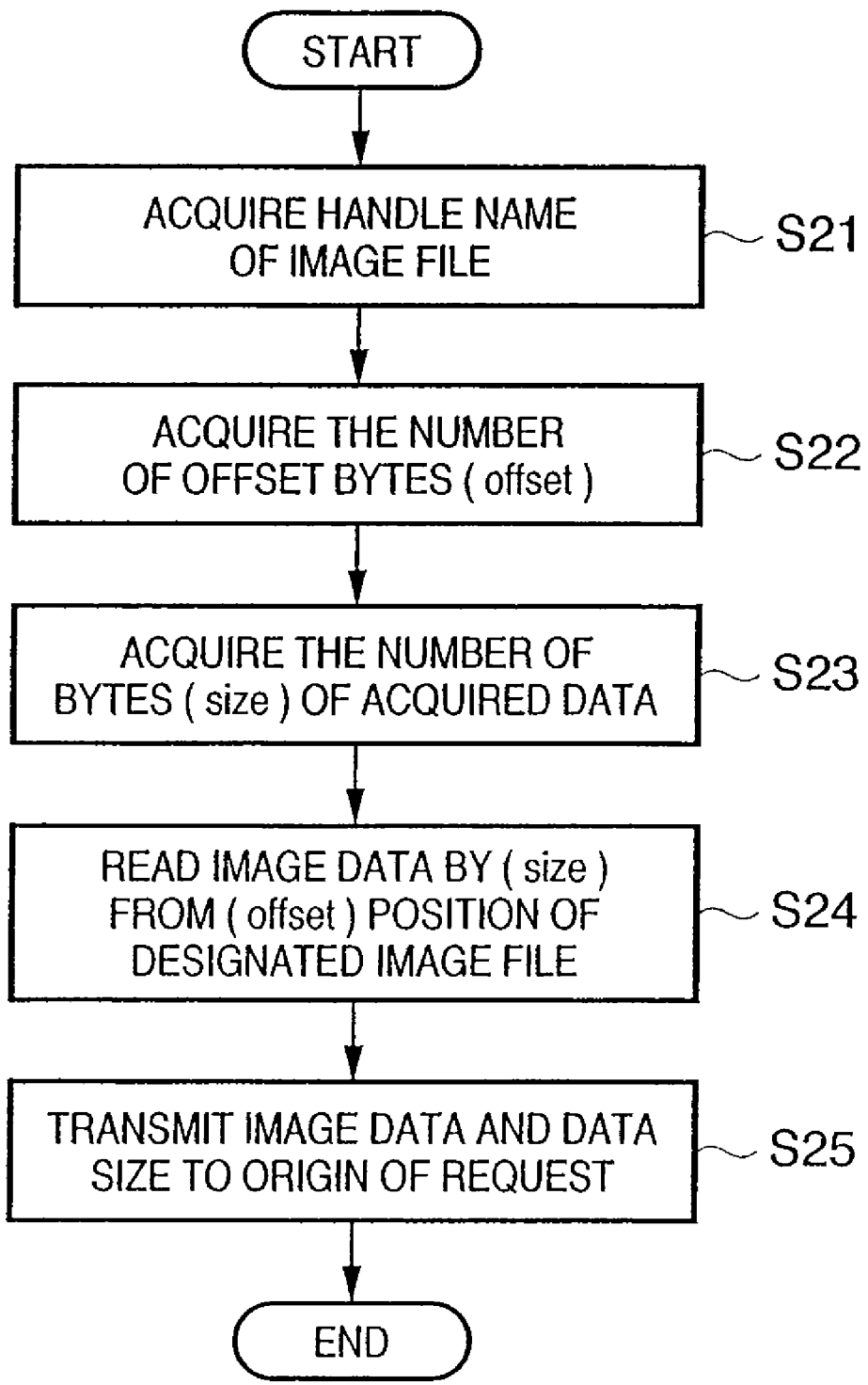
FIG. 31 is a flowchart for explaining the acquisition of a partial image in the CDPS.

FIG. 31 is a flowchart for explaining processing in the DSC 3012 or the storage when the PD printer 1000 (print controller) receives a partial image acquiring function for acquiring image data (JPEG image) stored in the DSC 3012 (storage), in the CDPS according to the present embodiment.

Initially in step S21, the handle name of an image file included in <image (#PCDATA)> is acquired. Then, the processing advances to step S22, and the number of bytes offset from the top is acquired by "offset". Subsequently in step S23, the number of bytes of image data to be acquired is obtained by "size". Then, the processing advances to step S24, image data of the designated number of bytes is read from the offset position of a designated image file in the storage device 811. Then, the processing advances to step S25, and the read partial image data is transmitted to the PD printer 1000 or the print controller 803, which is the origin of a request.

As described above, when the PD printer 1000 acquires, on the PTP architecture, a partial image from an image stored in the DSC 3012, the PD printer issues a PTP operation "GetPartialObject" describing "the handle of an image file", "the number of bytes offset from the top", and "the number of bytes in partial image data to be acquired" as parameters. The DSC 3012 specifies a requested part of partial image data based on the parameters of the PTP operation and transmits the partial image data to the PD printer 1000 as a response to the PTP operation, so that transfer of partial image data is realized.

The above explanation described the case where the PTP architecture is used on the USB of the physical layer. The following will describe an example using the other architectures.

[MSC Architecture]

An example using MSC (Mass Storage Class) will be described below. In this example, an USB interface of Mass Storage Class shown in FIG. 7 is used. In this case, the UI of the PD printer 1000 is used instead of the UI of the DSC 3012. Therefore, the operation controller 801, the storage controller 802, and the print controller 803 are all placed in the PD printer 1000. Then, the file system of the PD printer 1000 is basically used and the above GetJobData, GetPartialJobData, and GetDataList (by the file system) are executed by Open, Read, Close, a directory operation, or the like (file operation).

<CDPS_ServiceDiscovery (Standard/Extension)>

In this case, CDPS_ServiceDiscovery is transmitted to the DSC 3012 from the PD printer 1000. Even when the DSC 3012 does not have the function of the CDPS initializer 800, in the case where no response is made, the PD printer 1000 automatically recognizes that reception is established at "standard", and a transition is made to the MSC (bulk only). The operation controller 801, the storage controller 802, and the print controller 803 are placed on the side of the PD printer 1000, and CDPS_GetPartialData is set at "supported".

<CDPS_JobData (Standard)>

The PD printer 1000 acquires image data designated by a print command. In this case, "Receive Command" is issued to the DSC 3012 from the PD printer 1000, and image data "Image Data" is transmitted to the PD printer 1000 from the DSC 3012 in response to the command. In reality, the image data of the storage device 811 is acquired by using an SCSI command via a file system constructed by the PC printer 1000. Additionally, returned values at this point are "Data Size" and "Image Data".

<CDPS_PartialJobData (Option)>

The procedure is basically the same as that of "CDPS_JobData" except that image data is partially acquired. Additionally, returned values are also "Data Size" and "Image Data" in this case.

As described above, when the PD printer 1000 acquires, on the MSC architecture, a partial image from an image stored in the DSC 3012, the PD printer 1000 issues an SCSI command "Receive" describing as parameters "a reading position (address)" and "the number of read bytes" in a storage held by the DSC 3012 based on "the handle of an image file", "the number of bytes offset from the top of the image file", "the number of bytes in partial image data to be acquired", and "the file system of the PD printer 1000". The DSC 3012 transmits data requested based on the parameters of the SCSI command to the PD printer 1000 as a response to the SCSI command, so that transfer of partial image data is realized. In this case, unlike the PTP architecture, since the parameters of the SCSI command received by the DSC 3012 do not include information such as "the handle of an image file" and "the number of bytes offset from the top", taken from the DSC 3012, it is not possible to recognize whether the transmitted SCSI command is issued based on CDPS_JobData or CDPS_PartialJobData.

[Bluetooth Architecture]

The following will describe an example using Bluetooth. In this case, the rightmost interface of FIG. 7 is used. In this example, a session between the two devices is established as an upper communication layer of the physical layer to transmit/receive objects or the like. The arrangement of an upper application layer is described by using Bluetooth Still Image Profile.

In the case of Bluetooth Still Image Profile, another connection from the DSC (Host)→the PD printer (Slave) is made in addition to the above connection, and a normal "Put Image" command is issued from the DSC 3012 so as to transmit information.

In addition, the following connections are made for the sake of convenience:

Connection 1: the PD printer (Host)→the DSC (Slave)
Connection 2: the PD printer (Slave)→the DSC (Host)

The following will describe the protocols of the service functions in Bluetooth.

Besides, since the service functions of FIGS. 32 to 43 correspond to those of FIGS. 19 to 30, a simple explanation will be provided below.

<CDPS_ServiceDicovery (Standard/Extension)>

Figure 32:
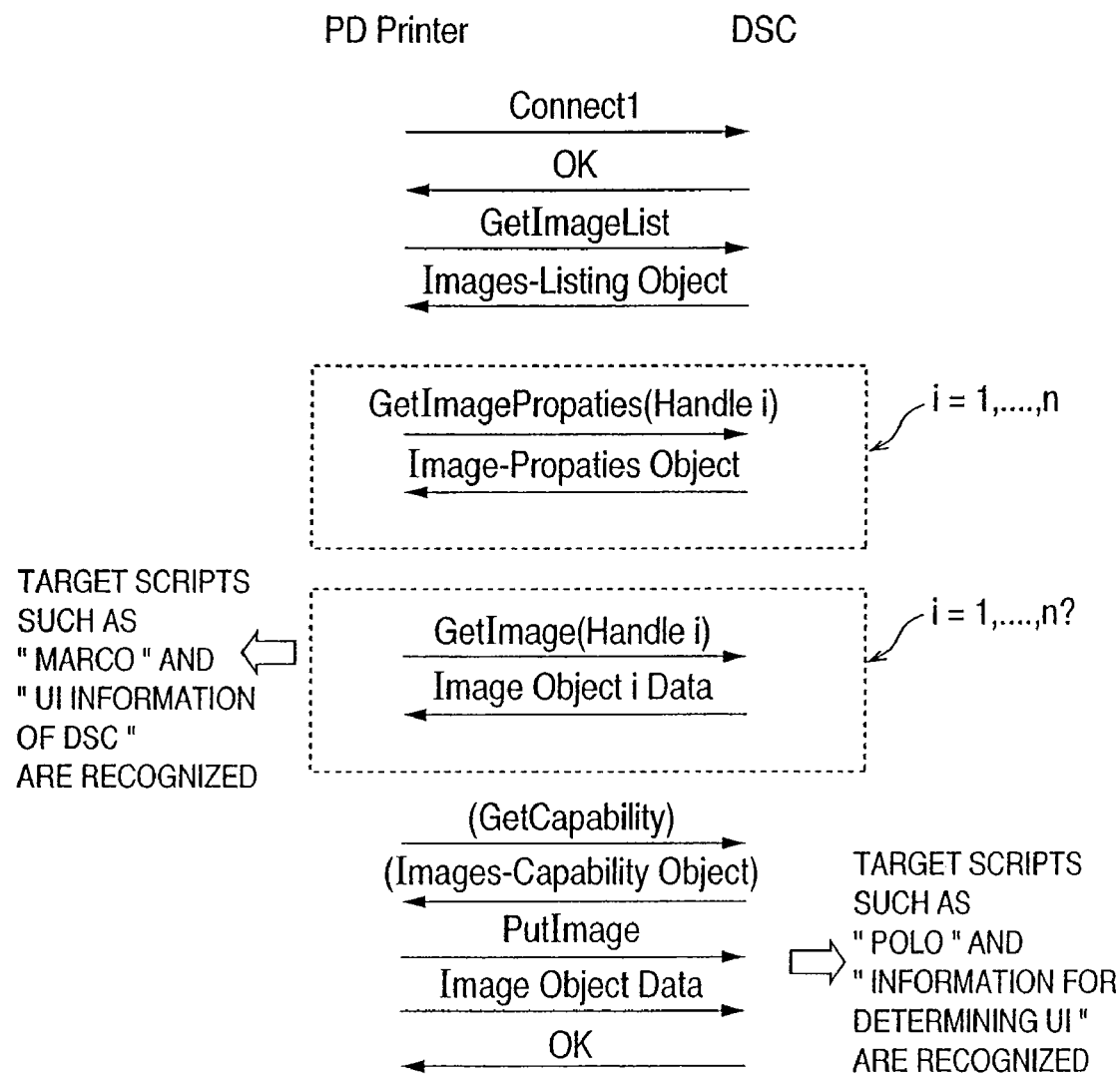
FIG. 32 depicts a diagram for explaining a communication protocol of a command for making a transition to the CDPS in Bluetooth.

FIG. 32 shows the protocol of the transition to the CDPS in Bluetooth. As with FIG. 19, the connection opposite party is recognized by keywords ("Marco", "Polo") Further, the DSC 3012 informs the keywords about the support level of the UI provided in the DSC 3012. Thus, the PD printer 1000 adds to the keywords which of the UI of the DSC 3012 or the UI of the PD printer 1000 is used, and makes a notification to the DSC 3012.

<CDPS_ServiceDicovery (Standard/Extension)>

Figure 33:
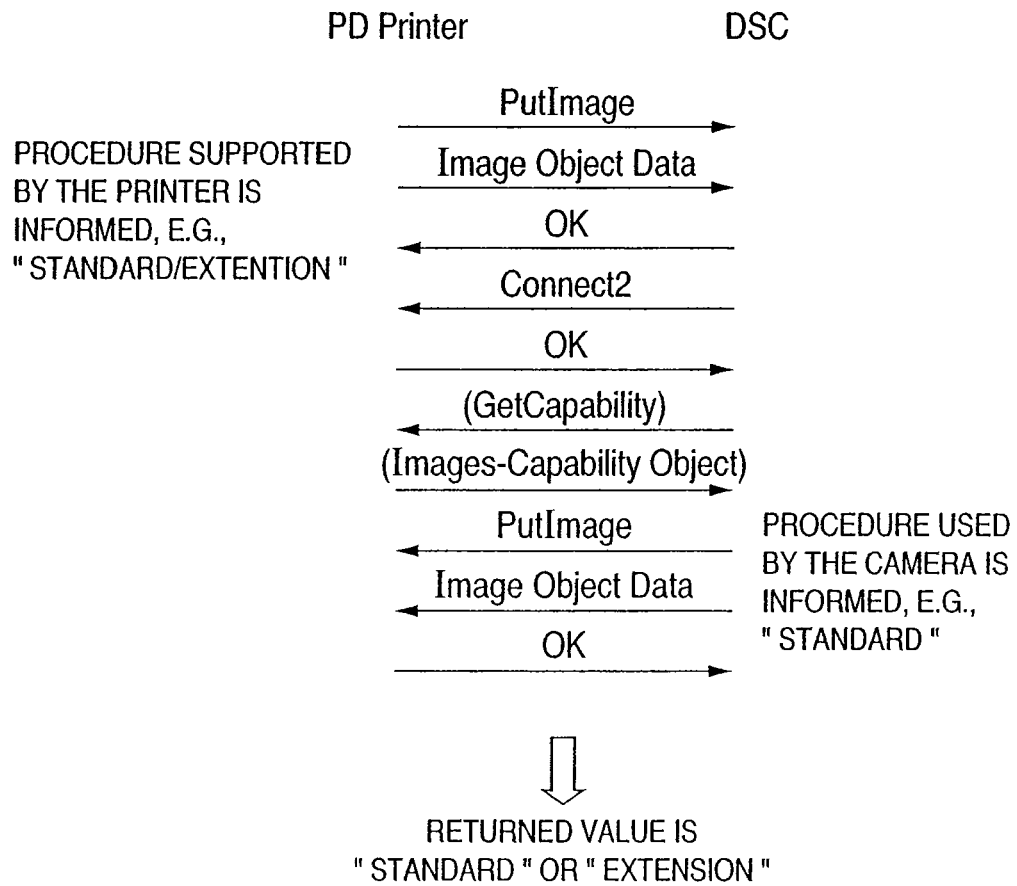
FIG. 33 depicts a diagram for explaining the communication protocol of the command for making a transition to the CDPS in Bluetooth.

FIG. 33 is a diagram showing the continuation of the protocol of the transition to the CDPS in Bluetooth.

Communication is established between the DSC 3012 and the PD printer 1000 in the CDPS mode.

<CDPS_Service (Standard)>

Figure 34:
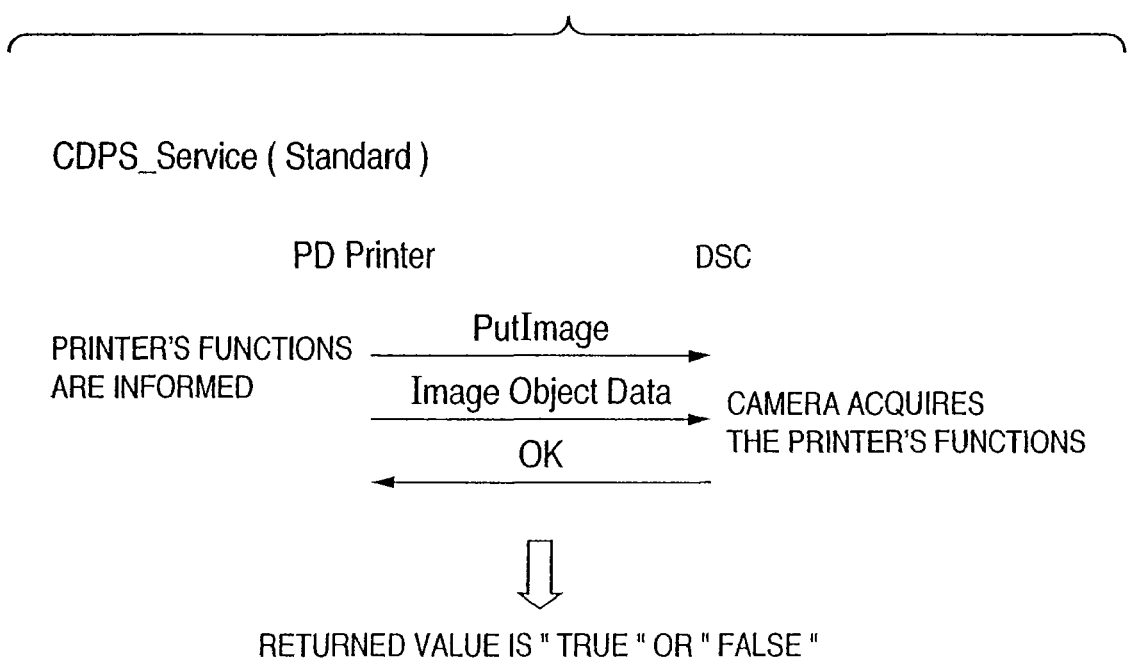
FIG. 34 depicts a diagram for explaining a communication protocol of providing notification of printer functions in Bluetooth.

FIG. 34 is a diagram showing a protocol for providing notification of the functions of the PD printer in Bluetooth. The functions of the PD printer 1000 are informed to the DSC 3012 from the PD printer 1000.

<CDPS_JobData (Standard)>

Figure 35:
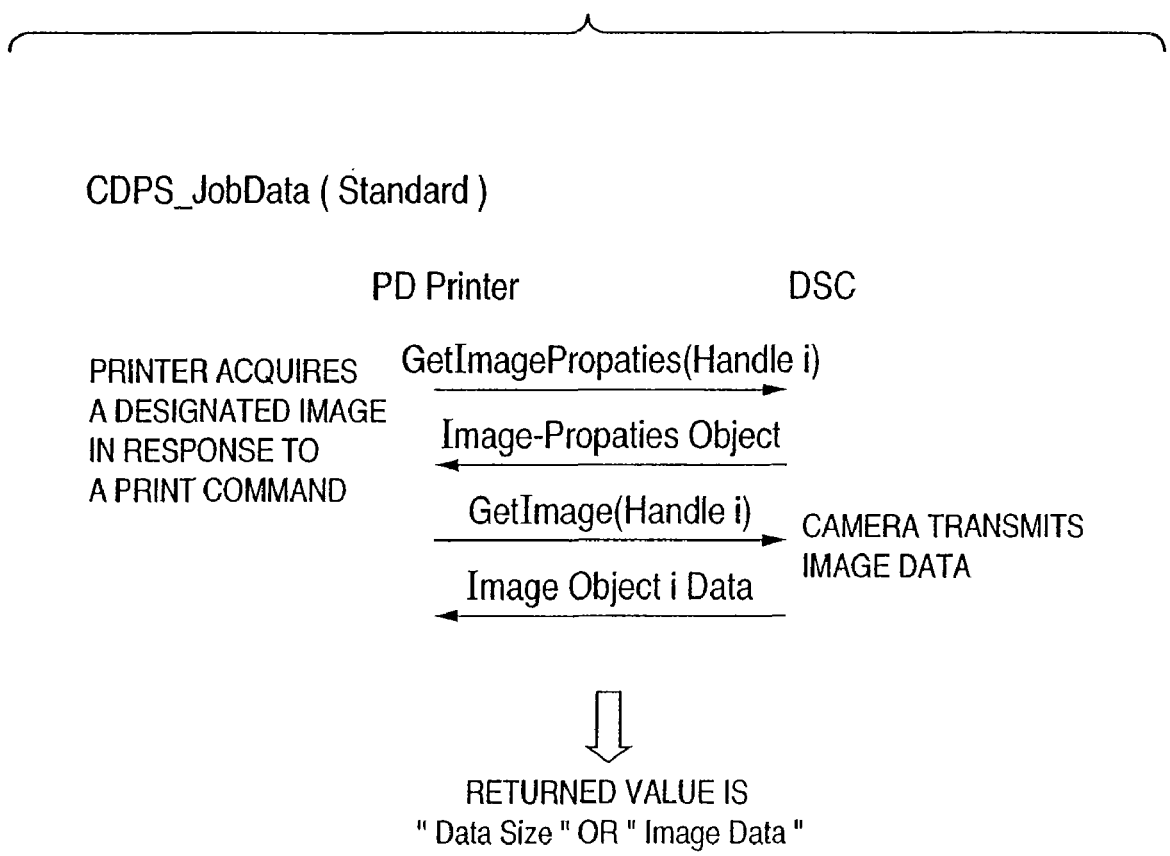
FIG. 35 depicts a diagram for explaining a communication protocol for acquiring image data from the storage in Bluetooth.

FIG. 35 is a diagram showing a protocol for causing the PD printer 1000 to acquire image data from the DSC 3012 in response to a print command in Bluetooth. In this case, returned values are "Data Size" and "Image Data".

<CDPS_PageStart (Standard)>

FIG. 36 is a diagram showing a protocol for informing the DSC 3012 of a print start command from the PD printer 1000 in Bluetooth.

<CDPS_PageEnd (Standard)>

Figure 37:
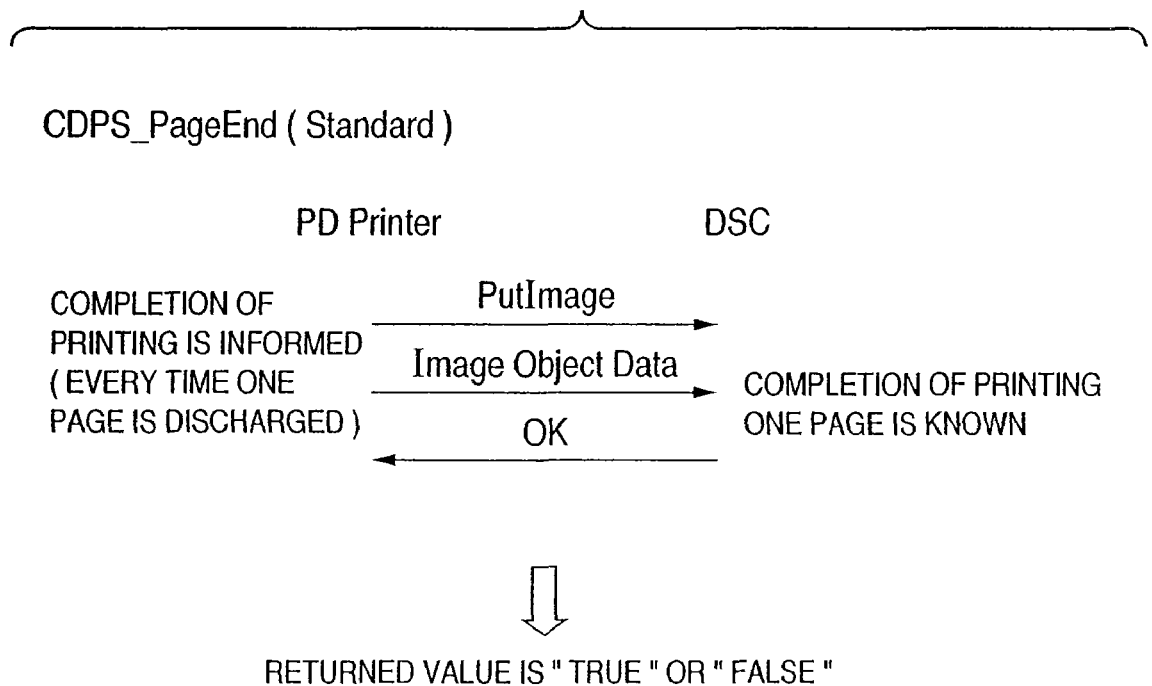
FIG. 37 depicts a diagram for explaining a communication protocol of providing notification of the completion of printing in Bluetooth.

FIG. 37 is a diagram showing a protocol for informing the DSC 3012 of the completion of printing one page from the PD printer 1000 in Bluetooth.

<CDPS_JobEnd (Standard)>

FIG. 38 is a diagram showing a protocol for informing the DSC 3012 of the completion of a print job from the PD printer 1000 in Bluetooth.

<CDPS_Error (Standard)>

Figure 39:
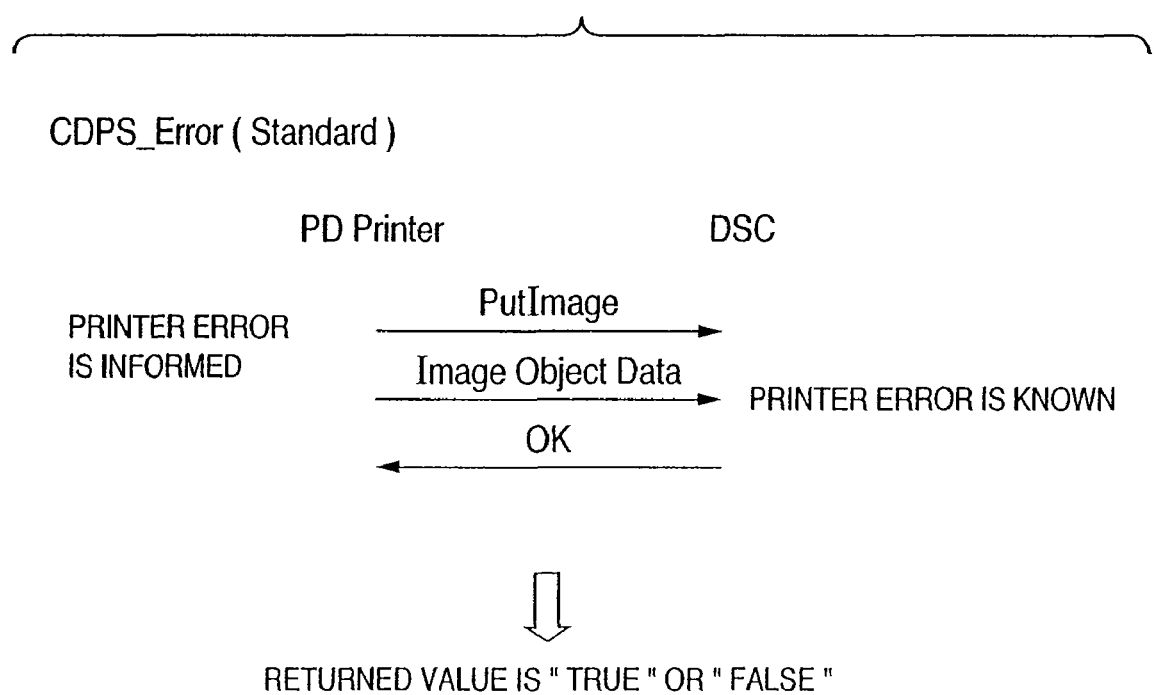
FIG. 39 depicts a diagram for explaining a communication protocol for providing notification of an error in Bluetooth.

FIG. 39 is a diagram showing a protocol for informing the DSC 3012 of a printer error from the PD printer 1000 in Bluetooth.

<CDPS_Job (Standard)>

Figure 40:
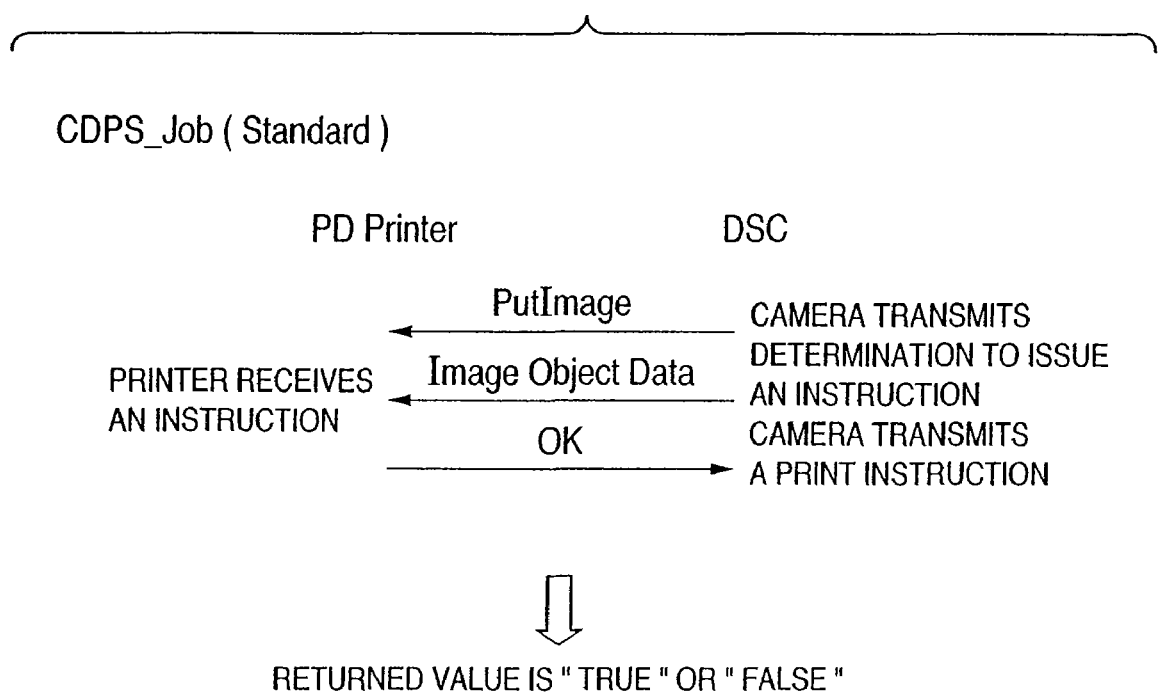
FIG. 40 depicts a diagram for explaining a communication protocol for issuing a print command in Bluetooth.

FIG. 40 is a diagram showing a protocol for issuing a print command to the PD printer 1000 from the DSC 3012 in Bluetooth.

<CDPS_JobAbort (Standard)>

Figure 41:
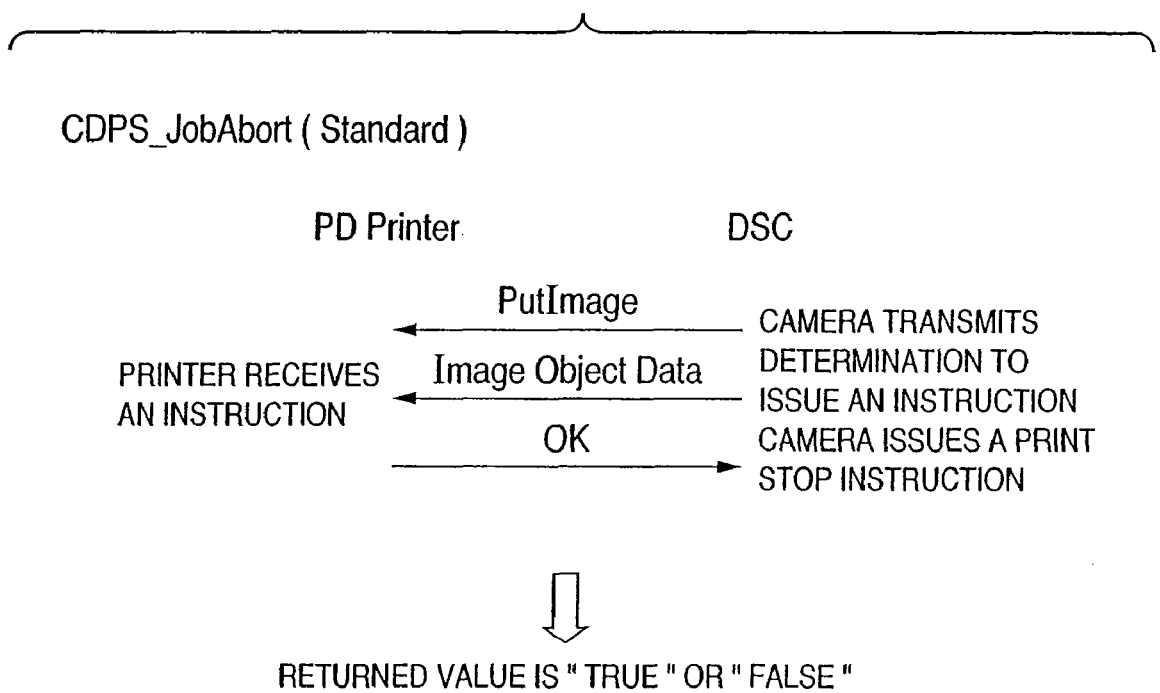
FIG. 41 depicts a diagram for explaining a communication protocol for issuing a print stop command.

FIG. 41 is a diagram showing a protocol for issuing a print stop command to the PD printer 1000 from the DSC 3012 in Bluetooth.

<CDPS_JobContinue (Standard)>

Figure 42:
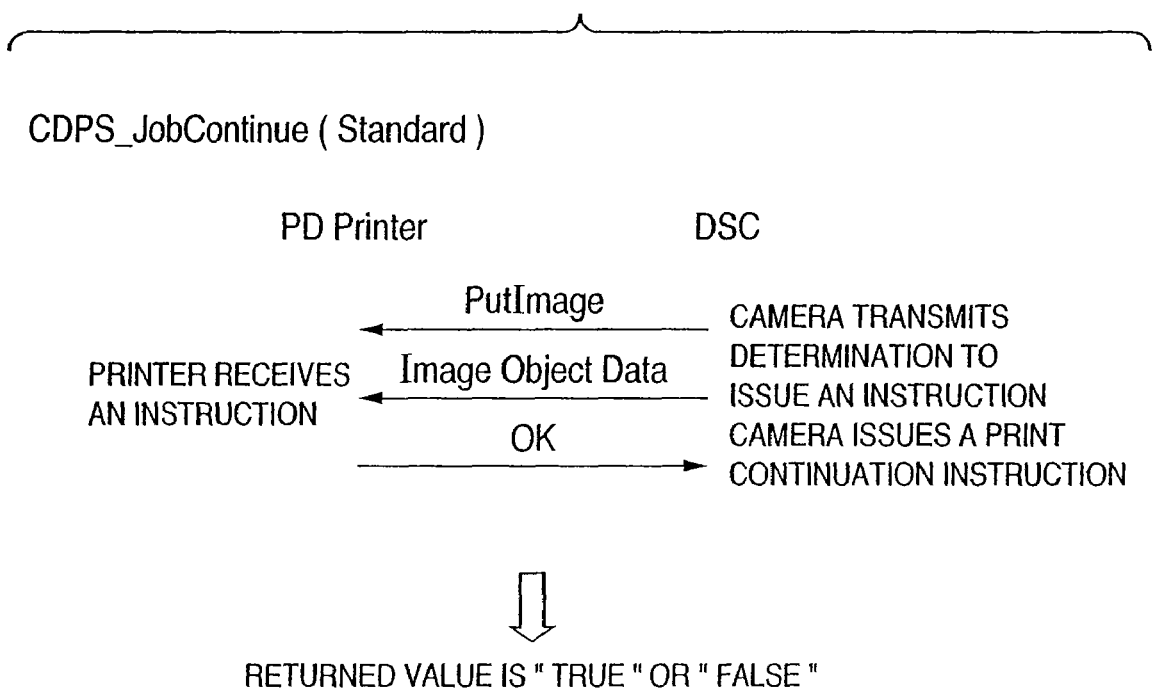
FIG. 42 depicts a diagram for explaining a communication protocol for issuing a restart command of a print job in Bluetooth.

FIG. 42 is a diagram showing a protocol for issuing a print restart command to the PD printer 1000 from the DSC 3012 in Bluetooth.

<CDPS_PartialJobData (Option)>

Figure 43:
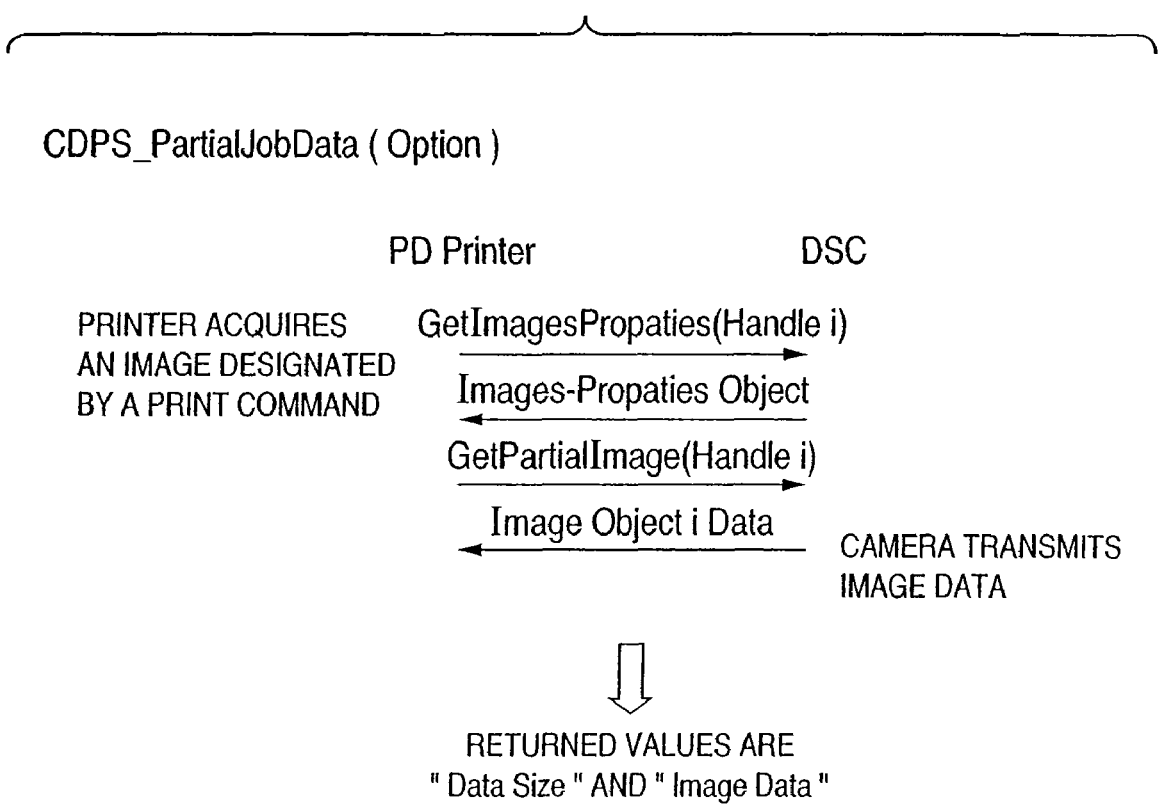
FIG. 43 depicts a diagram for explaining a communication protocol for acquiring a partial image in Bluetooth.

FIG. 43 is a diagram showing a protocol for causing the PD printer 1000 to acquire partial image data from the DSC 3012 in response to a print command in Bluetooth. In this case, returned values are "Data Size" and "Image Data".

As described above, when the PD printer 1000 acquires, on the Bluetooth architecture, a partial image from an image stored in the DSC 3012, the PD printer 1000 issues a Bluetooth command "GetPartialImage" describing "the handle of an image file", "the number of bytes offset from the top", and "the number of bytes in partial image data to be acquired" as parameters. The DSC 3012 specifies a requested part of partial image data based on the parameters of the Bluetooth command and transmits the part to the PD printer 1000 as a response to the Bluetooth command, so that transfer of partial image data is realized. The transferring method is substantially the same as the realizing method on the PTP architecture.

As described above, the PD printer 1000 transmits the commands for requesting partial image data according to a communication protocol and an interface that are used in communication with the DSC 3012 serving as an image providing device.

At this point, information transmitted from the image supply device (DSC 3012) can be used in common regardless of kinds of utilized interfaces. Namely, the operation unit of the image supply device is operated to issue instructions about an image to be outputted and an output pattern of the image by an output device. The designated information (job data) is interpreted by the output device (PD printer 1000), and a partial image request command is transmitted according to the kind of the interface.

With this configuration, it is possible to reduce a converting load of an image supply device such as the DSC 3012, which is expected to be low in power supply capacity. On the other hand, in an output device such as the PD printer 1000, in order to request a partial image according to its output capacity and output state, the system can be controlled more easily by converting job data and generating a partial image request on the side of the output device.

Additionally, unlike the PTP architecture and the MSC architecture, it is possible to issue a data transfer request (PutImage) from the DSC 3012 on the Bluetooth architecture in the direction from the DSC 3012 to the PD printer 1000. Thus, the realizing method discussed below is also applicable.

First, the PD printer 1000 issues "PutImage" and transmits CDPS_PartialJobData to the DSC 3012 while the script of CDPS_PartialJobData is maintained as the other CDPS commands (e.g., CDPS_PageStart). The DSC 3012 having received the script of CDPS_PartialJobData specifies requested data based on "the handle of an image file", "the number of bytes offset from the top", and "the number of bytes in partial image data to be acquired" that are described in the script, and the DSC 3012 issues a Bluetooth command "PutImage" and transmits the command to the PD printer 1000, so that transfer of partial image data is realized.

Regarding all the above three kinds of architectures: PTP, MSC, and Bluetooth, preferable realizing methods are available for the processing of CDPS_JobData and CDPS_PartialJobData, respectively. An issued CDPS command, information returned as a response, and acquired data are all the same taken from the application layer. Thus, the application layer can be used in common. Further, when the CDPS is transported to another architecture, a preferable realizing method is available according to the characteristics of the architecture.

An architecture used for CDPS processing by the PD printer 1000, which actually supports a plurality of architectures, is determined by the architecture supporting the connected DSC 3012. Moreover, reversely, an architecture used for CDPS processing by the DSC 3012, which actually supports a plurality of architectures, is determined by the architecture supporting the connected PD printer 1000. In the case where the both of the PD printer 1000 and the DSC 3012 support a plurality of architectures, the UI of one of the devices is used to determine an architecture used by the user or determine the priority order of architectures used for mounting one of the devices.

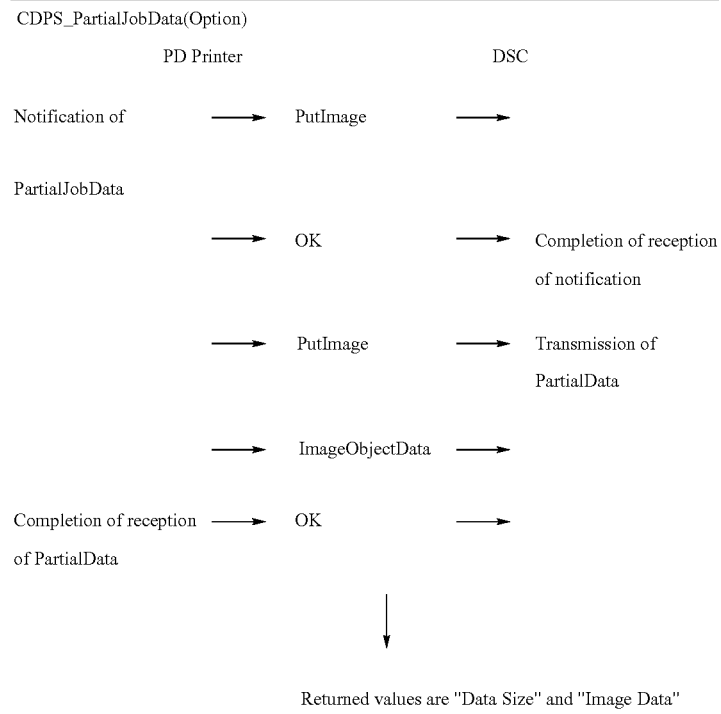

FIGS. 44A to 44C are diagrams for explaining the support levels of the DSC 3012 and the PD printer 1000. The sharing of the various control functions (the operation controller 801, the storage controller 802, and the print controller 803) is determined based on the support levels in the flowchart of FIG. 11.

FIG. 44A shows the support levels of the operation controller 801, FIG. 44B shows the support levels of the storage controller 802, and FIG. 44C shows the support levels of the print controller 803. The DSC 3012 can set support levels of "0" to "4", and the PD printer 1000 can set support levels of "1" to "3". If the DSC 3012 and the PD printer 1000 have the same support level, decision on which of the DSC 3012 or the PD printer 1000 should have higher priority is left to the discretion of a person who makes a decision.

For example, as to the support levels of the operation controller 801 in FIG. 44A, level "4" indicates a level asserting the use of the function of the DSC 3012, and level "3" indicates the provision of a viewer and an operation button. Level "2" indicates the provision of only the operation button, level "1" indicates the provision of only the minimum function, and level "0" indicates that the function is not supported.

Moreover, as to the support levels of the storage controller 802 in FIG. 44B, level "4" indicates a level asserting the use of the function of the DSC 3012, and level "3" indicates the provision of a handle function. Level "2" indicates the provision of an image file system, level "1" indicates the provision of only a function capable of accessing the storage device 811, and level "0" indicates that the function is not supported.

Further, as to the support levels of the print controller 803 in FIG. 44C, level "4" indicates a level asserting the use of the function of the DSC 3012, and level "3" indicates the provision of a rendering function. Level "2" indicates the provision of only gradation processing, level "1" indicates the provision of only a decoding function of JPEG, and level "0" indicates that the function is not supported.

The above functions of the PD printer 1000 and the DSC 3012 are compared with each other, it is decided which function (800-803 in FIG. 8) is the most efficient to use, and the function sharing shown in FIGS. 12 to 14, FIG. 17, and FIG. 18 is performed.

Besides, the present invention may be used for a system constituted of a plurality of devices (e.g., a host computer, interface equipment, a reader, a printer, or the like) and a device constituted of a single device (e.g., a copier, a facsimile, or the like).

Moreover, the object of the present invention can be attained also by supplying a storage medium (or a recording medium), which stores a program code of software for realizing the functions (processing performed on the side of the camera, various printing operations performed on the side of the printer) of the above embodiment, to a system or a device, and causing a computer (or a CPU and MPU) of the system or the device to read and execute the program code stored in the storage medium. In this case, the program code read from the storage medium realizes the functions of the above embodiment, and the storage medium for storing the program code constitutes the present invention. Further, the following case is also included: by executing the program code read by the computer, the functions of the above embodiment can be realized, and an operating system (OS) or the like operating on the computer further performs a part or the whole of actual processing based on an instruction of the program code, and the functions of the above embodiment are realized by the above processing.

Moreover, the following case is also included: the program code read from the storage medium is written in a memory which is provided in a function extension card inserted into the computer and a function extension unit connected to the computer, a CPU or the like provided in the function extension card and the function extension unit then performs a part or the whole of actual processing based on an instruction of the program code, and the functions of the above embodiment are realized by the processing.

As described above, according to the present embodiment, the PD printer is set as a USB host, the DSC is set as a slave, each of the functions necessary for photo-direct printing is assigned to either the PD printer or the DSC before a printing operation, and the most appropriate or desired printing mode on the DSC side is determined to perform printing. Further, during the function sharing, for example, when the DSC 3012 does not support the CDPS, it is impossible to inform the PD printer 1000 about the support levels of the functions 800 to 803 in the DSC 3012 in step S11 of FIG. 11. Also in this case, when the support levels of the functions 800 to 803 of the DSC 3012 are assumed to be 0 level in FIGS. 44A-44C, and the functions 800 to 803 are all supported on the side of the PD printer 1000, the resources of the CDPS can be substantially shared with the DSC 3012 not supporting the CDPS and direct-printing can be performed. The processing of "the support levels are assumed to be 0" can be realized in any layer of FIG. 7.

By sharing the resources thus, the effects of a shorter development time, a lower cost, reduced resources, and improved reliability are expected in direct printing with a compatible device and an incompatible device.

Moreover, the PD printer is set as a USB host and the DSC is set as a slave in the present embodiment. The combination is not particularly limited. Any of the devices can serve as a host or a slave as long as the function sharing serving as the gist of the present invention is suitably performed.

Further, according to the present invention, the device for judging higher usability during function sharing in the CDPS is not limited to the PD printer 1000, and the DSC 3012 is also applicable.

Furthermore, the function sharing in the CDPS is not limited to the method of comparing each of the functions 800 to 803 on usability. Sharing may be performed on each function group of a plurality of functions of the functions 800 to 803.

For example, the following operations are applicable: of the dividing positions A to D shown in FIG. 16, the dividing position which can be handled by the PD printer 1000 is transmitted to the DSC 3012, and the DSC 3012 decides which dividing position is adapted, and information of the position is transmitted to the PD printer 1000 from the DSC 3012.

Moreover, the following method is also applicable: a predetermined method of determining a dividing position (example: the desired position of the PD printer 1000 gains higher priority, etc.) is shared by the PD printer 1000 and the DSC 3012 in advance, each of the devices transmits information of the dividing position handled by each device to each other, and the dividing position is designated to the devices, which is determined by the assigning method of determining the dividing position. In this case, the order of the dividing positions A-D in FIG. 16 should be memorized in each device.

Moreover, although the present embodiment described the four functions 800 to 803, the present embodiment is not limited to four kinds of divisions. Partial function sharing may be performed on each of a plurality of partial functions constituting each of the functions 800 to 803.

For example, the partial functions constituting the print control includes an image format support function, a layout print function, a date/file name print function, an image correction function, a size-fixed print function, an image clipping print function, and a print job format support function.

An example of the function sharing on the partial functions will be described below.

(Image Format Support Function)

First, an image format (examples: JPEG, TIFF, etc.) supported by the PD printer 1000 is transmitted to the DSC 3012. Subsequently, the DSC 3012 decides that the PD printer 1000 takes charge of the image format supported by the PD printer 1000 and the DSC 3012 takes charge of the other image formats. The DSC 3012 transmits the decision to the PD printer 1000.

When photographic images in the image format handled by the PD printer 1000 are printed, the DSC 3012 transmits photographic images to be printed to the PD printer 1000, and the PD printer 1000 prints the transmitted photographic images.

When photographic images in the image format handled by the DSC 3012 are printed, the photographic images in the image format handled by the DSC 3012 are converted into the image format supported by the PD printer 1000 to generate format-converted photographic images, and the format-converted photographic images are transmitted to the PD printer 1000. The PD printer 1000 prints the transmitted format-converted photographic images.

(Layout Print Function)

First, the layout print function (example: two photographic images, four photographic images, etc. on one page) supported by the PD printer 1000 is transmitted to the DSC 3012. Subsequently, the DSC 3012 decides that the PD printer 1000 takes charge of the layout print function when the PD printer supports the function and decides that the DSC 3012 takes charge of the function in the other cases. The DSC 3012 transmits the decision to the PD printer 1000.

When the PD printer 1000 takes charge of the layout print function and performs printing, the DSC 3012 transmits photographic images to be printed and layout print information to the PD printer 1000, and the PD printer 1000 performs the layout print of the photographic images based on the transmitted photographic images and layout print information.

When the DSC 3012 takes charge of the layout print function and performs printing, the DSC 3012 generates a laid-out photographic image including a plurality of photographic images based on the photographic images and layout print information and the DSC 3012 transmits the laid-out photographic image to the PD printer 1000. The PD printer 1000 prints the transmitted laid-out photographic image.

(Date/File Name Print Function)

First, the date/file name print function supported by the PD printer 1000 is transmitted to the DSC 3012. Subsequently, the DSC 3012 decides that the PD printer 1000 takes charge of the date/file name print function when the function is supported by the PD printer 1000 and decides that DSC 3012 takes charge of the function in the other cases. The DSC 3012 transmits the decision to the PD printer 1000.

When the PD printer 1000 takes charge of the date/file name print function and performs printing, the DSC 3012 transmits photographic images to be printed and date/file name information accompanying with the photographic images to the PD printer 1000, and the PD printer 1000 prints the transmitted photographic images and date/file name information.

When the DSC 3012 takes charge of the date/file name print function and performs printing, the DSC 3012 generates, as print information, date/file name information accompanying with photographic images, synthesizes the information with the photographic images to generate synthesized photographic images, and transmits the synthesized photographic images to the PD printer 1000. The PD printer 1000 prints the synthesized and transmitted photographic images.

(Image Correction Function)

First, the image correction function supported by the PD printer 1000 is transmitted to the DSC 3012. Subsequently, the DSC 3012 decides that the PD printer 1000 takes charge of the image correction function when the function is supported by the PD printer 1000 and decides that DSC 3012 takes charge of the other image correction functions. The DSC 3012 transmits the decision to the PD printer 1000.

When the PD printer 1000 takes charge of the image correction function and performs outputting, the DSC 3012 transmits photographic images to be printed and image correction information accompanying with the photographic images to the PD printer 1000, and the PD printer 1000 performs image correction on the photographic images based on the transmitted photographic images and image correction information and prints the images.

When the DSC 3012 takes charge of the image correction function and performs printing, the image correction function handled by the DSC 3012 is performed on photographic images to generate corrected photographic images and transmits the corrected photographic images to the PD printer 1000. The PD printer 1000 prints the corrected and transmitted photographic images.

(Size-fixed Print Function)

First, the size-fixed print function (example: a photograph is printed in L size (3.5×5), 2L size (5×7), etc. regardless of paper sizes) supported by the PD printer 1000 is transmitted to the DSC 3012. Subsequently, the DSC 3012 decides that the PD printer 1000 takes charge of the size-fixed print function when the function is supported by the PD printer 1000 and decides that the DSC 3012 takes charge of the function in the other cases. The DSC 3012 transmits the decision to the PD printer 1000.

When the PD printer 1000 takes charge of the size-fixed print function and performs printing, the DSC 3012 transmits photographic images to be printed and size-fixed print information to the PD printer 1000, and the PD printer 1000 changes the photographic images into a fixed size based on the transmitted photographic images and size-fixed print information and prints the fixed-size changed photographic images.

When the DSC 3012 takes charge of the size-fixed print function and performs printing, the DSC 3012 changes photographic images into a fixed size based on the photographic images and size-fixed print information to generate fixed-size changed photographic images and transmits the fixed-size changed photographic images to the PD printer 1000. The PD printer 1000 prints the transmitted fixed-size changed photographic images.

(Image Clipping Print Function)

First, the image clipping print function (example: a rectangular in a photograph is clipped and is printed, a circular part is clipped and is printed, etc.) supported by the PD printer 1000 is transmitted to the DSC 3012. Subsequently, the DSC 3012 decides that the PD printer 1000 takes charge of the image clipping print function when the function is supported by the PD printer 1000 and decides that DSC 3012 takes charge of the function in the other cases. The DSC 3012 transmits the decision to the PD printer 1000.

When the PD printer 1000 takes charge of the image clipping print function and performs printing, the DSC 3012 transmits photographic images to be printed and image clipping print information to the PD printer 1000, and the PD printer 1000 clips the photographic images based on the transmitted photographic images and image clipping print information and outputs image clipping print.

When the DSC 3012 takes charge of the image clipping print function and performs outputting, the DSC 3012 clips photographic images based on the photographic images and image clipping print information to generate image clipping photographic images and transmits the image clipping photographic images to the PD printer 1000. The PD printer 1000 prints the transmitted image clipping photographic images.

(Print Job Format Support Function)

First, the print job format (example: DPOF, CDPS job, etc.) supported by the PD printer 1000 is transmitted to the DSC 3012. Subsequently, the DSC 3012 decides that the PD printer 1000 takes charge of a print job format supported by the PD printer 1000 and the DSC 3012 takes charge of the other print job formats. The DSC 3012 transmits the decision to the PD printer 1000.

When the PD printer 1000 prints based on a print job in the print job format handled by the PD printer 1000, the DSC 3012 transmits the print job to the PD printer 1000. The PD printer 1000 prints based on the transmitted print job.

When the DSC 3012 outputs a print job in the print job format handled by the DSC 3012, the print job in the print job format handled by the DSC 3012 is converted into the print job format supported by the PD printer 1000 to generate a converted print job, and the converted print job is transmitted to the PD printer 1000. The PD printer 1000 prints based on the converted and transmitted print job.

In any of these partial functions, regarding the partial functions supported by the PD printer 1000, the support level of the PD printer 1000 and the support level of the DSC 3012 may be compared with each other to permit the device with higher function to take charge of the function. Further, in some cases, one of the devices may take charge of all the partial functions. As such case, there may be a case in which the number of functions assigned to one device is one or two and extremely less than the number of functions assigned to another device. In such case, all functions are assigned to one device and the device processes all functions such that the efficiency of the printing system can be improved, even if processing speed of each function is lowered.

Moreover, the assigning of the functions may be performed in reference with actually implemented function and a function designated by a print job. This means that there is no problems if not implemented functions are assigned to a device whose processing ability is lower. As the result, in such case, all functions may be assigned to one device.

The above explanation described that the functions of the PD printer 1000 are transmitted to the DSC 3012 and sharing is determined in the DSC 3012. Conversely, the functions of the DSC 3012 may be transmitted to the PD printer 1000 to determine sharing in the PD printer 1000.

Further, the Capability information and various instructions are provided by using scripts, so that porting to the other communication protocols can be readily performed and standardization is also achieve with ease.

Additionally, the communication procedures between the devices are performed by using general files and general formats, and a communication procedure layer of the applications of the present embodiment is defined for the upper layer, so that it is possible to define communication procedures not depending upon various interface specifications.

Besides, since indefinite number of devices are connected in the printing system of the present embodiment, various interfaces are available. Thus, it is necessary to exchange information by using a specification which is supported by the various interfaces as a standard specification. Therefore, a transmission of function information required for transmission/reception between the devices is realized by "file transfer" or "object transfer", so that compatibility can be readily achieved for the various interface specifications.

Moreover, in addition to a digital camera, a PDA, a portable phone, a television, video equipment, an image storage device, or the like is also applicable as the image supply device.

Similarly, in addition to a printer, the print system includes a television for providing display on a display element such as a cathode-ray tube, video equipment for performing writing into a large-capacity storage medium, an information recording device.

In addition to the USB, IEEE 1394, or the like, a general interface includes a connection to a network such as the Internet.

With this arrangement, for example, when a single PD printer comprises a plurality of types of general-purpose I/Fs and uses the general-purpose I/Fs to perform direct printing between a plurality of different types of DSCs and the printer, it is possible for an application to use the resource of the same CDPS.

This holds true conversely when a single DSC comprises a plurality of kinds of general-purpose T/Fs and uses the general-purpose I/Fs to perform direct printing between a plurality of different types of PD printers and the DSC. However, regarding image data transfer (partial transfer) demanding high-speed processing, optimization may be performed using protocols specific to the I/Fs.

The present invention is not limited to the above described embodiments and various changes and modifications can be made within the spirit and scope of the present invention. Therefore, to apprise the public of the scope of the present invention, the following claims are made.

What is claimed is:

1. A digital camera for directly communicating with a printing device via a communication interface and for transmitting image data to the printing device to print the image data, the digital camera comprising:

a communication unit configured to establish a communication procedure with the printing device;

an assignment unit configured to acquire function information of the printing device via the communication unit, the function information including a supporting level of an operation controller for controlling a user interface which performs setting operations for causing the printing device to print the image data, and to assign an operation controller for controlling the user interface to either the digital camera or the printing device by comparing the supporting level of the operation controller of the digital camera for controlling the user interface with the supporting level of an operation controller of the printing device for controlling the user interface; and a control unit configured to transmit the image data to the printing device based on an assignment assigned by the assignment unit, wherein the image data is selected using the operation controller assigned by the assignment unit, wherein the supporting level of the printing device includes at least a level indicating a lack of support for the operation controller for the user interface or a level for asserting the use of the operation controller of the digital camera or the printing device, and if the assignment unit cannot acquire a supporting level of the operation controller of the printing device, then the assignment unit assigns an operation controller of the digital camera as the operation controller for controlling the user interface.

2. A digital camera according to claim 1, wherein the assignment unit acquires a supporting level of the operation controller for controlling the user interface, a storage controller for controlling a storage unit that stores an image file, and a print controller which generates print data and controls the printing device to print the print data, and compares the supporting levels of the digital camera and the printing device and assigns each of the operation controller for controlling the user interface, the storage controller and the print controller to either the digital camera or the printing device based on the result of the comparison.

3. A digital camera according to claim 1, wherein the supporting level of the printing device includes at least a level indicating lack of support for the operation controller for the user interface or a level for asserting the use of the operation controller of the digital camera or the printing device.

4. A control method of a digital camera for directly communicating with a printing device via a communication interface and for transmitting image data to the printing device to print the image data, the method comprising the steps of:
    establishing a communication procedure with the printing device;
    acquiring function information using the communication procedure, the function information including a supporting level of an operation controller for controlling a user interface which performs setting operations for causing the printing device to print the image data;
    assigning an operation controller for controlling the user interface to either the digital camera or the printing device by comparing the supporting level of the operation controller of the digital camera for controlling the user interface with the supporting level of an operation controller of the printing device for controlling the user interface; and
    transmitting the image data to the printing device based on an assignment assigned in the assigning step,
    wherein the image data is selected using the operation controller assigned in the assigning step,
    wherein the supporting level of the printing device includes at least a level indicating a lack of support for the operation controller for the user interface or a level for asserting the use of the operation controller of the digital camera or the printing device, and if the assignment step cannot acquire a supporting level of the operation controller of the printing device, then the assignment step assigns an operation controller of the digital camera as the operation controller for controlling the user interface.

5. A control method according to claim 4, wherein in the assigning step, function information describing functions of the printing device is received after the establishment of the communication procedure, and the functions are assigned based on the received function information.

6. A control method according to claim 4, wherein the digital camera communicates using a plurality of communication methods, and an assignment of functions to the digital camera and the printing device in the assigning step differs in accordance with the communication method with the image supply device.

7. An image supply device for directly communicating with a recording apparatus via a communication interface and for transmitting image data to the recording apparatus to process the image data, the image supply device comprising:
    a communication unit configured to establish a communication procedure with the recording apparatus;
    an assignment unit configured to acquire function information of the recording apparatus via the communication unit, the function information including a supporting level of an operation controller for controlling a user interface which performs setting operations for causing the recording apparatus to print the image data, and to assign an operation controller for controlling the user interface to either the image supply device or the recording apparatus by comparing the supporting level of the operation controller of the image supply device for controlling the user interface with the supporting level of an operation controller of the recording apparatus for controlling the user interface; and
    a control unit configured to transmit the image data to the recording apparatus based on an assignment assigned by the assignment unit,
    wherein the image data is selected using the operation controller assigned by the assignment unit,
    wherein the supporting level of the recording apparatus includes at least a level indicating a lack of support for the operation controller for the user interface or a level for asserting the use of the operation controller of the image supply device or the recording apparatus, and if the assignment unit cannot acquire a supporting level of the operation controller of the recording apparatus, then the assignment unit assigns an operation controller of the image supply device as the operation controller for controlling the user interface.

* * * * *